United States Patent
Burns et al.

(10) Patent No.: US 12,534,739 B2
(45) Date of Patent: Jan. 27, 2026

(54) AAV1 VECTORS AND USES THEREOF FOR TREATMENT OF OTIC INDICATIONS

(71) Applicant: Decibel Therapeutics, Inc., Boston, MA (US)

(72) Inventors: Joseph Burns, Newton, MA (US); Kathryn Ellis, Arlington, MA (US); Matthew Nguyen, Boston, MA (US); Adam Palermo, Somerville, MA (US); Gabriela Pregernig, Boston, MA (US); Fuxin Shi, Winchester, MA (US); Jonathon Whitton, Cambridge, MA (US)

(73) Assignee: Decibel Therapeutics, Inc., Boston, MA (US)

( * ) Notice: Subject to any disclaimer, the term of this patent is extended or adjusted under 35 U.S.C. 154(b) by 991 days.

(21) Appl. No.: 17/284,074

(22) PCT Filed: Oct. 11, 2019

(86) PCT No.: PCT/US2019/055979
§ 371 (c)(1),
(2) Date: Apr. 9, 2021

(87) PCT Pub. No.: WO2020/077295
PCT Pub. Date: Apr. 16, 2020

(65) Prior Publication Data
US 2021/0355504 A1     Nov. 18, 2021

Related U.S. Application Data

(60) Provisional application No. 62/911,885, filed on Oct. 7, 2019, provisional application No. 62/744,604, filed on Oct. 11, 2018.

(51) Int. Cl.
| | | |
|---|---|---|
| C12N 15/86 | (2006.01) | |
| A61K 9/00 | (2006.01) | |
| A61K 48/00 | (2006.01) | |

(52) U.S. Cl.
CPC ............ *C12N 15/86* (2013.01); *A61K 9/0046* (2013.01); *A61K 48/00* (2013.01); *C12N 2750/14143* (2013.01); *C12N 2750/14171* (2013.01)

(58) Field of Classification Search
CPC ....... C12N 15/86; A61K 9/0046; A61K 48/00
See application file for complete search history.

(56) References Cited

U.S. PATENT DOCUMENTS

| | | |
|---|---|---|
| 2010/0297084 A1 | 11/2010 | Bennett et al. |
| 2011/0171202 A1 | 7/2011 | Bance |
| 2013/0095071 A1 | 4/2013 | Bance et al. |
| 2014/0309288 A1 | 10/2014 | Brenner et al. |
| 2015/0209406 A1 | 7/2015 | Chen |
| 2017/0072015 A1 | 3/2017 | Schwartz et al. |
| 2017/0239332 A1 | 8/2017 | Burns et al. |
| 2017/0327557 A1 | 11/2017 | Chen |
| 2017/0340754 A1 | 11/2017 | Chen et al. |
| 2018/0055908 A1 | 3/2018 | Petit et al. |
| 2018/0080023 A1 | 3/2018 | Jackson et al. |

FOREIGN PATENT DOCUMENTS

| | | | |
|---|---|---|---|
| WO | WO-2006/033689 A2 | 3/2006 | |
| WO | WO-2016/073900 A1 | 5/2016 | |
| WO | WO-2016/077687 A1 | 5/2016 | |
| WO | WO-2017/072498 A1 | 5/2017 | |
| WO | WO-2017100791 A1 * | 6/2017 | ............. A61K 39/00 |
| WO | WO-2017/136764 A1 | 8/2017 | |
| WO | WO-2017/189753 A1 | 11/2017 | |
| WO | WO-2018/039375 A1 | 3/2018 | |
| WO | WO-2018/145111 A1 | 8/2018 | |
| WO | WO-2018/170402 A1 | 9/2018 | |
| WO | WO-2019/200016 A1 | 10/2019 | |

OTHER PUBLICATIONS

Iizuka, Takashi, et al. "Perinatal Gjb2 gene transfer rescues hearing in a mouse model of hereditary deafness." Human molecular genetics 24.13 (2015): 3651-3661. (Year: 2015).*
Daya et al, Gene Therapy Using Adeno-Associated Virus Vectors, Clin. Microbiol. Rev. 21(4): 583-593, 2008 (Year: 2008).*
Fumoto et al, Targeted Gene Delivery: Importance of Administration Routes, INTECH, Novel Gene Therapy Approaches, p. 3-31; editors Wei and Good, publisher Books on Demand, 2013 (Year: 2013).*
Maguire et al, Viral vectors for gene delivery to the inner ear, Hearing Research 394: e107927, 13 pages, doi.org/10.1016/j.heares.2020.107927, 2020 (Year: 2020).*
Iizuka, Takashi, et al. "Noninvasive in vivo delivery of transgene via adeno-associated virus into supporting cells of the neonatal mouse cochlea." Human gene therapy 19.4 (2008): 384-390. (Year: 2008).*
Liu, Qiang, et al. "The prevalence of neutralizing antibodies against AAV serotype 1 in healthy subjects in China: implications for gene therapy and vaccines using AAV1 vector." Journal of medical virology 85.9 (2013): 1550-1556. (Year: 2013).*
Akil et al., "Restoration of Hearing in the VGLUT3 Knockout Mouse Using Virally Mediated Gene Therapy," Neuron. 75:283-293 (2012).
Bedrosian et al., "In Vivo Delivery of Recombinant Viruses to the Fetal Murine Cochlea: Transduction Characteristics and Long-Term Effects on Auditory Function," Mol Ther. 14(3):328-335 (2006).

(Continued)

*Primary Examiner* — Tracy Vivlemore
*Assistant Examiner* — Allison Marie Johnson
(74) *Attorney, Agent, or Firm* — Clark & Elbing LLP

(57) ABSTRACT

The invention provides AAV1 vectors that can be used to transduce multiple inner ear cell types and their use for treatment of hearing loss, deafness, tinnitus, and vestibular dysfunction.

3 Claims, 12 Drawing Sheets
Specification includes a Sequence Listing.

(56) References Cited

OTHER PUBLICATIONS

Chang et al., "Virally mediated Konq1 gene replacement therapy in the immature scala media restores hearing in a mouse model of human Jervell and Lange-Nielsen deafness syndrome," EMBO Molecular Medicine. (2015) (10 pages).

Emptoz et al., "Local gene therapy durably restores vestibular function in a mouse model of Usher syndrome type 1G," PNAS 114.(36):9695-9700 (2017).

International Search Report and Written Opinion for International Application No. PCT/US2019/055979, dated Jan. 16, 2020 (33 pages).

Kesser et al., "Gene Transfer in Human Vestibular Epithelia and the Prospects for Inner Ear Gene Therapy," Laryngoscope. 118(5):821-831 (2008).

Kilpatrick et al., "Adeno-associated virus-mediated gene delivery into the scala media of the normal and deafened adult mouse ear," Gene Ther. 18(6):569-578 (2011).

Landegger et al., "A synthetic AAV vector enables safe and efficient gene transfer to the mammalian inner ear," Nat Biotechnol. 35(3):280-284 (2017).

Li et al., "SLC26A4 Targeted to the Endolymphatic Sac Rescues Hearing and Balance in Slc26a4 Mutant Mice," PLoS Genet. 9(7): e1003641 (2013) (18 pages).

Liu et al., "Promoter effects of adeno-associated viral vector for transgene expression in the cochlea in vivo," Exp Mol Med. 39(2):170-175 (2007).

Liu et al., "Specific and Efficient Transduction of Cochlear Inner Hair Cells with Recombinant Adeno-associated Virus Type 3 Vector," Mol Ther. 12(4):725-733 (2005).

Liu et al., "Protection Against Aminoglycoside-induced Ototoxicity by Regulated AAV Vector-mediated GDNF Gene Transfer Into the Cochlea," Mol Ther. 16(3):474-480 (2008).

Luebke et al., "Adenoviral and AAV-Meditated Gene Transfer to the Inner Ear: Role of Serotype, Promoter, and Viral Load on In Vivo and In Vitro Infection Efficiencies," Adv Ortorhinolaryngol. 66:87-98 (2009).

Shi et al., "Adeno-associated virus transformation into the normal miniature pig and the normal guinea pigs cochlea via scala tympani," Acta Oto-Laryngologica. 137(9):910-916 (2017).

Shu et al., "Identification of Adeno-Associated Viral Vectors That Target Neonatal and Adult Mammalian Inner Ear Cell Subtypes," Human Gene Therapy. 27(9):687-699 (2016).

Stone et al., "Adeno-associated Virus-Mediated Gene Transfer to Hair Cells and Support Cells of the Murine Cochlea," Mol Ther. 11(6):843-848 (2005).

Askew et al., "Adeno-associated virus gene replacement for recessive inner ear dysfunction: Progress and challenges," Hear Res. 394:107947 (2020) (13 pages).

Yu et al., "Virally expressed connexin26 restores gap junction function in the cochlea of conditional Gjb2 knockout mice," Gene Ther. 21(1):71-80 (2014).

Zhang et al., "Cochlear Gene Therapy for Sensorineural Hearing Loss: Current Status and Major Remaining Hurdles for Translational Success," Front Mol Neurosci. 11:221 (Jun. 2018) (15 pages).

Anthwal et al., "The development of the mammalian outer and middle ear," J. Anat. 228(2):217-232 (Feb. 2016).

Hordeaux et al., "The Neurotropic Properties of AAV-PHP.B Are Limited to C57BL/6J Mice," Mol. Therapy. 26(3):664-668 (Mar. 2018).

Lim et al., "Developmental Morphology of the Mouse Inner Ear: A scanning electron microscopic observation," Acta Oto-Laryngologica. 99(sup422): 5-69 (1985).

Lalwani et al., "Long-term in vivo cochlear transgene expression mediated by recombinant adeno-associated virus," Gene Ther. 5(2):277-281 (1998).

Tucker et al., "Mapping the distribution of stem/progenitor cells across the mouse middle ear during homeostasis and inflammation," Development. 145(1): dev154393 (Jan. 2018) (9 pages).

Walters et al., "Postnatal development, maturation and aging in the mouse cochlea and their effects on hair cell regeneration," available in PMC Mar. 1, 2014, published in final edited form as: Hear Res. 297: 68-83 (Mar. 2013) (37 pages).

\* cited by examiner

FIG. 7A Control

FIG. 7B AAV1 Low

FIG. 7C AAV1 High

AAV1 VECTORS AND USES THEREOF FOR TREATMENT OF OTIC INDICATIONS

SEQUENCE LISTING

The instant application contains a Sequence Listing which has been submitted electronically in ASCII format and is hereby incorporated by reference in its entirety. Said ASCII copy, created on Oct. 11, 2019 is named 51124-054WO3_Sequence_Listing_10.11.2019_ST25 and is 38,358 bytes in size.

FIELD OF THE INVENTION

The invention provides AAV1 vectors that can be used to transduce multiple inner ear cell types and their use for the treatment of hearing loss, tinnitus, and vestibular dysfunction.

BACKGROUND

Gene therapy has recently emerged as a promising approach for treating disorders of the inner ear, such as hearing loss and vestibular dysfunction, as it can be used to treat the genetic causes of these disorders, induce the expression of genes that encode therapeutic proteins, and may lead to the preservation or restoration of hearing with more natural sound perception than a cochlear implant. However, mutations that cause hearing loss and/or vestibular dysfunction have been identified in a variety of different cell types in the inner ear, and preclinical studies in rodent models have yet to identify a single viral vector that can be used to transduce most or all cell types of the inner ear. Moreover, minimal studies have been conducted in larger animal models that are more predictive of human treatment. Therefore, there is a need for a viral vector that exhibits pantropic transduction of inner ear cells in a clinically relevant animal model.

SUMMARY OF THE INVENTION

The present disclosure is based on the inventors' discovery that adeno-associated viral (AAV) vectors having an AAV1 serotype (e.g., an AAV1 capsid) are surprisingly pan-tropic in the inner ear of non-human primates. AAV1 vectors exhibited strong expression and unexpectedly superior tropism in multiple cell types of the inner ear of non-human primates as compared to AAV1 tropism in the mouse inner ear, and also as compared to the tropism of other AAV serotypes (e.g., AAV2 and AAV7m8) in non-human primates. Accordingly, the invention provides compositions and methods for transducing cell types of the primate (e.g., human) inner ear using an AAV1 vector. The AAV1 vectors described herein can be administered to a primate (e.g., human) subject to promote the expression of a polynucleotide, such as a polynucleotide corresponding to gene that promotes or improves inner ear cell function, regeneration, maintenance, development, proliferation, or survival, in one or more primate (e.g., human) inner ear cells. The compositions and methods described herein can be administered to a primate (e.g., human) patient to treat or prevent hearing loss (e.g., sensorineural hearing loss) and/or vestibular dysfunction (e.g., vertigo, dizziness, or imbalance).

Exemplary embodiments of the invention are described in the enumerated paragraphs below.

E1. A method of transducing developed inner ear cells in a primate subject, the method including administering to the subject an effective amount of a serotype 1 adeno-associated virus (AAV1) vector in an amount that transduces one or more (e.g., 1, 2, 3, 4, 5, 6, 7, 8, 9, 10, 11, 12, 13, 14, 15, 16, 17, 18, 19, 20, or more) inner ear cell types selected from the group consisting of outer hair cells, vestibular hair cells, vestibular dark cells, vestibular fibrocytes, Scarpa's ganglion neurons, endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells.

E2. The method of E1, wherein the AAV1 vector transduces three or more inner ear cell types selected from the group consisting of outer hair cells, vestibular hair cells, vestibular dark cells, vestibular fibrocytes, Scarpa's ganglion neurons, endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells.

E3. The method of E2, wherein the AAV1 vector transduces five or more cell types selected from the group consisting of outer hair cells, vestibular hair cells, vestibular dark cells, vestibular fibrocytes, Scarpa's ganglion neurons, endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells.

E4. The method of E3, wherein the AAV1 vector transduces ten or more cell types selected from the group consisting of outer hair cells, vestibular hair cells, vestibular dark cells, vestibular fibrocytes, Scarpa's ganglion neurons, endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells.

E5. The method of E4, wherein the AAV1 vector transduces fifteen or more cell types selected from the group consisting of outer hair cells, vestibular hair cells, vestibular dark cells, vestibular fibrocytes, Scarpa's ganglion neurons, endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells.

E6. The method of E5, wherein the AAV1 vector transduces twenty or more cell types selected from the group consisting of outer hair cells, vestibular hair cells, vestibular dark cells, vestibular fibrocytes, Scarpa's ganglion neurons, endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells.

E7. The method of any one of E1-E6, wherein the AAV1 vector transduces at least 20%, 30%, 40%, 50%, 60%, 70%, 80%, 90%, 95%, or 99% of cells of a given cell type or of all inner ear cell types.

E8. The method of any one of E1-E7, wherein the AAV1 vector transduces all cells of a given cell type or all inner ear cell types.

E9. The method of any one of E1-E8, wherein transduction occurs throughout the length of the cochlea (e.g., the basal-to-apical axis of the cochlea).

E10. The method of any one of E1-E9, wherein the AAV1 vector transduces at least 20% (e.g., at least 20%, 30%, 40%, 50%, 60%, 70%, 80%, 90%, 95%, 99%, or 100%) of cells of a given cell type or of all inner ear cell types across the length of the basal-to-apical axis of the cochlea.

E11. The method of any one of E1-E10, wherein the AAV1 vector transduces at least 20% (e.g., at least 20%, 30%, 40%, 50%, 60%, 70%, 80%, 90%, 95%, 99%, or 100%) of cells of a given cell type or of all inner ear cell types in the base of the cochlea.

E12. The method of any one of E1-E11, wherein the AAV1 vector transduces at least 20% (e.g., at least 20%, 30%, 40%, 50%, 60%, 70%, 80%, 90%, 95%, 99%, or 100%) of cells of a given cell type or of all inner ear cell types in the middle of the cochlea.

E13. The method of any one of E1-E12, wherein the AAV1 vector transduces at least 20% (e.g., at least 20%, 30%, 40%, 50%, 60%, 70%, 80%, 90%, 95%, 99%, or 100%) of cells of a given cell type or of all inner ear cell types in the apex of the cochlea.

E14. The method of any one of E1-E13, wherein the AAV1 vector includes a promoter selected from the list of promoters in Table 5.

E15. The method of E14, wherein the promoter is a Glial Fibrillary Acidic Protein (GFAP) promoter.

E16. The method of E14, wherein the promoter is a Synapsin (SYN) promoter.

E17. The method of E14, wherein the promoter is selected from the group consisting of a Jagged 1 (JAG1) promoter, a Notch 1 (NOTCH1 promoter), a Myosin 7A (MYO7A) promoter, a Solute Carrier Family 1 Member 3 (GLAST) promoter, and a POU Class 4 Homeobox 3 (POU4F3) promoter.

E18. The method of E14, wherein the AAV1 vector includes a promoter selected from the group consisting of a Prestin (SLC26A5) promoter, an Oncomodulin (OCM) promoter, a Stereocilin (STRC) promoter, a Myosin 15 (MYO15) promoter, a Growth Factor Independent 1 Transcriptional Repressor (GFI1) promoter, a Potassium Voltage-Gated Channel Subfamily Q Member 1 (KCNQ1) promoter, a Potassium Voltage-Gated Channel Subfamily J Member 10 (KCNJ10) promoter, a Tyrosinase (TYR) promoter, a SRY-Box 2 (SOX2) promoter, a Calbindin 2 (CALB2) promoter, a Basic Helix-Loop-Helix Family Member E22 (BHLHE22) promoter, a Leucine Rich Repeat Containing G Protein-Coupled Receptor 5 (LGR5) promoter, a Hes Family BHLH Transcription Factor 1 (HES1) promoter, a Hes Family BHLH Transcription Factor 5 (HES5) promoter, a SRY-Box 9 (SOX9) promoter, a ATPase Plasma Membrane Ca2+ Transporting 2 (ATP2B2) promoter, a CD44 Molecule (CD44) promoter, a Fibroblast Growth Factor Receptor 3 (FGFR3) promoter, a Frizzled Related Protein (FRZB) promoter, a Solute Carrier Family 26 Member 4 (SLC26A4) promoter, a Carcinoembryonic Antigen Related Cell Adhesion Molecule 16 (CEACAM16) promoter, a Claudin 11 (CLDN11) promoter, a Peripheral Myelin Protein 22 (PMP22) promoter, a Potassium Voltage-Gated Channel Subfamily E Regulatory Subunit 1 (KCNE1) promoter, a POU Class 3 Homeobox 4 (POU3F4) promoter, a Gap Junction Protein Beta 2 (GJB2) promoter, and a Tubulin Beta 3 Class III (TUBB3) promoter.

E19. The method of E18, wherein the promoter is the SLC26A5 promoter.

E20. The method of E18, wherein the promoter is the OCM promoter.

E21. The method of E18, wherein the promoter is the MYO15 promoter.

E22. The method of E18, wherein the promoter is the ATP2B2 promoter.

E23. The method of E18, wherein the promoter is the GJB2 promoter.

E24. The method of E18, wherein the promoter is the TYR promoter.

E25. The method of any one of E1-E13, wherein the promoter is a ubiquitous promoter.

E26. The method of E25, wherein the promoter is a Cytomegalovirus (CMV) promoter.

E27. The method of E25, wherein the promoter is a hybrid promoter derived from the CMV early enhancer element, the promoter, first exon, and first intron of the chicken beta-actin gene, and the splice acceptor of the rabbit beta-globin gene (a CAG promoter).

E28. The method of E25, wherein the promoter is a truncated CMV-Chicken Beta-Actin (smCBA) promoter.

E29. The method of any one of E1-E28, wherein the AAV1 vector includes a polynucleotide selected from the list in Table 2.

E30. The method of E29, wherein the polynucleotide encodes Strc.

E31. The method of E29, wherein the polynucleotide encodes Transmembrane Channel Like 1 (Tmc1).

E32. The method of E29, wherein the polynucleotide encodes Harmonin (Ush1c).

E33. The method of E29, wherein the polynucleotide encodes Atonal BHLH Transcription Factor 1 (Atoh1).

E34. The method of E29, wherein the polynucleotide encodes Clarin 1 (Clrn1).

E35. The method of E29, wherein the polynucleotide encodes SRY-Box 4 (Sox4).

E36. The method of E29, wherein the polynucleotide encodes Brain Derived Neurotrophic Factor (Bdnf).

E37. The method of E29, wherein the polynucleotide encodes Neurotrophin 3 (Ntf3).

E38. The method of E29, wherein the polynucleotide encodes SRY-Box 11 (Sox11).

E39. The method of E29, wherein the polynucleotide encodes Myosin 7A (Myo7a).

E40. The method of E29, wherein the polynucleotide encodes Gjb2.

E41. The method of E29, wherein the polynucleotide encodes Cholinergic Receptor Nicotinic Alpha 9 Subunit (Chrna9).

E42. The method of E29, wherein the polynucleotide encodes Cholinergic Receptor Nicotinic Alpha 10 Subunit (Chrna10).

E43. The method of E29, wherein the polynucleotide encodes Ocm.

E44. The method of E29, wherein the polynucleotide encodes Tyr.

E45. The method of E29, wherein the polynucleotide encodes Transmembrane and Tetratricopeptide Repeat Containing 4 (Tmtc4).

E46. The method of E29, wherein the polynucleotide encodes TEA Domain Transcription Factor 2 (Tead2).

E47. The method of E29, wherein the polynucleotide encodes Yes Associated Protein 1 (Yap1).

E48. A method of expressing a polynucleotide in a supporting cell in a primate subject, the method including administering to the subject an effective amount of an AAV1 vector including the polynucleotide operably linked to a promoter selected from the group consisting of a GFAP promoter, a GLAST promoter, a HES1 promoter, a JAG1 promoter, a NOTCH1 promoter, a LGR5 promoter, a SOX2 promoter, a HES5 promoter, and a SOX9 promoter.

E49. The method of E48, wherein the promoter is the GFAP promoter.

E50. The method of E48, wherein the promoter is selected from the group consisting of the HES1 promoter, the LGR5 promoter, the SOX2 promoter, the HES5 promoter, and the SOX9 promoter.

E51. The method of any one of E48-E50, wherein the polynucleotide encodes Sox9, Spalt Like Transcription Factor 2 (Sall2), Calmodulin Binding Transcription Activator 1 (Camta1), Hes Related Family BHLH Transcription Factor With YRPW Motif 2 (Hey2), Gata Binding Protein 2 (Gata2), Hes Related Family BHLH Transcription Factor With YRPW Motif 1 (Hey1), Ceramide Synthase 2 (Lass2), SRY-Box 10 (Sox10), GATA Binding Protein 3 (Gata3), Cut Like Homeobox 1 (Cux1), Nuclear Receptor Subfamily 2 Group F Member (Nr2f1), Hes Family BHLH Transcription Factor 1 (Hes1), RAR Related Orphan Receptor B (Rorb), Jun Proto-Oncogene AP-1 Transcription Factor Subunit (Jun), Zinc Finger Protein 667 (Zfp667), LIM Homeobox 3 (Lhx3), Nescient Helix-Loop-Helix 1 (Nh1h1), MAX Dimerization Protein 4 (Mxd4), Zinc Finger MIZ-Type Containing 1 (Zmiz1), Myelin Transcription Factor 1 (Myt1), Signal Transducer And Activator Of Transcription 3 (Stat3), BarH Like Homeobox 1 (Barhl1), Thymocyte Selection Associated High Mobility Group Box (Tox), Prospero Homeobox 1 (Prox1), Nuclear Factor 1 A (Nfia), Thyroid Hormone Receptor Beta (Thrb), MYCL Proto-Oncogene BHLH Transcription Factor (Mycl1), Lysine Demethylase 5A (Kdm5a), CAMP Responsive Element Binding Protein 3 Like 4 (Creb3l4), ETS Variant 1 (Etv1), Paternally Expressed 3 (Peg3), BTB Domain And CNC Homolog 2 (Bach2), ISL LIM Homeobox (Isl1), Zinc Finger And BTB Domain Containing 38 (Zbtb38), Limb Bud And Heart Development (Lbh), Tubby Bipartite Transcription Factor (Tub), Ubiquitin C (Hmg20), RE1 Silencing Transcription Factor (Rest), Zinc Finger Protein 827 (Zfp827), AF4/FMR2 Family Member 3 (Aff3), PBX/Knotted 1 Homeobox 2 (Pknox2), AT-Rich Interaction Domain 3B (Arid3b), MLX Interacting Protein (Mlxip), Zinc Finger Protein (Zfp532), IKAROS Family Zinc Finger 2 (Ikzf2), Spalt Like Transcription Factor 1 (Sall1), SIX Homeobox 2 (Six2), Spalt Like Transcription Factor 3 (Sall3), Lin-28 Homolog B (Lin28b), Pou4f3, Regulatory Factor X7 (Rfx7), Atoh1, an Atoh1 variant including mutations at amino acids 328, 331, and/or 334 (e.g., S328A, S331A, S334A, S328A/S331A, S328A/S334A, S331A/S334A, and S328A/S331A/S334, e.g., a variant having the sequence of any one of SEQ ID NOs: 4-10), Gfi1, Sox4, Bdnf, Ntf3, Sox11, Tead2, Yap1, or a nuclease (e.g., CRISPR Associated Protein 9 (Cas9), Transcription Activator-Like Effector Nuclease (TALEN), Zinc Finger Nuclease (ZFN), or guide RNA (gRNA)), or is a microRNA (miRNA, e.g., miR-183, miR-96, or miR-182).

E52. The method of any one of E48-E51, wherein the supporting cell is a vestibular supporting cell.

E53. The method of E52, wherein the vestibular supporting cell is in the utricle.

E54. The method of any one of E48-E51, wherein the supporting cell is a cochlear supporting cell and the promoter is SOX2.

E55. A method of expressing a polynucleotide in a hair cell of the inner ear (e.g., vestibular hair cell and/or a cochlear hair cell) in a primate subject, the method including administering to the subject an effective amount of an AAV1 vector including the polynucleotide operably linked to a promoter selected from the group consisting of a MYO15 promoter, a GFI1 promoter, a POU4F3 promoter, and a MYO7A promoter.

E56. The method of E55, wherein the promoter is the MYO15 promoter.

E57. The method of E55 or E56, wherein the polynucleotide encodes Bdnf, Ntf3, Tmtc4, or a nuclease (e.g., Cas9, TALEN, ZFN, or gRNA), or is a microRNA (miRNA, e.g., miR-183, miR-96, or miR-182).

E58. The method of any one of E55-E57, wherein the hair cell is a cochlear hair cell.

E59. The method of E58, wherein the cochlear hair cell is an inner hair cell.

E60. The method of E58, wherein the cochlear hair cell is an outer hair cell.

E61. The method of any one of E55-E57, wherein the hair cell is a vestibular hair cell.

E62. A method of expressing a polynucleotide in an outer hair cell in a primate subject, the method including administering to the subject an effective amount of an AAV1 vector including the polynucleotide operably linked to a promoter selected from the group consisting of a SLC26A5 promoter, an OCM promoter, a STRC promoter, and an ATP2B2 promoter.

E63. The method of E62, wherein the promoter is the SLC26A5 promoter.

E64. The method of E62, wherein the promoter is the OCM promoter.

E65. The method of E62, wherein the promoter is the ATP2B2 promoter.

E66. The method of any one of E62-E65, wherein the polynucleotide encodes Strc, Tmc1, Myo7a, Ush1c, Atoh1, Pou4f3, Gfi1, ISL LIM Homeobox 1 (Isl1), Clrn1, Protocadherin Related 15 (Pcdh15), Cadherin Related 23 (Cdh23), Chrna9, Chrna10, Ocm, Bdnf, Ntf3, Tmtc4, or a nuclease (e.g., Cas9, TALEN, ZFN, or gRNA), or is a microRNA (e.g., miR-183, miR-96, or miR-182).

E67. A method of expressing a polynucleotide in a cochlear hair cell in a primate subject, the method including administering to the subject an effective amount of an AAV1 vector including the polynucleotide operably linked to a promoter selected from the group consisting of a MYO15 promoter, a GFI1 promoter, a POU4F3 promoter, and a MYO7A promoter.

E68. The method of E67, wherein the promoter is the GFI1 promoter.

E69. The method of E67, wherein the promoter is the MYO15 promoter.

E70. The method of any one of E67-E69, wherein the polynucleotide encodes Atoh1, Pou4f3, Gfi1, Isl1, Clrn1, Pcdh15, Cdh23, Otoferlin (Otof), Solute Carrier Family 17 Member 8 (Vglut3), Strc, Chrna9, Chrna10, Ocm, Tmc1, Myo7a, Ush1c, Whirlin (Whrn), Bdnf, Ntf3, Tmtc4, or a nuclease (e.g., Cas9, TALEN, ZFN, or gRNA), or is a microRNA (e.g., miR-183, miR-96, or miR-182).

E71. A method of expressing a polynucleotide in an inner hair cell in a primate subject, the method including administering to the subject an effective amount of an AAV1 vector including the polynucleotide operably linked to a promoter selected from the group consisting of an OTOF promoter, a Fibroblast Growth Factor 8 (FGF8) promoter, and a Solute Carrier Family 17 Member 8 (SLC17A8) promoter.

E72. The method of E71, wherein the promoter is the OTOF promoter.

E73. The method of E72 or E72, wherein the polynucleotide encodes Otof, Vglut3, Whirlin, Atoh1, Pou4f3, Gfi1, Isl1, Clrn1, Pcdh15, Cdh23, Myo7a, Tmc1, Ush1c, Bdnf, Ntf3, Tmtc4, or a nuclease (e.g., Cas9, TALEN, ZFN, or gRNA), or is a microRNA (e.g., miR-183, miR-96, or miR-182).

E74. A method of expressing a polynucleotide in a vestibular hair cell in a primate subject, the method including administering to the subject an effective amount of an AAV1 vector including the polynucleotide operably linked to a promoter selected from the group consisting of a MYO15 promoter, a GFI1 promoter, a POU4F3 promoter, a MYO7A promoter, an ATP2B2 promoter, and a CALB2 promoter.

E75. The method of E74, wherein the promoter is the MYO15 promoter.

E76. The method of E74, wherein the promoter is the ATP2B2 promoter.

E77. The method of E74, wherein the vestibular hair cell is a Type I vestibular hair cell and the promoter is the ATP2B2 promoter.

E78. The method of E74, wherein the vestibular hair cell is a Type II vestibular hair cell and the promoter is the CALB2 promoter.

E79. The method of any one of E74-E78, wherein the polynucleotide encodes Whirlin, Bdnf, Ntf3, Tmtc4, or a nuclease (e.g., Cas9, TALEN, ZFN, or gRNA), or is a microRNA (e.g., miR-183, miR-96, or miR-182).

E80. A method of expressing a polynucleotide in a pillar cell in a primate subject, the method including administering to the subject an effective amount of an AAV1 vector including the polynucleotide operably linked to a CD44 promoter or a GJB2 promoter.

E81. The method of E80, wherein the promoter is the GJB2 promoter.

E82. The method of E80 or E81, wherein the polynucleotide encodes Nerve Growth Factor Receptor (Ngfr), Bdnf, Ntf3, Tectorin Beta (Tectb), Tectorin Alpha (Tecta), Gjb2, or Gap Junction Protein Beta 6 (Gjb6).

E83. A method of expressing a polynucleotide in a spiral ganglion neuron in a primate subject, the method including administering to the subject an effective amount of an AAV1 vector including the polynucleotide operably linked to a promoter selected from the group consisting of a BHLHE22 promoter, a SYN promoter, and a CALB2 promoter.

E84. The method of E83, wherein the promoter is the SYN promoter.

E85. The method of E83, wherein the spiral ganglion neuron has a high spontaneous rate of firing and the promoter is the CALB2 promoter.

E86. The method of E83, wherein the spiral ganglion neuron is an afferent spiral ganglion neuron and the promoter is the BHLHE22 promoter.

E87. The method of any one of E83-E86, wherein the polynucleotide encodes Bdnf, Ntf3, or a nuclease (e.g., Cas9, TALEN, ZFN, or gRNA), or is a microRNA (miRNAs, e.g., miR-183, miR-96, or miR-182) or an shRNA directed to RGMA.

E88. A method of expressing a polynucleotide in a marginal cell of the stria vascularis in a primate subject, the method including administering to the subject an effective amount of an AAV1 vector including the polynucleotide operably linked to a promoter selected from the group consisting of a KCNQ1 promoter, a KCNE1 promoter, and a GJB2 promoter.

E89. The method of E88, wherein the promoter is the GJB2 promoter.

E90. A method of expressing a polynucleotide in a basal cell of the stria vascularis in a primate subject, the method including administering to the subject an effective amount of an AAV1 vector including the polynucleotide operably linked to a CLDN11 promoter or a GJB2 promoter.

E91. The method of E90, wherein the promoter is the GJB2 promoter.

E92. A method of expressing a polynucleotide in an intermediate cell of the stria vascularis in a primate subject, the method including administering to the subject an effective amount of an AAV1 vector including the polynucleotide operably linked to a promoter selected from the group consisting of a KCNJ10 promoter, a GJB2 promoter, and a TYR promoter.

E93. The method of E92, wherein the promoter is the GJB2 promoter.

E94. The method of E92, wherein the promoter is the TYR promoter.

E95. The method of any one of E90-E94, wherein the polynucleotide encodes Kcnq1, Kcne1, Tyr, Gjb2, Gjb6, or a nuclease (e.g., Cas9, TALEN, ZFN, or gRNA), or is a microRNA (e.g., miR-183, miR-96, or miR-182).

E96. A method of expressing a polynucleotide in a border cell and/or inner phalangeal cell in a primate subject, the method including administering to the subject an effective amount of an AAV1 vector including the polynucleotide operably linked to a GLAST promoter or a GJB2 promoter.

E97. The method of E96, wherein the promoter is the GJB2 promoter.

E98. The method of E96 or E97, wherein the polynucleotide encodes Bdnf, Ntf3, Tectb, Tecta, Transmembrane Protein 16A (Tmem16a), Gjb2, or Gjb6.

E99. A method of expressing a polynucleotide in a Dieters' cell in a primate subject, the method including administering to the subject an effective amount of an AAV1 vector including the polynucleotide operably linked to a FGFR3 promoter or a GJB2 promoter.

E100. The method of E99, wherein the promoter is the GJB2 promoter.

E101. The method of E99 or E100, wherein the polynucleotide encodes Bdnf, Ntf3, Tectb, Tecta, IKAROS Family Zinc Finger 2 (Ikzf2), Gjb2, or Gjb6.

E102. A method of expressing a polynucleotide in a Hensen's cell and/or Claudius cell in a primate subject, the method including administering to the subject an effective amount of an AAV1 vector including the polynucleotide operably linked to a FRZB promoter or a GJB2 promoter.

E103. The method of E102, wherein the promoter is the GJB2 promoter

E104. The method of E102 or E103, wherein the polynucleotide encodes Gjb2 or Gjb6.

E105. A method of expressing a polynucleotide in a Spiral prominence cell and/or root cell in a primate subject, the method including administering to the subject an effective amount of an AAV1 vector including the polynucleotide operably linked to a SLC26A4 promoter.

E106. The method of E105, wherein the polynucleotide is Slc26a4.

E107. A method of expressing a polynucleotide in an interdental cell in a primate subject, the method including administering to the subject an effective amount of an AAV1 vector including the polynucleotide operably linked to a CEACAM16 promoter or a GJB2 promoter.

E108. The method of E107, wherein the promoter is the GJB2 promoter

E109. The method of E107 or E108, wherein the polynucleotide encodes Ceacam16, Otoancorin (Otoa), Gjb2, or Gjb6.

E110. A method of expressing a polynucleotide in a glial cell in a primate (subject, the method including administering to the subject an effective amount of an AAV1 vector including the polynucleotide operably linked to a PMP22 promoter.

E111. The method of E110, wherein the polynucleotide encodes Pmp22, Bdnf, Ntf3, or Myelin Protein Zero (Mpz).

E112. A method of expressing a polynucleotide in a vestibular dark cell in a primate subject, the method including administering to the subject an effective amount of an AAV1 vector including the polynucleotide operably linked to a KCNE1 promoter.

E113. The method of E112, wherein the polynucleotide encodes Kcnq1, Kcne1, or Slc26a4.

E114. A method of expressing a polynucleotide in a fibrocyte in a primate (subject, the method including administering to the subject an effective amount of an AAV1 vector including the polynucleotide operably linked to a POU3F4 promoter or a GJB2 promoter.

E115. The method of E114, wherein the promoter is the GJB2 promoter

E116. The method of E114 or E115, wherein the polynucleotide encodes Gjb2, Gjb6, or a collagen.

E117. A method of expressing a polynucleotide in a Scarpa's ganglion neuron (a vestibular ganglion neuron) in a primate subject, the method including administering to the subject an effective amount of an AAV1 vector including the polynucleotide operably linked to a promoter selected from the group consisting of a TUBB3 promoter and a SYN promoter.

E118. The method of E117, wherein the promoter is the SYN promoter.

E119. The method of E117 or E118, wherein the polynucleotide encodes Bdnf or Ntf3, or is an shRNA directed to Repulsive Guidance Molecule BMP Co-Receptor A (RGMA).

E120. A method of expressing a polynucleotide in a supporting cell in a primate subject, the method including administering to the subject an effective amount of an AAV1 vector including a promoter operably linked to a polynucleotide that encodes Sox9, Sall2, Camta1, Hey2, Gata2, Hey1, Lass2, Sox10, Gata3, Cux1, Nr2f1, Hes1, Rorb, Jun, Zfp667, Lhx3, Nh1h1, Mxd4, Zmiz1, Myt1, Stat3, Barhl1, Tox, Prox1, Nfia, Thrb, Mycl1, Kdm5a, Creb314, Etv1, Peg3, Bach2, Isi1, Zbtb38, Lbh, Tub, Hmg20, Rest, Zfp827, Aff3, Pknox2, Arid3b, Mlxip, Zfp532, Ikzf2, Sall1, Six2, Sall3, Lin28b, Pou4f3, Rfx7, Atoh1, an Atoh1 variant including mutations at amino acids 328, 331, and/or 334 (e.g., S328A, S331A, S334A, S328A/S331A, S328A/S334A, S331A/S334A, and S328A/S331A/S334, e.g., a variant having the sequence of any one of SEQ ID NOs: 4-10), Gfi1, Sox4, Bdnf, Ntf3, Sox11, Tead2, Yap1, or a nuclease (e.g., Cas9, TALEN, ZFN, or gRNA), or is a microRNA (e.g., miR-183, miR-96, or miR-182).

E121. The method of E120, wherein the polynucleotide encodes Atoh1.

E122. The method of E120, wherein the polynucleotide encodes Sox4.

E123. The method of E120, wherein the polynucleotide encodes Sox11.

E124. The method of E120, wherein the polynucleotide encodes Bdnf.

E125. The method of E120, wherein the polynucleotide encodes Ntf3.

E126. The method of E120, wherein the polynucleotide encodes Tead2.

E127. The method of E120, wherein the polynucleotide encodes Yap1.

E128. The method of any one of E120-E127, wherein the promoter is selected from the group consisting of a GFAP promoter, a GLAST promoter, a HES1 promoter, a JAG1 promoter, a NOTCH1 promoter, a LGR5 promoter, a SOX2 promoter, a HES5 promoter, and a SOX9 promoter.

E129. The method of E128, wherein the promoter is the GFAP promoter.

E130. The method of E128, wherein the promoter is selected from the group consisting of the HES1 promoter, the LGR5 promoter, the SOX2 promoter, the HES5 promoter, and the SOX9 promoter.

E131. The method of any one of E120-E130, wherein the supporting cell is a vestibular supporting cell.

E132. The method of E131, wherein the vestibular supporting cell is in the utricle.

E133. The method of any one of E120-E130, wherein the supporting cell is a cochlear supporting cell and the promoter is SOX2.

E134. A method of expressing a polynucleotide in a hair cell (e.g., vestibular hair cell and/or cochlear hair cell) of the inner ear in a primate subject, the method including administering to the subject an effective amount of an AAV1 vector including a promoter operably linked to a polynucleotide that encodes Bdnf, Ntf3, Tmtc4, or a nuclease (e.g., Cas9, TALEN, ZFN, or gRNA), or is a microRNA (e.g., miR-183, miR-96, or miR-182).

E135. The method of E134, wherein the polynucleotide encodes Bdnf.

E136. The method of E134, wherein the polynucleotide encodes Ntf3.

E137. The method of E134, wherein the polynucleotide encodes Tmtc4.

E138. The method of any one of E134-E137, wherein the promoter is selected from the group consisting of a MYO15 promoter, a GFI1 promoter, a POU4F3 promoter, and a MYO7A promoter.

E139. The method of any one of E134-E138, wherein the hair cell is a cochlear hair cell.

E140. The method of E139, wherein the cochlear hair cell is an inner hair cell.

E141. The method of E139, wherein the cochlear hair cell is an outer hair cell.

E142. The method of any one of E134-E138, wherein the hair cell is a vestibular hair cell.

E143. A method of expressing a polynucleotide in an outer hair cell in a primate subject, the method including administering to the subject an effective amount of an AAV1 vector including a promoter operably linked to a polynucleotide that encodes Strc, Tmc1, Myo7a, Ush1c, Atoh1, Pou4f3, Gfi1, Isl1, Clrn1, Pcdh15, Cdh23, Chrna9, Chrna10, Ocm, Bdnf, Ntf3, Tmtc4, or a nuclease (e.g., Cas9, TALEN, ZFN, or gRNA), or is a microRNA (e.g., miR-183, miR-96, or miR-182).

E144. The method of E143, wherein the polynucleotide encodes Strc.

E145. The method of E143, wherein the polynucleotide encodes Chrna9.

E146. The method of E143, wherein the polynucleotide encodes Chrna10.

E147. The method of E143, wherein the polynucleotide encodes Ocm.

E148. The method of E143, wherein the polynucleotide encodes Tmc1.

E149. The method of E143, wherein the polynucleotide encodes Myo7a.

E150. The method of E143, wherein the polynucleotide encodes Ush1c.

E151. The method of E143, wherein the polynucleotide encodes Tmtc4.

E152. The method of any one of E143-E151, wherein the promoter is selected from the group consisting of a SLC26A5 promoter, an OCM promoter, a STRC promoter, and an ATP2B2 promoter.

E153. A method of expressing a polynucleotide in a cochlear hair cell in a primate subject, the method including administering to the subject an effective amount of an AAV1 vector including a promoter operably linked to a polynucleotide that encodes Atoh1, Pou4f3, Gfi1, Isl1, Clrn1, Pcdh15, Cdh23, Otof, Vglut3, Strc, Chrna9, Chrna10, Ocm, Tmc1, Myo7a, Ush1c, Whirlin, Bdnf, Ntf3, Tmtc4, or a nuclease (e.g., Cas9, TALEN, ZFN, or gRNA), or is a microRNA (e.g., miR-183, miR-96, or miR-182).

E154. The method of E153, wherein the polynucleotide encodes Atoh1.

E155. The method of E153, wherein the polynucleotide encodes Clrn1.

E156. The method of E153, wherein the polynucleotide encodes Otof.

E157. The method of E153, wherein the polynucleotide encodes Tmc1.

E158. The method of E153, wherein the polynucleotide encodes Ush1c.

E159. The method of E153, wherein the polynucleotide encodes Myo7a.

E160. The method of E153, wherein the polynucleotide encodes Vglut3.

E161. The method of E153, wherein the polynucleotide encodes Strc.

E162. The method of E153, wherein the polynucleotide encodes Chrna9.

E163. The method of E153, wherein the polynucleotide encodes Chrna10.

E164. The method of E153, wherein the polynucleotide encodes Tmtc4.

E165. The method of E153, wherein the polynucleotide encodes Ocm.

E166. The method of any one of E153-E165, wherein the promoter is selected from the group consisting of a MYO15 promoter, a GFI1 promoter, a POU4F3 promoter, and a MYO7a promoter.

E167. The method of E166, wherein the promoter is the GFI1 promoter.

E168. The method of E166, wherein the promoter is the MYO15 promoter.

E169. A method of expressing a polynucleotide in an inner hair cell in a primate subject, the method including administering to the subject an effective amount of an AAV1 vector including a promoter operably linked to a polynucleotide that encodes Otof, Vglut3, Whirlin, Atoh1, Pou4f3, Gfi1, Isl1, Clrn1, Pcdh14, Cdh23, Myo7a, Ush1c, Tmc1, Bdnf, Ntf3, Tmtc4, or a nuclease (e.g., Cas9, TALEN, ZFN, or gRNA), or is a microRNA (e.g., miR-183, miR-96, or miR-182).

E170. The method of E169, wherein the polynucleotide encodes Otof.

E171. The method of E169, wherein the polynucleotide encodes Atoh1.

E172. The method of E169, wherein the polynucleotide encodes Vglut3.

E173. The method of E169, wherein the polynucleotide encodes Clrn1.

E174. The method of any one of E169-E173, wherein the promoter is selected from the group consisting of an OTOF promoter, a FGF8 promoter, and a SLCI 7A8 promoter.

E175. A method of expressing a polynucleotide in a vestibular hair cell in a primate subject, the method including administering to the subject an effective amount of an AAV1 vector including a promoter operably linked to a polynucleotide that encodes Whirlin, Bdnf, Ntf3, Tmtc4, or a nuclease (e.g., Cas9, TALEN, ZFN, or gRNA), or is a microRNA (e.g., miR-183, miR-96, or miR-182).

E176. The method of E175, wherein the polynucleotide encodes Bdnf.

E177. The method of E175, wherein the polynucleotide encodes Ntf3.

E178. The method of E175, wherein the polynucleotide encodes Tmtc4.

E179. The method of any one of E175-E178, wherein the promoter is selected from the group consisting of a MYO15 promoter, a GFI1 promoter, a POU4F3 promoter, a MYO7A promoter, an ATP2B2 promoter, and a CALB2 promoter.

E180. The method of any one of E175-E179, wherein the vestibular hair cell is a Type I vestibular hair cell and the promoter is the ATP2B2.

E181. The method of any one of E175-E179, wherein the vestibular hair cell is a Type II vestibular hair cell and the promoter is the CALB2 promoter.

E182. A method of expressing a polynucleotide in a pillar cell in a primate subject, the method including administering to the subject an effective amount of an AAV1 vector including a promoter operably linked to a polynucleotide that encodes Ngfr, Bdnf, Ntf3, Tectb, Tecta, Gjb2, or Gjb6.

E183. The method of E182, wherein the polynucleotide encodes Gjb2.

E184. The method of E182 or E183, wherein the promoter is a CD44 promoter or a GJB2 promoter.

E185. A method of expressing a polynucleotide in a spiral ganglion neuron in a primate subject, the method including administering to the subject an effective amount of an AAV1 vector including a promoter operably linked to a polynucleotide that encodes Bdnf, Ntf3, or a nuclease (e.g., Cas9, TALEN, ZFN, or gRNA), or is a microRNA (e.g., miR-183, miR-96, or miR-182) or an shRNA directed to RGMA.

E186. The method of E185, wherein the polynucleotide encodes Bdnf.

E187. The method of E185, wherein the polynucleotide encodes Ntf3.

E188. The method of any one of E185-E187, wherein the promoter is selected from the group consisting of a BHLHE22 promoter, a SYN promoter, and a CALB2 promoter.

E189. The method of any one of E185-E188, wherein the spiral ganglion neuron has a high spontaneous rate of firing and the promoter is the CALB2 promoter.

E190. The method of any one of E185-E188, wherein the vestibular hair cell is an afferent spiral ganglion neuron and the promoter is the BLHLE22 promoter.

E191. A method of expressing a polynucleotide in a cell in the stria vascularis in a primate subject, the method including administering to the subject an effective amount of an AAV1 vector including a promoter operably linked to a polynucleotide that encodes Kcnq1, Kcne1, Gjb2, Gjb6, Tyr, or a nuclease (e.g., Cas9, TALEN, ZFN, or gRNA), or is a microRNA (e.g., miR-183, miR-96, or miR-182).

E192. The method of E191, wherein the polynucleotide encodes Gjb2.

E193. The method of E191, wherein the polynucleotide encodes Tyr.

E194. The method of any one of E191-E193, wherein the cell is a marginal cell of the stria vascularis and the promoter is selected from the group consisting of a KCNQ1 promoter, a GJB2 promoter, and a KCNE1 promoter.

E195. The method of any one of E191-E193, wherein the cell is a basal cell of the stria vascularis and the promoter is a CLDN11 promoter or a GJB2 promoter.

E196. The method of any one of E191-E193, wherein the cell is an intermediate cell of the stria vascularis and the promoter is selected from the group consisting of a KCNJ10 promoter, a GJB2 promoter, and a TYR promoter.

E197. A method of expressing a polynucleotide in a border cell and/or inner phalangeal cell in a primate subject, the method including administering to the subject an effective amount of an AAV1 vector including a promoter operably linked to a polynucleotide that encodes Bdnf, Ntf3, Tectb, Tecta, Tmem16a, Gjb2, or Gjb6.

E198. The method of E197, wherein the polynucleotide encodes Gjb2.

E199. The method of E197 or E196, wherein the promoter is a GLAST promoter or a GJB2 promoter.

E200. A method of expressing a polynucleotide in a Dieters' cell in a primate subject, the method including administering to the subject an effective amount of an AAV1 vector including a promoter operably linked to a polynucleotide that encodes Bdnf, Ntf3, Tectb, Tecta, Ikzf2, Gjb2, or Gjb6.

E201. The method of E200, wherein the polynucleotide encodes Gjb2.

E202. The method of E200 or E201, wherein the promoter is a FGFR3 promoter or a GJB2 promoter.

E203. A method of expressing a polynucleotide in a Hensen's cell and/or Claudius cell in a primate subject, the method including administering to the subject an effective amount of an AAV1 vector including a promoter operably linked to a polynucleotide that encodes Gjb2 or Gjb6.

E204. The method of E203, wherein the polynucleotide encodes Gjb2.

E205. The method of E203 or E204, wherein the promoter is a FRZB promoter or a GJB2 promoter.

E206. A method of expressing a polynucleotide in a Spiral prominence cell and/or root cell in a primate subject, the method including administering to the subject an effective amount of an AAV1 vector including a promoter operably linked to a polynucleotide that encodes Slc26a4.

E207. The method of E206, wherein the promoter is a SLC26A4 promoter.

E208. A method of expressing a polynucleotide in an interdental cell in a primate subject, the method including administering to the subject an effective amount of an AAV1 vector including a promoter operably linked to a polynucleotide that encodes Ceacam16, Otoa, Gjb2, or Gjb6.

E209. The method of E208, wherein the polynucleotide encodes Gjb2.

E210. The method of E208 or E209, wherein the promoter is a CEACAM16 promoter or a GJB2 promoter.

E211. A method of expressing a polynucleotide in a glial cell in a primate subject, the method including administering to the subject an effective amount of an AAV1 vector including a promoter operably linked to a polynucleotide that encodes Pmp22, Bdnf, Ntf3, or Mpz.

E212. The method of E211, wherein the polynucleotide encodes Bdnf.

E213. The method of E211, wherein the polynucleotide encodes Ntf3.

E214. The method of any one of E211-E213, wherein the promoter is a PMP22 promoter.

E215. A method of expressing a polynucleotide in a vestibular dark cell in a primate subject, the method including administering to the subject an effective amount of an AAV1 vector including a promoter operably linked to a polynucleotide that encodes Kcnq1, Kcne1, or Slc26a4.

E216. The method of E215, wherein the promoter is a KCNE1 promoter.

E217. A method of expressing a polynucleotide in a fibrocyte in a primate subject, the method including administering to the subject an effective amount of an AAV1 vector including a promoter operably linked to a polynucleotide that encodes Gjb2, Gjb6, or a collagen.

E218. The method of E217, wherein the polynucleotide encodes Gjb2.

E219. The method of E217 or E218, wherein the promoter is a POU3F4 promoter or a GJB2 promoter.

E220. A method of expressing a polynucleotide in a Scarpa's ganglion neuron (vestibular ganglion neuron) in a primate subject, the method including administering to the subject an effective amount of an AAV1 vector including a promoter operably linked to a polynucleotide encoding Bdnf or Ntf3 or to an shRNA directed to RGMA.

E221. The method of E220, wherein the polynucleotide encodes Bdnf.

E222. The method of E220, wherein the polynucleotide encodes Ntf3.

E223. The method of any one of E220-E222, wherein the promoter is selected from the group consisting of a TUBB3 promoter and a SYN promoter.

E224. A method of treating a primate subject having or at risk of developing monogenetic deafness associated with a mutation in OTOF, the method including administering to the subject an effective amount of an AAV1 vector including a promoter operably linked to a polynucleotide encoding Otof.

E225. The method of E224, wherein the promoter is selected from the group consisting of a CMV promoter, a CAG promoter, a smCBA promoter, MYO15 promoter, and an OTOF promoter.

E226. The method of E225, wherein the promoter is a MYO15 promoter or an OTOF promoter E227. A method of treating a primate subject having or at risk of developing monogenetic deafness associated with a mutation in STRC, the method including administering to the subject an effective amount of an AAV1 vector including a promoter operably linked to a polynucleotide encoding Strc.

E228. The method of E227, wherein the promoter is selected from the group consisting of a CMV promoter, a CAG promoter, a smCBA promoter, MYO15 promoter, a SLC26A5 promoter, an OCM promoter, and an ATP2B2 promoter.

E229. The method of E228, wherein the promoter is selected from the group including a MYO15 promoter, a SLC26A5 promoter, an OCM promoter, and an ATP2B2 promoter.

E230. A method of treating a primate subject having or at risk of developing aminoglycoside-induced bilateral vestibular hypofunction, the method including administering to the subject an effective amount of an AAV1 vector including a promoter operably linked to a polynucleotide encoding Atoh1.

E231. A method of treating a primate subject having or at risk of developing bilateral vestibular hypofunction, the method including administering to the subject an effective amount of an AAV1 vector including a promoter operably linked to a polynucleotide encoding Atoh1.

E232. A method of treating a primate subject having or at risk of developing age-related vestibular disorder, the method including administering to the subject an effective amount of an AAV1 vector including a promoter operably linked to a polynucleotide encoding Atoh1.

E233. A method of treating a primate subject having or at risk of developing a vestibular disorder, the method including administering to the subject an effective amount of an AAV1 vector including a promoter operably linked to a polynucleotide encoding Atoh1.

E234. A method of treating a primate subject having or at risk of developing hearing loss, the method including administering to the subject an effective amount of an AAV1 vector including a promoter operably linked to a polynucleotide encoding Atoh1.

E235. The method of any one of E230-E234, wherein the promoter is a selected from the group consisting of a CMV promoter, a CAG promoter, a smCBA promoter, and GFAP promoter.

E236. The method of E235, wherein the promoter is a GFAP promoter.

E237. A method of treating a primate subject having or at risk of developing monogenetic deafness associated with a mutation in GJB2, the method including administering to the subject an effective amount of an AAV1 vector including a promoter operably linked to a polynucleotide encoding Gjb2.

E238. A method of treating a primate subject having or at risk of developing age-related hearing loss associated with a mutation in GJB2, the method including administering to the subject an effective amount of an AAV1 vector including a promoter operably linked to a polynucleotide encoding Gjb2.

E239. The method of E237 or E238, wherein the promoter is selected from the group consisting of a CMV promoter, a CAG promoter, a smCBA promoter, and a GJB2 promoter.

E240. The method of E239, wherein the promoter is the GJB2 promoter.

E241. A method of treating a primate subject having or at risk of developing monogenetic deafness associated with a mutation in SLC17A8, the method including administering to the subject an effective amount of an AAV1 vector including a promoter operably linked to a polynucleotide encoding Slc17a8.

E242. The method of E241, wherein the promoter is selected from the group consisting of a CMV promoter, a CAG promoter, a smCBA promoter, MYO15 promoter, and an OTOF promoter.

E243. The method of E242, wherein the promoter is the MYO15 promoter or the OTOF promoter.

E244. A method of treating a primate subject having or at risk of developing monogenetic deafness associated with a mutation in TMC1, the method including administering to the subject an effective amount of an AAV1 vector including a promoter operably linked to a polynucleotide encoding Tmc1.

E245. The method of E244, wherein the promoter is selected from the group consisting of a CMV promoter, a CAG promoter, and a smCBA promoter.

E246. The method of E244, wherein the promoter is a MYO15 promoter.

E247. A method of treating a primate subject having or at risk of developing hearing loss, the method including administering to the subject an effective amount of an AAV1 vector including a promoter operably linked to a polynucleotide encoding Ntf3.

E248. A method of treating a primate subject having or at risk of developing tinnitus, the method including administering to the subject an effective amount of an AAV1 vector including a promoter operably linked to a polynucleotide encoding Ntf3.

E249. A method of treating a primate subject having or at risk of developing difficulty understanding speech-in-noise, the method including administering to the subject an effective amount of an AAV1 vector including a promoter operably linked to a polynucleotide encoding Ntf3.

E250. A method of treating a primate subject having or at risk of developing Charcot-Marie-Tooth disease, the method including administering to the subject an effective amount of an AAV1 vector including a promoter operably linked to a polynucleotide encoding Ntf3.

E251. A method of treating a primate subject having or at risk of developing Friedreich's ataxia, the method including administering to the subject an effective amount of an AAV1 vector including a promoter operably linked to a polynucleotide encoding Ntf3.

E252. The method of any one of E247-E251, wherein the promoter is a SYN promoter.

E253. The method of any one of E247-E251, wherein the promoter is selected from the group consisting of a CMV promoter, a CAG promoter, and a smCBA promoter.

E254. A method of treating a primate subject having or at risk of developing hearing loss, the method including administering to the subject an effective amount of an AAV1 vector including a promoter operably linked to a polynucleotide encoding Bdnf.

E255. A method of treating a primate subject having or at risk of developing tinnitus, the method including administering to the subject an effective amount of an AAV1 vector including a promoter operably linked to a polynucleotide encoding Bdnf.

E256. A method of treating a primate subject having or at risk of developing difficulty understanding speech-in-noise, the method including administering to the subject an effective amount of an AAV1 vector including a promoter operably linked to a polynucleotide encoding Bdnf.

E257. A method of treating a primate subject having or at risk of developing Charcot-Marie-Tooth disease, the method including administering to the subject an effective amount of an AAV1 vector including a promoter operably linked to a polynucleotide encoding Bdnf.

E258. A method of treating a primate subject having or at risk of developing Friedreich's ataxia, the method including administering to the subject an effective amount of an AAV1 vector including a promoter operably linked to a polynucleotide encoding Bdnf.

E259. The method of any one of E254-E258, wherein the promoter is a SYN promoter.

E260. The method of any one of E254-E258, wherein the promoter is selected from the group consisting of a CMV promoter, a CAG promoter, and a smCBA promoter.

E261. A method of treating a primate subject having or at risk of developing bilateral vestibular hypofunction, the method including administering to the subject an effective amount of an AAV1 vector including a promoter operably linked to a polynucleotide encoding Sox4.

E262. A method of treating a primate subject having or at risk of developing age-related vestibular disorder, the method including administering to the subject an effective amount of an AAV1 vector including a promoter operably linked to a polynucleotide encoding Sox4.

E263. A method of treating a primate subject having or at risk of developing a vestibular disorder, the method including administering to the subject an effective amount of an AAV1 vector including a promoter operably linked to a polynucleotide encoding Sox4.

E264. A method of treating a primate subject having or at risk of developing hearing loss, the method including administering to the subject an effective amount of an AAV1 vector including a promoter operably linked to a polynucleotide encoding Sox4.

E265. The method of any one of E261-E264, wherein the promoter is a GFAP promoter.

E266. The method of any one of E261-E264, wherein the promoter is selected from the group consisting of a CMV promoter, a CAG promoter, and a smCBA promoter.

E267. A method of treating a primate subject having or at risk of developing bilateral vestibular hypofunction, the method including administering to the subject an effective amount of an AAV1 vector including a promoter operably linked to a polynucleotide encoding Sox11.

E268. A method of treating a primate subject having or at risk of developing age-related vestibular disorder, the method including administering to the subject an effective amount of an AAV1 vector including a promoter operably linked to a polynucleotide encoding Sox11.

E269. A method of treating a primate subject having or at risk of developing a vestibular disorder, the method including administering to the subject an effective amount of an AAV1 vector including a promoter operably linked to a polynucleotide encoding Sox11.

E270. A method of treating a primate subject having or at risk of developing hearing loss, the method including administering to the subject an effective amount of an AAV1 vector including a promoter operably linked to a polynucleotide encoding Sox11.

E271. The method of any one of E267-E270, wherein the promoter is a GFAP promoter.

E272. The method of any one of E267-E270, wherein the promoter is selected from the group consisting of a CMV promoter, a CAG promoter, and a smCBA promoter.

E273. A method of treating a primate subject having or at risk of developing monogenetic deafness associated with a mutation in USH1C, to the subject an effective amount of an AAV1 vector including a promoter operably linked to a polynucleotide encoding Ush1c.

E274. The method of E273, wherein the promoter is a MYO15 promoter.

E275. The method of E273, wherein the promoter is selected from the group consisting of a CMV promoter, a CAG promoter, and a smCBA promoter.

E276. A method of treating a primate subject having or at risk of developing monogenetic deafness associated with a mutation in MYO7A, to the subject an effective amount of an AAV1 vector including a promoter operably linked to a polynucleotide encoding Myo7a.

E277. The method of E276, wherein the promoter is the MYO15 promoter.

E278. The method of E276, wherein the promoter is selected from the group consisting of a CMV promoter, a CAG promoter, and a smCBA promoter.

E279. A method of treating a primate subject having or at risk of developing monogenetic deafness associated with a mutation in CLRN1, to the subject an effective amount of an AAV1 vector including a promoter operably linked to a polynucleotide encoding Clrn1.

E280. The method of E279, wherein the promoter is the MYO15 promoter.

E281. The method of E279, wherein the promoter is selected from the group consisting of a CMV promoter, a CAG promoter, and a smCBA promoter.

E282. A method of treating a primate subject having or at risk of developing vestibular dysfunction, the method including administering to the subject an effective amount of an AAV1 vector including a promoter operably linked to a polynucleotide.

E283. The method of E282, wherein the promoter is a supporting cell promoter, Scarpa's ganglion promoter, vestibular hair cell promoter, or vestibular supporting cell promoter listed in Table 5.

E284. The method of E283, wherein the promoter is MYO15.

E285. The method of any one of E282-E284, wherein the AAV1 vector includes a polynucleotide for expression in vestibular and cochlear hair cells, cochlear and vestibular supporting cells, or Scarpa's ganglion selected from the list in Table 2.

E286. The method of any one of E282-E285, wherein the polynucleotide encodes Whirlin, Sox9, Sall2, Camta1, Hey2, Gata2, Hey1, Lass2, Sox10, Gata3, Cux1, Nr2f1, Hes1, Rorb, Jun, Zfp667, Lhx3, Nh1h1, Mxd4, Zmiz1, Myt1, Stat3, Barhl1, Tox, Prox1, Nfia, Thrb, Mycl1, Kdm5a, Creb314, Etv1, Peg3, Bach2, Isl1, Zbtb38, Lbh, Tub, Hmg20, Rest, Zfp827, Aff3, Pknox2, Arid3b, Mlxip, Zfp532, Ikzf2, Sall1, Six2, Sall3, Lin28b, Pou4f3, Rfx7, Atoh1, an Atoh1 variant including mutations at amino acids 328, 331, and/or 334 (e.g., S328A, S331A, S334A, S328A/S331A, S328A/S334A, S331A/S334A, and S328A/S331A/S334A, e.g., a variant having the sequence of any one of SEQ ID NOs: 4-10), Gfi1, Sox4, Bdnf, Ntf3, Tead2, Yap1, Tmtc4, Sox11, or a nuclease (e.g., Cas9, TALEN, ZFN, or gRNA), or is a microRNA (e.g., miR-183, miR-96, or miR-182).

E287. The method of any one of E282-E286, wherein the vestibular dysfunction is vertigo, dizziness, or imbalance.

E288. A method of treating a primate subject having or at risk of developing hearing loss (e.g., sensorineural hearing loss, deafness, or auditory neuropathy) by administering to the subject an effective amount of an AAV1 vector including a promoter operably linked to a polynucleotide.

E289. The method of E288, wherein the promoter is an IHC promoter, an OHC promoter, a supporting cell promoter, a cochlear supporting cell subtype promoter, a cochlear hair cell promoter, or an SGN promoter listed in Table 5.

E290. The method of E288 or E289, wherein the AAV1 vector includes a polynucleotide for expression in IHCs, OHCs, cochlear hair cells, vestibular and cochlear hair cells, cochlear and vestibular supporting cells, a cochlear supporting cell subtype, or spiral ganglion neurons selected from the list in Table 2.

E291. The method of any one of E224-E290, wherein the hearing loss, deafness, vestibular disorder, vestibular dysfunction, or vestibular hypofunction is associated with loss of hair cells (e.g., cochlear and/or vestibular hair cells.)

E292. A method of promoting hair cell regeneration in a primate subject in need thereof by administering to the subject an effective amount of an AAV1 vector including a promoter operably linked to a polynucleotide.

E293. The method of E292, wherein the promoter is a supporting cell promoter, a vestibular supporting cell promoter, or a cochlear supporting cell subtype promoter listed in Table 5.

E294. The method of E292 or E293, wherein the AAV1 vector contains a polynucleotide for expression in IHCs, OHCs, cochlear hair cells, vestibular and cochlear hair cells, a cochlear supporting cell subtype, or cochlear and vestibular supporting cells selected from the list in Table 2.

E295. A method of increasing the number of supporting cells (e.g., cochlear and/or vestibular supporting cells, e.g., increasing supporting cell proliferation) in a primate subject in need thereof by administering to the subject an effective amount of an AAV1 vector including a promoter operably linked to a polynucleotide.

E296. The method of E295, wherein the promoter is a supporting cell promoter, a cochlear supporting cell subtype promoter, or vestibular supporting cell promoter listed in Table 5.

E297. The method of E295 or E296, wherein the AAV1 vector contains a polynucleotide for expression in cochlear and vestibular supporting cells or a cochlear supporting cell subtype selected from the list in Table 2.

E298. A method of preventing or reducing inner ear cell damage or death in a primate subject in need thereof by administering to the subject an effective amount of an AAV1 vector of the invention or a composition of the invention.

E299. The method of E298, wherein the inner ear cell damage or death is ototoxic drug-induced damage or death.

E300. The method of E299, wherein the ototoxic drug is selected from the group including aminoglycosides (e.g., gentamycin, neomycin, streptomycin, tobramycin, kanamycin, vancomycin, and amikacin), antineoplastic drugs (e.g., platinum-containing chemotherapeutic agents, such as cisplatin, carboplatin, and oxaliplatin), ethacrynic acid, furosemide, salicylates (e.g., aspirin, particularly at high doses), and quinine.

E301. The method of E298, wherein the inner ear cell damage or death is due to acoustic trauma, disease or infection, head trauma, or aging.

E302. A method of treating a primate subject having or at risk of developing tinnitus by administering to the subject an effective amount of an AAV1 vector of the invention or a composition of the invention.

E303. A method of increasing inner ear cell survival in a primate subject in need thereof by administering to the subject an effective amount of an AAV1 vector of the invention or a composition of the invention.

E304. The method of any one of E1-E303, wherein the AAV1 vector is locally administered to the middle or inner ear of the subject.

E305. The method of E304, wherein the AAV1 vector is administered transtympanically or intratympanically.

E306. The method of E304, wherein the AAV1 vector is administered into the perilymph.

E307. The method of E304, wherein the AAV1 vector is administered into the endolymph.

E308. The method of E304, wherein the AAV1 vector is administered to or through the oval window.

E309. The method of E304, wherein the AAV1 vector is administered to or through the round window.

E310. The method of E304, wherein the AAV1 vector is administered to the endolymphatic sac.

E311. The method of E304, wherein the AAV1 vector is administered to or through the semicircular canal.

E312. The method of any one of E1-E311, wherein the AAV1 vector includes inverted terminal repeat sequences (ITRs) from a serotype 2 adeno-associated virus (AAV2) vector.

E313. The method of any one of E1-E312, wherein the AAV1 vector includes a wild-type AAV1 capsid (e.g., wherein the AAV1 vector contains capsid proteins having the amino acid sequences of SEQ ID NOs: 1-3).

E314. The method of any one of E1-E313, wherein the AAV1 vector has a titer of about $1\times10^9$ vector genomes (VG)/mL to $1\times10^{15}$ VG/mL (e.g., $1\times10^9$ VG/mL, $2\times10^9$ VG/mL, $3\times10^9$ VG/mL, $4\times10^9$ VG/mL, $5\times10^9$ VG/mL, $6\times10^9$ VG/mL, $7\times10^9$ VG/mL, $8\times10^9$ VG/mL, $9\times10^9$ VG/mL, $1\times10^{10}$ VG/mL, $2\times10^{10}$ VG/mL, $3\times10^{10}$ VG/mL, $4\times10^{10}$ VG/mL, $5\times10^{10}$ VG/mL, $6\times10^{10}$ VG/mL, $7\times10^{10}$ VG/mL, $8\times10^{10}$ VG/mL, $9\times10^{10}$ VG/mL, $1\times10^{11}$ VG/mL, $2\times10^{11}$ VG/mL, $3\times10^{11}$ VG/mL, $4\times10^{11}$ VG/mL, $5\times10^{11}$ VG/mL, $6\times10^{11}$ VG/mL, $7\times10^{11}$ VG/mL, $8\times10^{11}$ VG/mL, $9\times10^{11}$ VG/mL, $1\times10^{12}$ VG/mL, $2\times10^{12}$ VG/mL, $3\times10^{12}$ VG/mL, $4\times10^{12}$ VG/mL, $5\times10^{12}$ VG/mL, $6\times10^{12}$ VG/mL, $7\times10^{12}$ VG/mL, $8\times10^{12}$ VG/mL, $9\times10^{12}$ VG/mL, $1\times10^{13}$ VG/mL, $2\times10^{13}$ VG/mL, $3\times10^{13}$ VG/mL, $4\times10^{13}$ VG/mL, $5\times10^{13}$ VG/mL, $6\times10^{13}$ VG/mL, $7\times10^{13}$ VG/mL, $8\times10^{13}$ VG/mL, $9\times10^{13}$ VG/mL, $1\times10^{14}$ VG/mL, $2\times10^{14}$ VG/mL, $3\times10^{14}$ VG/mL, $4\times10^{14}$ VG/mL, $5\times10^{14}$ VG/mL, $6\times10^{14}$ VG/mL, $7\times10^{14}$ VG/mL, $8\times10^{14}$ VG/mL, $9\times10^{14}$ VG/mL, or $1\times10^{15}$ VG/mL) and is administered in a volume of 1 μL to 200 μL (e.g., 1, 2, 3, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, or 200 μL).

E315. The method of E1-E314, wherein the AAV1 vector is administered at a dose of $1\times10^7$ VG/ear to $2\times10^{14}$ VG/ear (e.g., $1\times10^7$ VG/ear, $2\times10^7$ VG/ear, $3\times10^7$ VG/ear, $4\times10^7$ VG/ear, $5\times10^7$ VG/ear, $6\times10^7$ VG/ear, $7\times10^7$ VG/ear, $8\times10^7$ VG/ear, $9\times10^7$ VG/ear, $1\times10^8$ VG/ear, $2\times10^8$ VG/ear, $3\times10^8$ VG/ear, $4\times10^8$ VG/ear, $5\times10^8$ VG/ear, $6\times10^8$ VG/ear, $7\times10^8$ VG/ear, $8\times10^8$ VG/ear, $9\times10^8$ VG/ear, $1\times10^9$ VG/ear, $2\times10^9$ VG/ear, $3\times10^9$ VG/ear, $4\times10^9$ VG/ear, $5\times10^9$ VG/ear, $6\times10^9$ VG/ear, $7\times10^9$ VG/ear, $8\times10^9$ VG/ear, $9\times10^9$ VG/ear, $1\times10^{10}$ VG/ear, $2\times10^{10}$ VG/ear, $3\times10^{10}$ VG/ear, $4\times10^{10}$ VG/ear, $5\times10^{10}$ VG/ear, $6\times10^{10}$ VG/ear, $7\times10^{10}$ VG/ear, $8\times10^{10}$ VG/ear, $9\times10^{10}$ VG/ear, $1\times10^{11}$ VG/ear, $2\times10^{11}$ VG/ear, $3\times10^{11}$ VG/ear, $4\times10^{11}$ VG/ear, $5\times10^{11}$ VG/ear, $6\times10^{11}$ VG/ear, $7\times10^{11}$ VG/ear, $8\times10^{11}$ VG/ear, $9\times10^{11}$ VG/ear, $1\times10^{12}$ VG/ear, $2\times10^{12}$ VG/ear, $3\times10^{12}$ VG/ear, $4\times10^{12}$ VG/ear, $5\times10^{12}$ VG/ear, $6\times10^{12}$ VG/ear, $7\times10^{12}$ VG/ear, $8\times10^{12}$ VG/ear, $9\times10^{12}$ VG/ear, $1\times10^{13}$ VG/ear, $2\times10^{13}$ VG/ear, $3\times10^{13}$ VG/ear, $4\times10^{13}$ VG/ear, $5\times10^{13}$ VG/ear, $6\times10^{13}$ VG/ear, $7\times10^{13}$ VG/ear, $8\times10^{13}$ VG/ear, $9\times10^{13}$ VG/ear, $1\times10^{14}$ VG/ear, or $2\times10^{14}$ VG/ear).

E316. The method of any one of E1-E315, wherein the primate is a human.

E317. The method of any one of E1-E316, wherein the subject is an adult.

E318. The method of any one of E1-E316, wherein the subject is an adolescent.

E319. The method of any one of E1-E316, wherein the subject is a child.

E320. The method of any one of E1-E316, wherein the subject is an infant or a term newborn.

E321. The method of any one of E55-E57 and E134-E138, wherein the hair cell is a cochlear hair cell.

E322. The method of E321, wherein the cochlear hair cell is an IHC.

E323. The method of E321, wherein the cochlear hair cell is an OHC.

E324. The method of any one of E55-E57 and E134-E138, wherein the hair cell is a vestibular hair cell.

E325. The method of any one of E48-E51 and E120-E130, wherein the supporting cell is a vestibular supporting cell.

E326. The method of any one of E48-E51 and E120-E130, wherein the supporting cell is a cochlear supporting cell (e.g., a Hensen's cell, Deiters' cell, pillar cell; inner phalangeal cell; and/or border cell).

E327. The method of any one of E1-E326, wherein the method further includes evaluating the hearing of the subject prior to administering the AAV1 vector or composition (e.g., evaluating hearing using standard tests, such as audiometry, auditory brainstem response (ABR), electrochocleography (ECOG), or otoacoustic emissions).

E328. The method of any one of E1-E327, wherein the method further includes evaluating the hearing of the subject after administering the AAV1 vector or composition (e.g., evaluating hearing using standard tests, such as audiometry, ABR, ECOG, or otoacoustic emissions).

E329. The method of any one of E1-E328, wherein the method further includes evaluating the vestibular function of the subject prior to administering the AAV1 vector or composition (e.g., evaluating vestibular function using standard tests, such as electronystagmogram (ENG) or videonystagmogram (VNG), posturography, rotary-chair testing, ECOG, vestibular evoked myogenic potentials (VEMP), or specialized clinical balance tests).

E330. The method of any one of E1-E329, wherein the method further includes evaluating the vestibular function of the subject after administering the AAV1 vector or composition (e.g., evaluating vestibular function using standard tests, such as ENG or VNG, posturography, rotary-chair testing, ECOG, VEMP, or specialized clinical balance tests).

E331. The method of any one of E1-E330, wherein the AAV1 vector or composition is administered in an amount sufficient to prevent or reduce hearing loss, prevent or reduce vestibular dysfunction, prevent or reduce tinnitus, delay the development of hearing loss, delay the development of vestibular dysfunction, slow the progression of hearing loss, slow the progression of vestibular dysfunction, improve hearing, improve vestibular function (e.g., improve balance or reduce dizziness or vertigo), promote or induce inner ear cell regeneration (e.g., regeneration of cochlear hair cells, vestibular hair cells, or spiral ganglion neurons), increase hair cell numbers (e.g., IHC, OHC, and/or vestibular hair cell numbers), increase SGN numbers, increase supporting cell numbers (e.g., cochlear and/or vestibular supporting cells, e.g., increase supporting cell proliferation), increase the differentiation of supporting cells into hair cells (e.g., induce cochlear supporting cell differentiation into IHCs and/or OHCs, and/or induce vestibular supporting cell differentiation into vestibular hair cells), prevent or reduce inner ear cell damage or death (e.g., IHC, OHC, SGN, cochlear supporting cell, vestibular supporting cell, and/or vestibular hair cell damage or death), promote or increase inner ear cell development, promote or increase inner ear cell survival (e.g., increase survival of damaged inner ear cells, promote repair of damaged inner ear cells, or preserve inner cells in a subject at risk of damage to, or degeneration or loss of inner ear cells), improve inner ear cell function, preserve ribbon synapses, promote or increase ribbon synapse formation, maintain the connections (e.g., synaptic connections) between hair cells and neurons (e.g., SGNs and/or vestibular ganglion neurons), or increase or restore the connections (e.g., synaptic connections) between hair cells and neurons (e.g., SGNs and/or vestibular ganglion neurons).

E332. The method of any one of E1-E331, wherein the subject has or is at risk of developing hearing loss (e.g., sensorineural hearing loss, deafness, or auditory neuropathy).

E333. The method of any one of E1-E332, wherein the subject has or is at risk of developing vestibular dysfunction (e.g., dizziness, vertigo, or imbalance).

E334. The method of any one of E1-E333, wherein the subject has been previously diagnosed as having vestibular dysfunction (e.g., dizziness, vertigo, or imbalance).

E335. The method of any one of E1-E334, wherein the subject has been previously diagnosed as having hearing loss (e.g., sensorineural hearing loss, deafness, or auditory neuropathy).

E336. The method of any one of E234-E236, E238, E247, E254, E264, E270, E288-E291, and E331-E335, wherein the hearing loss is genetic hearing loss.

E337. The method of E336, wherein the genetic hearing loss is autosomal dominant hearing loss, autosomal recessive hearing loss, or X-linked hearing loss.

E338. The method of any one of E234-E236, E238, E247, E254, E264, E270, E288-E291, and E331-E335, wherein the hearing loss is acquired hearing loss.

E339. The method of E338, wherein the acquired hearing loss is noise-induced hearing loss, age-related hearing loss, disease or infection-related hearing loss, head trauma-related hearing loss, or ototoxic drug-induced hearing loss.

E340. The method of E339, wherein the acquired hearing loss is age-related hearing loss.

E341. The method of any one of E339, wherein the hearing loss is noise-induced hearing loss.

E342. The method of E339, wherein the hearing loss is ototoxic drug-induced hearing loss.

E343. An AAV1 vector including a polynucleotide operably linked to a promoter selected from the list of promoters in Table 5.

E344. The AAV1 vector of E343, wherein the promoter is a GFAP promoter.

E345. The AAV1 vector of E343, wherein the promoter is a SYN promoter.

E346. The AAV1 vector of E343, wherein the promoter is selected from the group consisting of a SLC26A5 promoter, an OCM promoter, a STRC promoter, a MYO15 promoter, an OTOF promoter, a SLC17A8 promoter, a FGF8 promoter, a JAG1 promoter, a NOTCH1 promoter, a MYO7A promoter, a GLAST promoter, a POU4F3 promoter, a GFI1 promoter, a KCNQ1 promoter, a KCNJ10 promoter, a TYR promoter, a SOX2 promoter, a CALB2 promoter, a BHLHE22 promoter, a LGR5 promoter, a HES1 promoter, a HES5 promoter, a SOX9 promoter, an ATP2B2 promoter, a CD44 promoter, a FGFR3 promoter, a FRZB promoter, a SLC26A4 promoter, a CEACAM16 promoter, a CLDN11 promoter, a PMP22 promoter, a KCNE1 promoter, a POU3F4 promoter, a GJB2 promoter, and a TUBB3 promoter.

E347. The AAV1 vector of E346, wherein the promoter is the SLC26A5 promoter.

E348. The AAV1 vector of E346, wherein the promoter is the OCM promoter.

E349. The AAV1 vector of E346, wherein the promoter is the OTOF promoter.

E350. The AAV1 vector of E346, wherein the promoter is the MYO15 promoter.

E351. The AAV1 vector of E346, wherein the promoter is the ATP2B2 promoter.

E352. The AAV1 vector of E346, wherein the promoter is the GJB2 promoter.

E353. The AAV1 vector of E346, wherein the promoter is the TYR promoter.

E354. The AAV1 vector of any one of E343-E353, wherein the polynucleotide is selected from the polynucleotides listed in Table 2.

E355. The AAV1 vector of E354, wherein the polynucleotide encodes Otof.

E356. The AAV1 vector of E354, wherein the polynucleotide encodes Strc.

E357. The AAV1 vector of E354, wherein the polynucleotide encodes Atoh1.

E358. The AAV1 vector of E354, wherein the polynucleotide encodes Gjb2.

E359. The AAV1 vector of E354, wherein the polynucleotide encodes Slc17a8.

E360. The AAV1 vector of E354, wherein the polynucleotide encodes Tmc1.

E361. The AAV1 vector of E354, wherein the polynucleotide encodes Ntf3.

E362. The AAV1 vector of E354, wherein the polynucleotide encodes Bdnf.

E363. The AAV1 vector of E354, wherein the polynucleotide encodes Sox4.

E364. The AAV1 vector of E354, wherein the polynucleotide encodes Sox11.

E365. The AAV1 vector of E354, wherein the polynucleotide encodes Ush1c.

E366. The AAV1 vector of E354, wherein the polynucleotide encodes Myo7a.

E367. The AAV1 vector of E354, wherein the polynucleotide encodes Clrn1.

E368. The AAV1 vector of E354, wherein the polynucleotide encodes Chrna9.

E369. The AAV1 vector of E354, wherein the polynucleotide encodes Chrna10.

E370. The AAV1 vector of E354, wherein the polynucleotide encodes Tmtc4.

E371. The AAV1 vector of E354, wherein the polynucleotide encodes Ocm.

E372. The AAV1 vector of E354, wherein the polynucleotide encodes Tyr.

E373. The AAV1 vector of E354, wherein the polynucleotide encodes Tead2.

E374. The AAV1 vector of E354, wherein the polynucleotide encodes Yap1.

E375. An AAV1 vector including a promoter operably linked to a polynucleotide selected from the polynucleotides listed in Table 2.

E376. The AAV1 vector of E375, wherein the polynucleotide encodes Otof.

E377. The AAV1 vector of E375, wherein the polynucleotide encodes Strc.

E378. The AAV1 vector of E375, wherein the polynucleotide encodes Atoh1.

E379. The AAV1 vector of E375, wherein the polynucleotide encodes Gjb2.

E380. The AAV1 vector of E375, wherein the polynucleotide encodes Slc17a8.

E381. The AAV1 vector of E375, wherein the polynucleotide encodes Tmc1.

E382. The AAV1 vector of E375, wherein the polynucleotide encodes Ntf3.

E383. The AAV1 vector of E375, wherein the polynucleotide encodes Bdnf.

E384. The AAV1 vector of E375, wherein the polynucleotide encodes Sox4.

E385. The AAV1 vector of E375, wherein the polynucleotide encodes Sox11.

E386. The AAV1 vector of E375, wherein the polynucleotide encodes Ush1c.

E387. The AAV1 vector of E375, wherein the polynucleotide encodes Myo7a.

E388. The AAV1 vector of E375, wherein the polynucleotide encodes Clrn1.

E389. The AAV1 vector of E375, wherein the polynucleotide encodes Chrna9.

E390. The AAV1 vector of E375, wherein the polynucleotide encodes Chrna10.

E391. The AAV1 vector of E375, wherein the polynucleotide encodes Tmtc4.

E392. The AAV1 vector of E375, wherein the polynucleotide encodes Ocm.

E393. The AAV1 vector of E375, wherein the polynucleotide encodes Tyr.

E394. The AAV1 vector of E375, wherein the polynucleotide encodes Tead2.

E395. The AAV1 vector of E375, wherein the polynucleotide encodes Yap1.

E396. The AAV1 vector of any one of E375-E395, wherein the promoter is selected from the list of promoters in Table 5.

E397. The AAV1 vector of E396, wherein the promoter is a GFAP promoter.

E398. The AAV1 vector of E396, wherein the promoter is a SYN promoter.

E399. The AAV1 vector of E396, wherein the promoter is selected from the group consisting of a SLC26A5 promoter, an OCM promoter, a STRC promoter, a MYO15 promoter, an OTOF promoter, a SLC17A8 promoter, a FGF8 promoter, a JAG1 promoter, a NOTCH1 promoter, a MYO7A promoter, a GLAST promoter, a POU4F3 promoter, a GFI1 promoter, a KCNQ1 promoter, a KCNJ10 promoter, a TYR promoter, a SOX2 promoter, a CALB2 promoter, a BHLHE22 promoter, a LGR5 promoter, a HES1 promoter, a HES5 promoter, a SOX9 promoter, a ATP2B2 promoter, a CD44 promoter, a FGFR3 promoter, a FRZB promoter, a SLC26A4 promoter, a CEACAM16 promoter, a CLDN11 promoter, a PMP22 promoter, a KCNE1 promoter, a POU3F4 promoter, a GJB2 promoter, and a TUBB3 promoter.

E400. The AAV1 vector of E399, wherein the promoter is the SLC26A5 promoter.

E401. The AAV1 vector of E399, wherein the promoter is the OCM promoter.

E402. The AAV1 vector of E399, wherein the promoter is the OTOF promoter.

E403. The AAV1 vector of E399, wherein the promoter is the MYO15 promoter.

E404. The AAV1 vector of E399, wherein the promoter is the ATP2B2 promoter.

E405. The AAV1 vector of E399, wherein the promoter is the GJB2 promoter.

E406. The AAV1 vector of E399, wherein the promoter is the TYR promoter.

E407. The AAV1 vector of any one of E343-E406, wherein the AAV1 vector includes AAV2 ITRs.

E408. The AAV1 vector of any one of E343-E407, wherein the AAV1 vector includes a wild-type AAV1 capsid (e.g., wherein the AAV1 vector contains capsid proteins having the amino acid sequences of SEQ ID NOs: 1-3).

E409. A pharmaceutical composition including the AAV1 vector of any one of E343-E408.

E410. The pharmaceutical composition of E409, further comprising a pharmaceutically acceptable excipient.

E411. The pharmaceutical composition of E409 or E410, wherein the pharmaceutical composition is formulated for local administration to the inner or middle ear.

E412. A kit containing an AAV1 vector of any one of E343-E408 or a pharmaceutical composition of any one of E409-E411.

These and other aspects of the present invention will be apparent to those or ordinary skill in the art in the following description, claims, and drawings.

Definitions

As used herein, the term "about" refers to a value that is within 10% above or below the value being described.

As used herein, "administration" refers to providing or giving a subject a therapeutic agent (e.g., an AAV1 vector described herein), by any effective route. Exemplary routes of administration are described herein below.

As used herein, the terms "adeno-associated virus serotype 1 vector" and "AAV1 vector" refer to adeno-associated virus vectors having an AAV1 capsid. The terms "adeno-associated virus serotype 1 vector" and "AAV1 vector" are used interchangeably herein and refer not only to AAV vectors having wild-type AAV1 capsid proteins (VP1, VP2, and VP3), but also to AAV vectors having AAV1 capsid proteins with sequence modifications with the broad tropism of wild-type AAV1 in the primate inner ear. AAV1 vectors that can be used in the compositions and methods described herein include those that have AAV1 capsid proteins having amino acid sequences that are at least 90% identical to the amino acid sequences of wild-type AAV1 capsid proteins VP1, VP2, and VP3 (e.g., 90%, 91%, 92%, 93%, 94%, 95%, 96%, 97%, 98%, 99%, 99.1%, 99.2%, 99.3%, 99.4%, 99.5%, 99.6%, 99.7%, 99.8%, 99.9%, or 100% identical to the amino acid sequences of wild-type AAV1 capsid proteins VP1, VP2, and VP3), as well as those that have AAV1 capsid proteins having one or more conservative amino acid substitutions (e.g., up to 5, up to 10, up to 15, up to 20, up to 25, up to 30, up to 35, up to 40, up to 45, or up to 50 conservative amino acid substitutions) and/or one or more nonconservative amino acid substitutions (e.g., up to 5, up to 10, up to 15, up to 20, up to 25, up to 30, up to 35, up to 40, up to 45, or up to 50 nonconservative amino acid substitutions) relative to the amino acid sequences of wild-type AAV1 capsid proteins VP1, VP2, and VP3. The AAV1 vectors that can be used in the compositions and methods described herein do not contain all six of the following amino acid substitutions: L129F, E418D, E531 K, F584L, A598V, and N642H. AAV1 vectors that can be used in the compositions and methods described herein can have a mutation at one or more surface-exposed tyrosine residues on capsid proteins, such as Tyr252 to Phe272 (Y252F), Tyr272 to Phe272 (Y272F), Tyr444 to Phe444 (Y444F), Tyr500 to Phe500 (Y500F), Tyr700 to Phe700 (Y700F), Tyr704 to Phe704 (Y704F), Tyr730 to Phe730 (Y730F), and Tyr 733 to Phe733 (Y733F), which reduce proteosomal degradation. The capsid proteins of the AAV1 vectors used in the compositions and methods described herein can have the amino acid sequences and be encoded by the polynucleotide sequence described in U.S. Pat. No. 6,759,237, which is incorporated herein by reference. The AAV1 capsid proteins may also be modified as described in U.S. Pat. No. 7,749,492, which is incorporated herein by reference. Tropism in the inner ear can be evaluated using the methods described herein.

As used herein, the term "cell type" refers to a group of cells sharing a phenotype that is statistically separable based on gene expression data. For instance, cells of a common cell type may share similar structural and/or functional characteristics, such as similar gene activation patterns and antigen presentation profiles. Cells of a common cell type may include those that are isolated from a common tissue (e.g., epithelial tissue, neural tissue, connective tissue, or muscle tissue) and/or those that are isolated from a common organ, tissue system, blood vessel, or other structure and/or region in an organism.

As used herein, the terms "conservative mutation," "conservative substitution," and "conservative amino acid substitution" refer to a substitution of one or more amino acids for one or more different amino acids that exhibit similar physicochemical properties, such as polarity, electrostatic charge, and steric volume. These properties are summarized for each of the twenty naturally-occurring amino acids in table 1 below.

TABLE 1

Representative physicochemical properties of naturally-occurring amino acids

| Amino Acid | 3 Letter Code | 1 Letter Code | Side-chain Polarity | Electrostatic character at physiological pH (7.4) | Steric Volume[†] |
|---|---|---|---|---|---|
| Alanine | Ala | A | nonpolar | neutral | small |
| Arginine | Arg | R | polar | cationic | large |
| Asparagine | Asn | N | polar | neutral | intermediate |
| Aspartic acid | Asp | D | polar | anionic | intermediate |
| Cysteine | Cys | C | nonpolar | neutral | intermediate |
| Glutamic acid | Glu | E | polar | anionic | intermediate |
| Glutamine | Gln | Q | polar | neutral | intermediate |
| Glycine | Gly | G | nonpolar | neutral | small |
| Histidine | His | H | polar | Both neutral and cationic forms in equilibrium at pH 7.4 | large |
| Isoleucine | Ile | I | nonpolar | neutral | large |
| Leucine | Leu | L | nonpolar | neutral | large |
| Lysine | Lys | K | polar | cationic | large |
| Methionine | Met | M | nonpolar | neutral | large |
| Phenylalanine | Phe | F | nonpolar | neutral | large |
| Proline | Pro | P | nonpolar | neutral | intermediate |
| Serine | Ser | S | polar | neutral | small |
| Threonine | Thr | T | polar | neutral | intermediate |
| Tryptophan | Trp | W | nonpolar | neutral | bulky |
| Tyrosine | Tyr | Y | polar | neutral | large |
| Valine | Val | V | nonpolar | neutral | intermediate |

[†]based on volume in $Å^3$: 50-100 is small, 100-150 is intermediate, 150-200 is large, and >200 is bulky From this table it is appreciated that the conservative amino acid families include (i) G, A, V, L and I; (ii) D and E; (iii) C, S and T; (iv) H, K and R; (v) N and Q; and (vi) F, Y and W. A conservative mutation or substitution is therefore one that substitutes one amino acid for a member of the same amino acid family (e.g., a substitution of Ser for Thr or Lys for Arg).

As used herein, the term "developed inner ear cell" refers to an inner ear cell that has completed the development process that occurs during a term pregnancy, which is defined as the onset of labor at 37 weeks or later (e.g., 37 weeks, 38 weeks, 39 weeks, 40 weeks, 41 weeks, 42 weeks, or later) in primates (e.g., humans). Ears of human adults, adolescents, children, infants, and term newborns contain developed inner ear cells. Developed inner ear cells express cell-specific markers and can be transduced using the AAV1 vectors (e.g., an AAV1 vector containing a wild-type AAV1 capsid) described herein.

As used herein, the terms "effective amount," "therapeutically effective amount," and "sufficient amount" of a composition, vector construct, or viral vector described herein refer to a quantity sufficient to, when administered to the subject effect beneficial or desired results, including clinical results, and, as such, an "effective amount" or synonym thereto depends upon the context in which it is being applied. For example, in the context of treating sensorineural hearing loss, tinnitus, or vestibular dysfunction, it is an amount of the composition, vector construct, or viral vector sufficient to achieve a treatment response as compared to the response obtained without administration of the composition, vector construct, or viral vector. In the context of transducing inner ear cells, it is an amount of the composition, vector construct, or viral vector sufficient to transduce one or more inner ear cell types (e.g., 1, 2, 3, 4, 5, 6, 7, 8, 9, 10, 11, 12, 13, 14, 15, or more inner ear cell types). The amount of a given composition described herein that will correspond to such an amount will vary depending upon various factors, such as the given agent, the pharmaceutical formulation, the route of administration, the type of disease or disorder, the identity of the subject (e.g. age, sex, weight) or host being treated, and the like, but can nevertheless be routinely determined by one skilled in the art by routine methods known in the art. Dosage regimen may be adjusted to provide the optimum therapeutic response.

As used herein, the term "enhancer" refers to a type of regulatory element that can increase the efficiency of transcription regardless of the distance or orientation of the enhancer relative to the transcription start site. Accordingly, enhancers can be placed upstream or downstream of the transcription start site or at a considerable distance from the promoter. Enhancers may also overlap physically and functionally with promoters. A number of polynucleotides comprising promoter sequences (e.g., the CMV promoter) also contain enhancer sequences.

As used herein, the term "express" refers to one or more of the following events: (1) production of an RNA template from a DNA sequence (e.g., by transcription); (2) processing of an RNA transcript (e.g., by splicing, editing, 5' cap formation, and/or 3' end processing); (3) translation of an RNA into a polypeptide or protein; and (4) post-translational modification of a polypeptide or protein.

As used herein, the term "heterologous" refers to a combination of elements that is not naturally occurring. For example, a heterologous transgene refers to a transgene that is not naturally expressed by the promoter to which it is operably linked.

As used herein, the terms "increasing" and "decreasing" refer to modulating resulting in, respectively, greater or lesser amounts, of function, expression, or activity of a metric relative to a reference. For example, subsequent to administration of a composition in a method described herein, the amount of a marker of a metric (e.g., transgene expression) as described herein may be increased or decreased in a subject by at least 5%, 10%, 15%, 20%, 25%, 30%, 35%, 40%, 45%, 50%, 55%, 60%, 65%, 70%, 75%, 80%, 85%, 90%, 95% or 98% or more relative to the amount of the marker prior to administration. Generally, the metric is measured subsequent to administration at a time that the administration has had the recited effect, e.g., at least one week, one month, 3 months, or 6 months, after a treatment regimen has begun.

As used herein, the term "inner ear cell type" refers to a cell type found in the inner ear (e.g., cochlea and/or vestibular system) of a primate (e.g., human) subject. Inner ear cell types include inner hair cells, outer hair cells, vestibular hair cells, vestibular dark cells, vestibular fibrocytes, Scarpa's ganglion neurons (vestibular ganglion neurons), endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells.

As used herein, "locally" or "local administration" means administration at a particular site of the body intended for a local effect and not a systemic effect. Examples of local administration are epicutaneous, inhalational, intra-articular, intrathecal, intravaginal, intravitreal, intrauterine, intra-lesional administration, lymph node administration, intratumoral administration, administration to the inner ear (e.g., administration into the perilymph or endolymph, such as through the oval window, round window, or horizontal canal, e.g., intratympanic or transtympanic administration), and administration to a mucous membrane of the subject, wherein the administration is intended to have a local and not a systemic effect.

As used herein, the term "operably linked" refers to a first molecule joined to a second molecule, wherein the molecules are so arranged that the first molecule affects the function of the second molecule. The two molecules may or may not be part of a single contiguous molecule and may or may not be adjacent. For example, a promoter is operably linked to a transcribable polynucleotide molecule if the promoter modulates transcription of the transcribable polynucleotide molecule of interest in a cell. Additionally, two portions of a transcription regulatory element are operably linked to one another if they are joined such that the transcription-activating functionality of one portion is not adversely affected by the presence of the other portion. Two transcription regulatory elements may be operably linked to one another by way of a linker nucleic acid (e.g., an intervening non-coding nucleic acid) or may be operably linked to one another with no intervening nucleotides present.

As used herein, the term "polynucleotide" refers to a polymer of nucleosides. Typically, a polynucleotide is composed of nucleosides that are naturally found in DNA or RNA (e.g., adenosine, thymidine, guanosine, cytidine, uridine, deoxyadenosine, deoxythymidine, deoxyguanosine, and deoxycytidine) joined by phosphodiester bonds. The term encompasses molecules containing nucleosides or nucleoside analogs containing chemically or biologically modified bases, modified backbones, etc., whether or not found in naturally occurring nucleic acids, and such molecules may be preferred for certain applications. Where this application refers to a polynucleotide it is understood that both DNA, RNA, and in each case both single- and double-stranded forms (and complements of each single-stranded molecule) are provided. "Polynucleotide sequence" as used herein can refer to the polynucleotide material itself and/or to the sequence information (i.e., the succession of letters used as abbreviations for bases) that biochemically characterizes a specific nucleic acid. A polynucleotide sequence presented herein is presented in a 5' to 3' direction unless otherwise indicated.

As used herein, the term "promoter" refers to a recognition site on DNA that is bound by an RNA polymerase. The polymerase drives transcription of a transgene that is operably linked to the promoter.

"Percent (%) sequence identity" with respect to a reference polynucleotide or polypeptide sequence is defined as the percentage of nucleic acids or amino acids in a candidate sequence that are identical to the nucleic acids or amino acids in the reference polynucleotide or polypeptide sequence, after aligning the sequences and introducing gaps, if necessary, to achieve the maximum percent sequence identity. Alignment for purposes of determining percent nucleic acid or amino acid sequence identity can be achieved in various ways that are within the capabilities of one of skill in the art, for example, using publicly available computer software such as BLAST, BLAST-2, or Megalign software. Those skilled in the art can determine appropriate parameters for aligning sequences, including any algorithms needed to achieve maximal alignment over the full length of the sequences being compared. For example, percent sequence identity values may be generated using the sequence comparison computer program BLAST. As an illustration, the percent sequence identity of a given nucleic acid or amino acid sequence, A, to, with, or against a given nucleic acid or amino acid sequence, B, (which can alternatively be phrased as a given nucleic acid or amino acid sequence, A that has a certain percent sequence identity to, with, or against a given nucleic acid or amino acid sequence, B) is calculated as follows:

100 multiplied by (the fraction X/Y)

where X is the number of nucleotides or amino acids scored as identical matches by a sequence alignment program (e.g., BLAST) in that program's alignment of A and B, and where Y is the total number of nucleic acids in B. It will be appreciated that where the length of nucleic acid or amino acid sequence A is not equal to the length of nucleic acid or amino acid sequence B, the percent sequence identity of A to B will not equal the percent sequence identity of B to A.

As used herein, the term "pharmaceutical composition" refers to a mixture containing a therapeutic agent, optionally in combination with one or more pharmaceutically acceptable excipients, diluents, and/or carriers, to be administered to a subject in order to prevent, treat or control a particular disease or condition affecting or that may affect the subject.

As used herein, the term "pharmaceutically acceptable" refers to those compounds, materials, compositions and/or dosage forms, which are suitable for contact with the tissues of a subject without excessive toxicity, irritation, allergic response and other problem complications commensurate with a reasonable benefit/risk ratio.

As used herein, the term "sample" refers to a specimen (e.g., blood, blood component (e.g., serum or plasma), urine, saliva, amniotic fluid, cerebrospinal fluid, tissue (e.g., neural tissue, placental tissue, or dermal tissue), pancreatic fluid, chorionic villus sample, and cells (e.g., inner ear cells or stem cells)) isolated from a subject.

As used herein, the term "transcription regulatory element" refers to a nucleic acid that controls, at least in part, the transcription of a polynucleotide. Transcription regulatory elements may include promoters, enhancers, and other nucleic acids (e.g., polyadenylation signals) that control or help to control gene transcription. Examples of transcription regulatory elements are described, for example, in Lorence, Recombinant Gene Expression: Reviews and Protocols (Humana Press, New York, N.Y., 2012).

As used herein, the terms "subject" and "patient" refer to a primate (e.g., human). A subject to be treated according to the methods described herein may be one who has been diagnosed with hearing loss (e.g., sensorineural hearing loss, auditory neuropathy, or deafness), tinnitus, or vestibular dysfunction (e.g., dizziness, vertigo, or balance loss) or one at risk of developing these conditions (e.g., a subject at risk of developing hearing loss, tinnitus, or vestibular dysfunction due to age, head trauma, acoustic trauma (e.g., exposure to loud noise), disease or infection, treatment with ototoxic drugs, a genetic mutation, or a family history of hearing loss, tinnitus, or vestibular dysfunction). Diagnosis may be performed by any method or technique known in the art. One skilled in the art will understand that a subject to be treated according to the present disclosure may have been subjected to standard tests or may have been identified, without examination, as one at risk due to the presence of one or more risk factors associated with the disease or condition.

As used herein, the terms "transduction" and "transduce" refer to a method of introducing a vector construct or a part thereof into a cell. Wherein the vector construct is contained in a viral vector, such as an AAV1 vector (e.g., an AAV1 vector containing a wild-type AAV1 capsid), transduction refers to viral infection of the cell and subsequent transfer and/or integration of the vector construct or part thereof into the cell. As used herein, the amount of an AAV1 vector needed to "transduce an inner ear cell type" is defined as the amount needed to transduce at least 20% of the cells of the given cell type or of all inner ear cell types (e.g., at least 20%, 25%, 30%, 35%, 40%, 45%, 50%, 55%, 60%, 65%, 70%, 75%, 80%, 85%, 90%, 95%, 99%, or 100% of the cells of the given cell type, such as 20-25%, 20-30%, 20-35%, 20-40%, 20-45%, 20-50%, 20-55%, 20-60%, 20-65%, 20-70%, 20-75%, 20-80%, 20-85%, 20-90%, 20-95%, 20-100%, 25-30%, 25-35%, 25-40%, 25-45%, 25-50%, 25-55%, 25-60%, 25-65%, 25-70%, 25-75%, 25-80%, 25-85%, 25-90%, 25-95%, 25-100%, 30-35%, 30-40%, 30-45%, 30-50%, 30-55%, 30-60%, 30-65%, 30-70%, 30-75%, 30-80%, 30-85%, 30-90%, 30-95%, 30-100%, 35-40%, 35-45%, 35-50%, 35-55%, 35-60%, 35-65%, 35-70%, 35-75%, 35-80%, 35-85%, 35-90%, 35-95%, 35-100%, 40-45%, 40-50%, 40-55%, 40-60%, 40-65%, 40-70%, 40-75%, 40-80%, 40-85%, 40-90%, 40-95%, 40-100%, 45-50%, 45-55%, 45-60%, 45-65%, 45-70%, 45-75%, 45-80%, 45-85%, 45-90%, 45-95%, 45-100%, 50-55%, 50-60%, 50-65%, 50-70%, 50-75%, 50-80%, 50-85%, 50-90%, 50-95%, 50-100%, 55-60%, 55-65%, 55-70%, 55-75%, 55-80%, 55-85%, 55-90%, 55-95%, 55-100%, 60-65%, 60-70%, 60-75%, 60-80%, 60-85%, 60-90%, 60-95%, 60-100%, 65-70%, 65-75%, 65-80%, 65-85%, 65-90%, 65-95%, 65-100%, 70-75%, 70-80%, 70-85%, 70-90%, 70-95%, 70-100%, 75-80%, 75-85%, 75-90%, 75-95%, 75-100%, 80-85%, 80-90%, 80-95%, 80-100%, 85-90%, 85-95%, 85-100%, 90-95%, 90-100%, or 95%-100% of the cells of the given cell type or of all inner ear cell types).

As used herein, "treatment" and "treating" in reference to a disease or condition, refer to an approach for obtaining beneficial or desired results, e.g., clinical results. Beneficial or desired results can include, but are not limited to, alleviation or amelioration of one or more symptoms or conditions; diminishment of extent of disease or condition; stabilized (i.e., not worsening) state of disease, disorder, or condition; preventing spread of disease or condition; delay or slowing the progress of the disease or condition; amelioration or palliation of the disease or condition; and remission (whether partial or total), whether detectable or undetectable. "Ameliorating" or "palliating" a disease or condition means that the extent and/or undesirable clinical manifestations of the disease, disorder, or condition are lessened and/or time course of the progression is slowed or lengthened, as compared to the extent or time course in the absence of treatment. "Treatment" can also mean prolonging survival as compared to expected survival if not receiving treatment. Those in need of treatment include those already with the condition or disorder, as well as those prone to have the condition or disorder or those in which the condition or disorder is to be prevented.

Figure 1A:
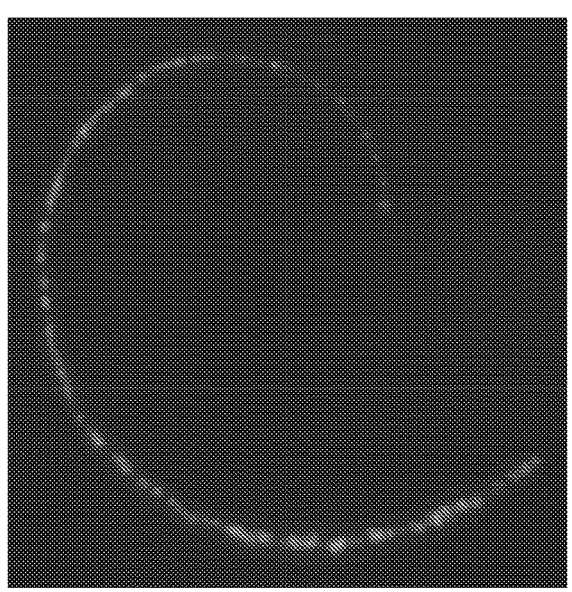
FIGS. 1A-1B are a series of fluorescence images of the inner ear of a 9-10 week old mouse treated with an AAV1 vector expressing EGFP under control of the CMV promoter. Unilateral injections were used to administer 1 μL of AAV1-CMV-GFP (viral titer at $2.94 \times 10^{13}$ genome copies/mL) to the posterior canal of the inner ear at a flow rate of 0.1 μL/min in CBA/CaJ mice (n=6). Two weeks post-injection, inner ears were removed, and a surface preparation of the basilar membranes was performed. One of the representative ears is shown. EGFP expression was observed in the apical, middle, and basal turns of the cochlea (FIG. 1A; upper left panel: apex of the cochlea; lower panel.
Figure 1A:
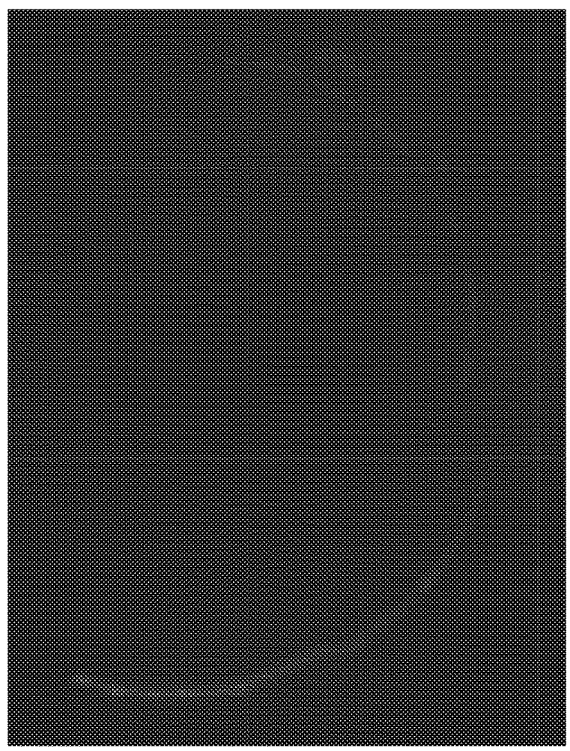
Figure 1A:
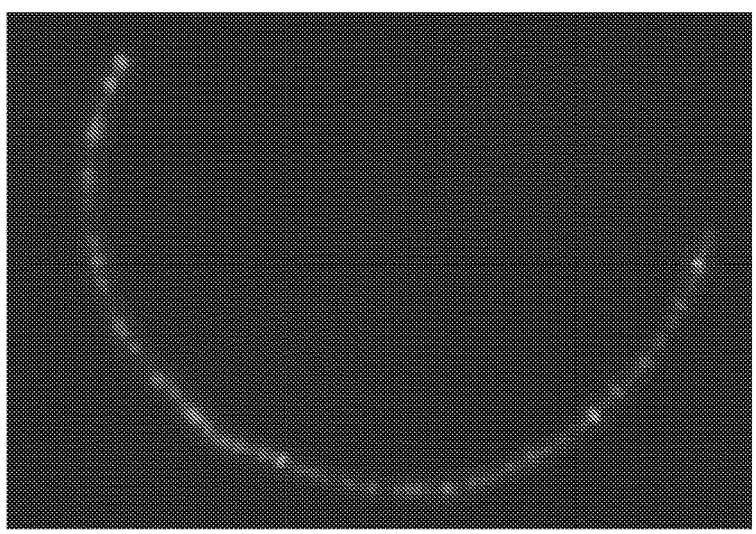
Figure 1B:

middle turn of the cochlea; upper right panel: base turn of the cochlea). A high-power image shows that EGFP is expressed in inner hair cells (IHCs), outer hair cells (OHCs) in the apical region, and cells of the spiral limbus (FIG. 1B).

Figure 2A:
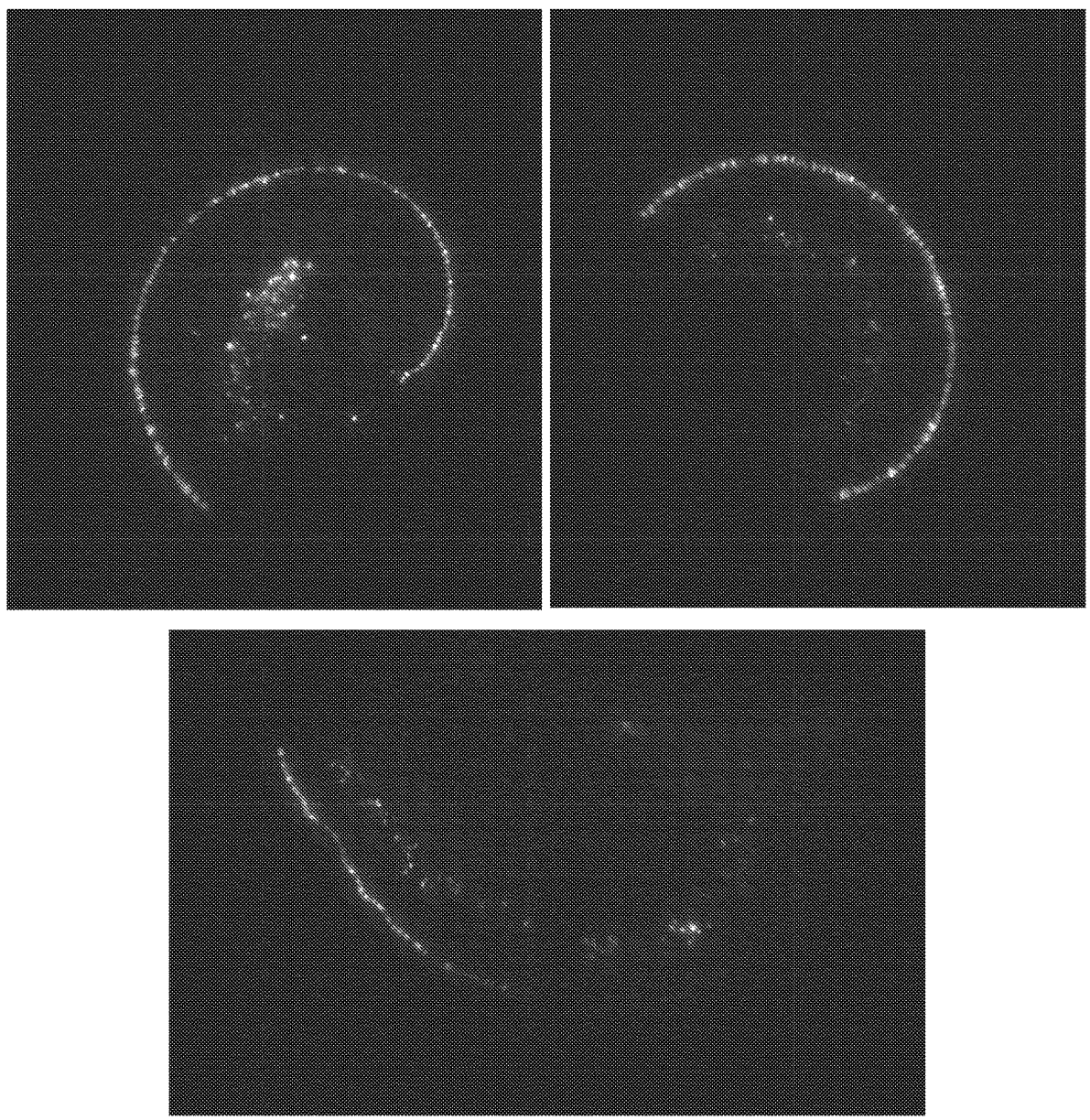
Figure 2B:
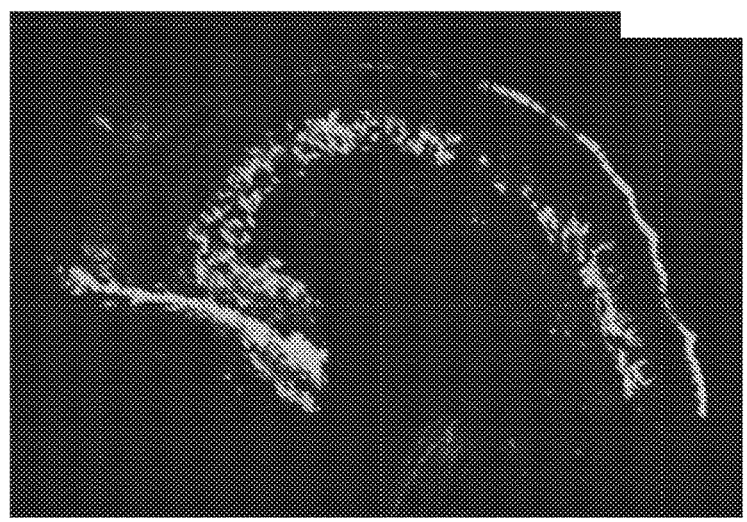
Figure 2B:
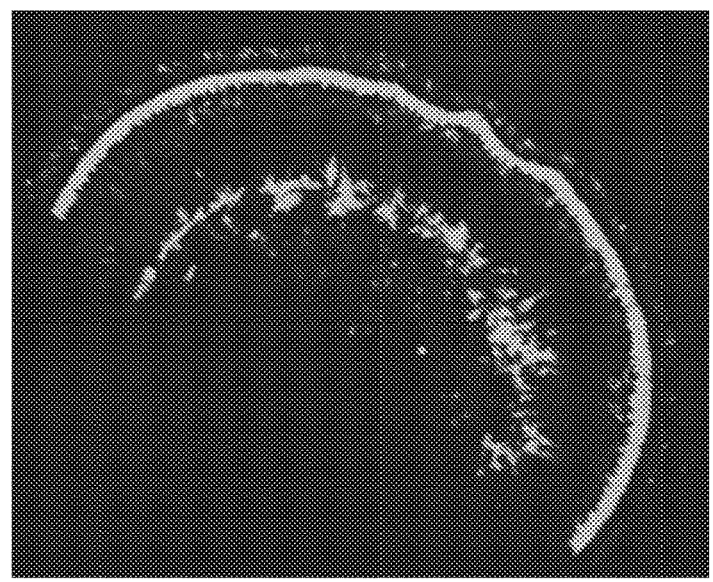
Figure 2B:
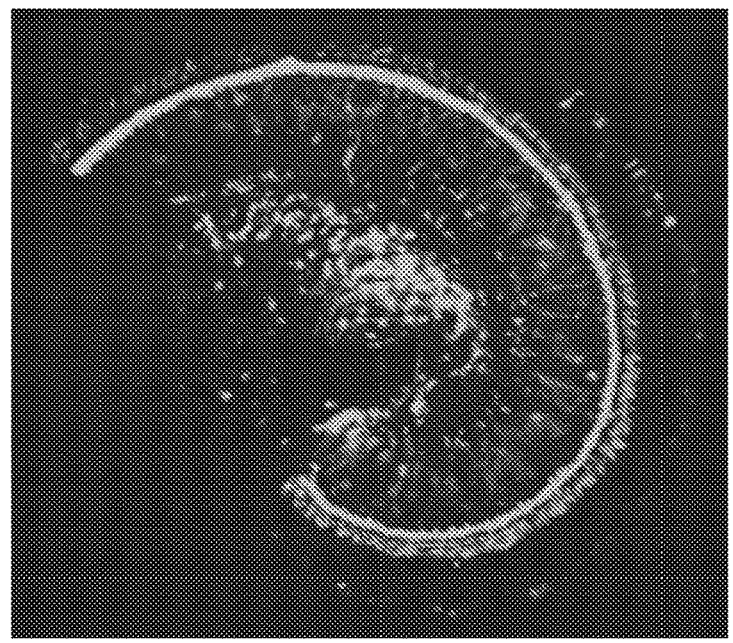

FIGS. 2A-2B are a series of fluorescence images of the inner ear of a 9-10 week mouse treated with an AAV7m8 vector expressing EGFP under control of the CAG promoter. Unilateral injections were performed to administer 1 µL of AAV7m8-CAG-EGFP (viral titer at $9.4 \times 10^{12}$ genome copies/mL) to the posterior canal of the inner ear at a flow rate of 0.1 µL/min in 9-10 week old CBA/CaJ mice (n=8). Two weeks post-injection, inner ears were removed, and a surface preparation of the basilar membranes was performed. One of the representative ears is shown. EGFP expression was observed in the apical, middle, and basal turns of the cochlea (FIG. 2A). A higher-power image shows EGFP expression in multiple cell types including IHCs, OHCs, and cells of the spiral ganglion and spiral limbus throughout the basal-to-apical extent of the cochlea (FIG. 2B; left panel: apex of the cochlea; middle panel: middle turn of the cochlea; right panel: base turn of the cochlea).

Figure 3A:
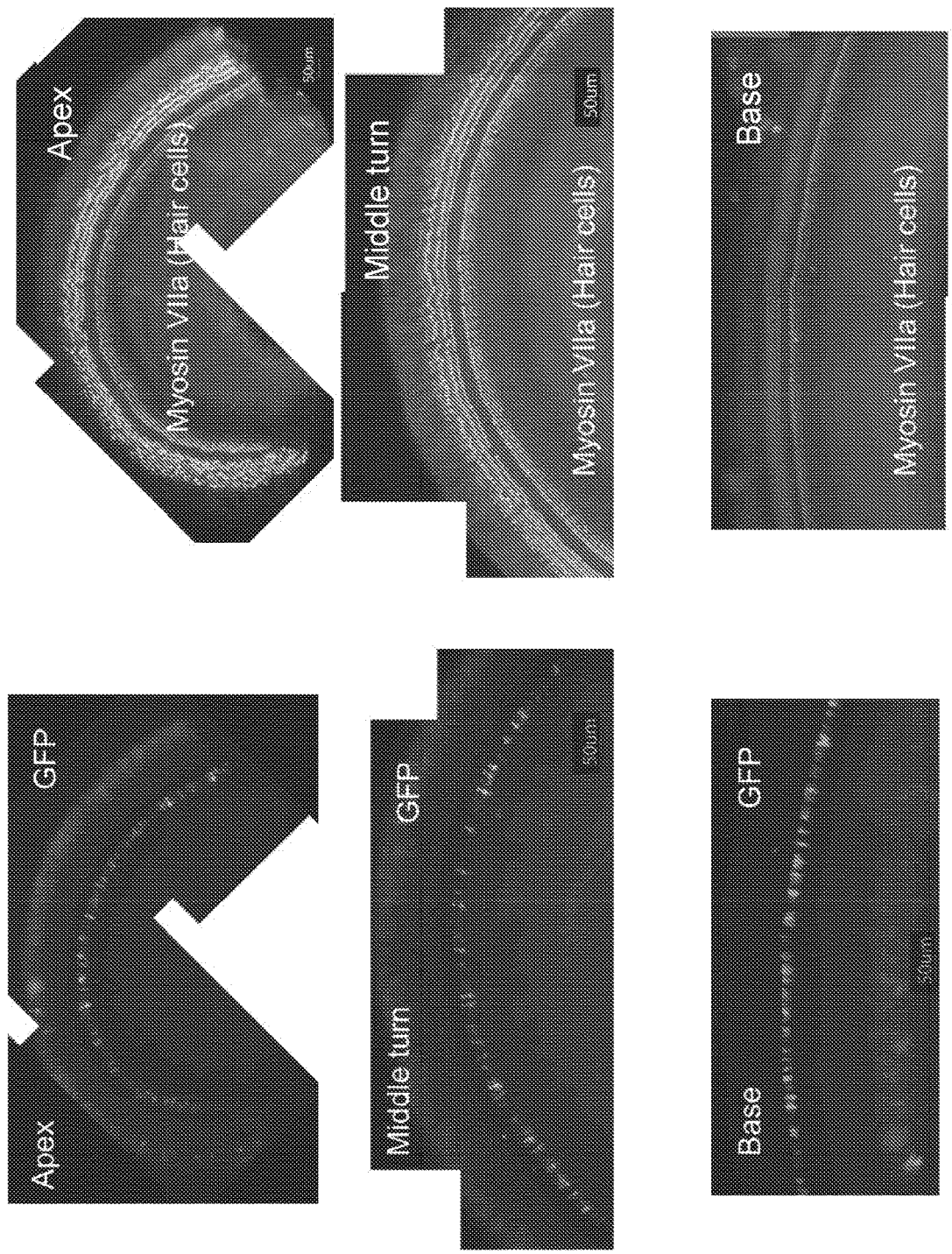
Figure 3B:
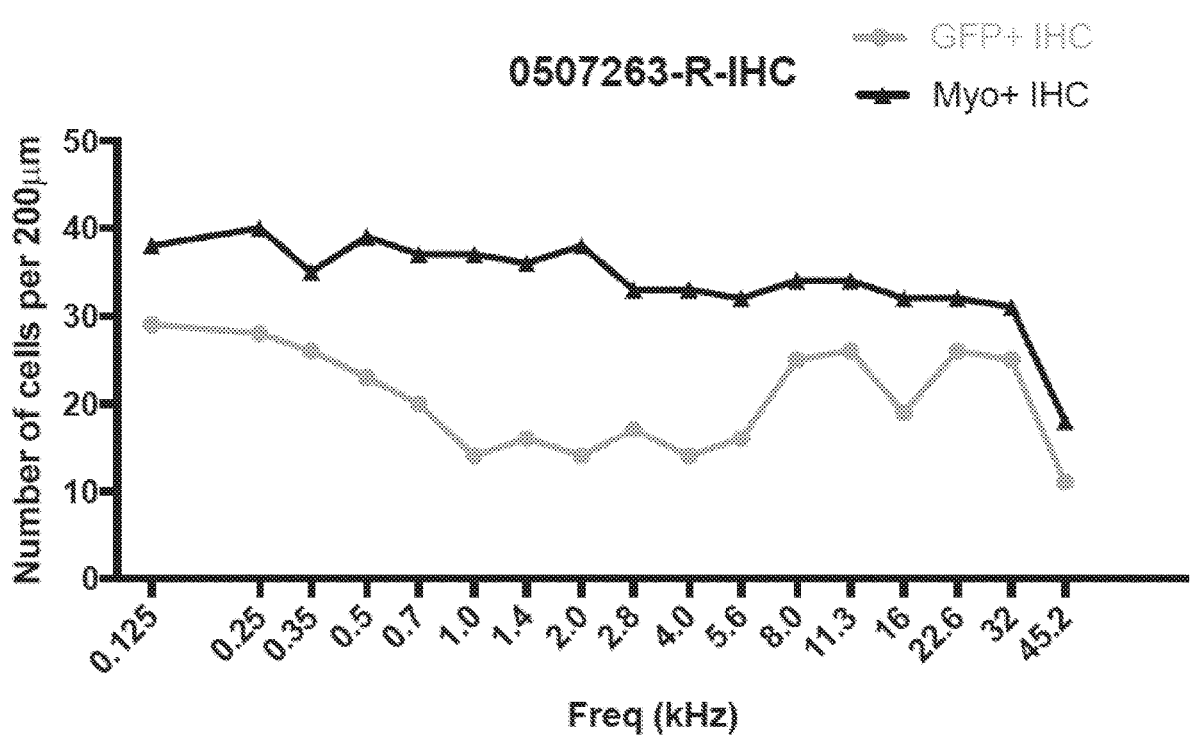

FIGS. 3A-3B are a series of fluorescence images of the inner ear of a rhesus monkey treated with an AAV2 vector expressing GFP under control of the CMV promoter. Unilateral (n=1 animal) and bilateral (n=2 animals) injections were used to administer 30 µL of AAV2-CMV-GFP (viral titer at $3.39 \times 10^{12}$ genome copies/mL) to the round window of the inner ear at a flow rate of 15 µL/min. Four weeks post-injection, inner ears were removed and a surface preparation of the basilar membranes was performed. One of the representative ears is shown. Immunohistochemistry for Myo7A was used to identify hair cells (FIG. 3A, panels in the right column) and GFP expression was used to monitor AAV1 infectivity (FIG. 3A, panels in the left column). AAV2-CMV-GFP transduction of the inner ear of rhesus monkeys resulted in GFP expression across the baso-apical axis of the cochlea (FIG. 3A; upper left panel: cochlear apex, middle left panel: middle turn of the cochlea; lower left panel: base turn of the cochlea). Cochlear GFP expression was observed within IHCs and some cells within the spiral limbus (FIG. 3A; panels of the left column). GFP expression was quantified in IHCs along the frequency map of cochlea, demonstrating GFP expression in 40-80% of IHCs (FIG. 3B).

Figure 4A:
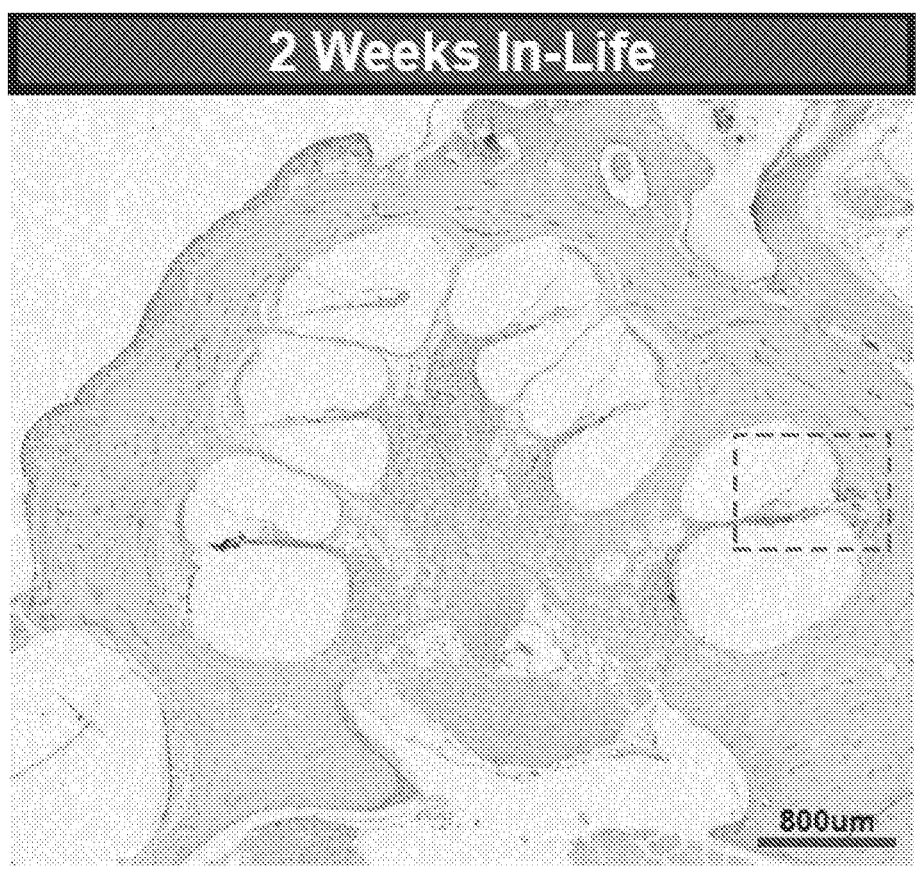
Figure 4B:
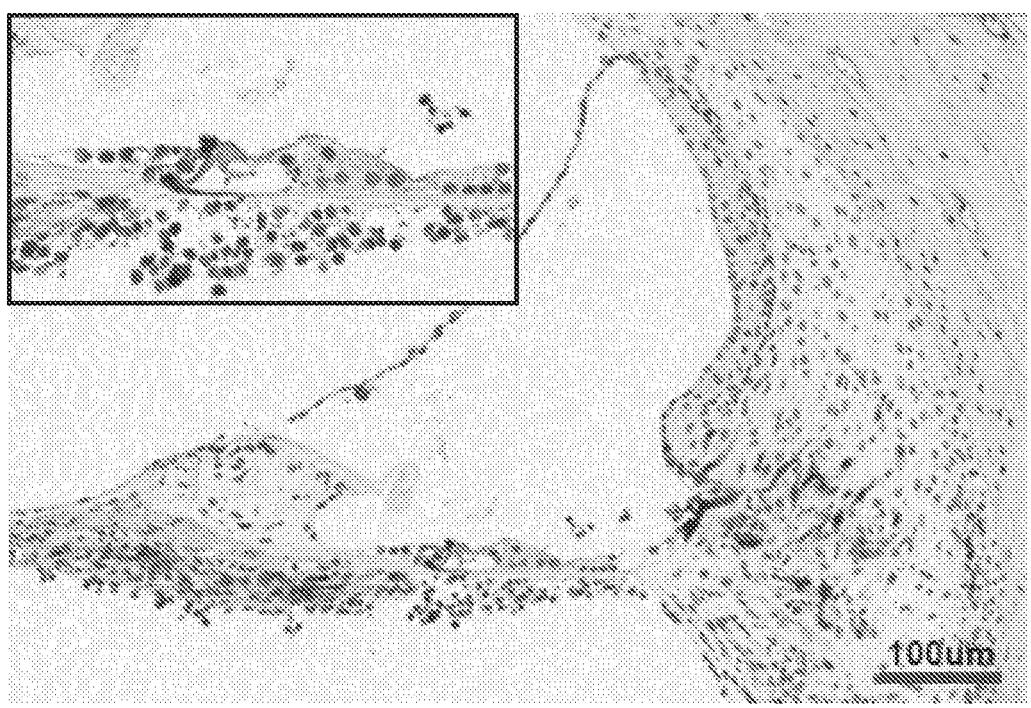
Figure 4C:
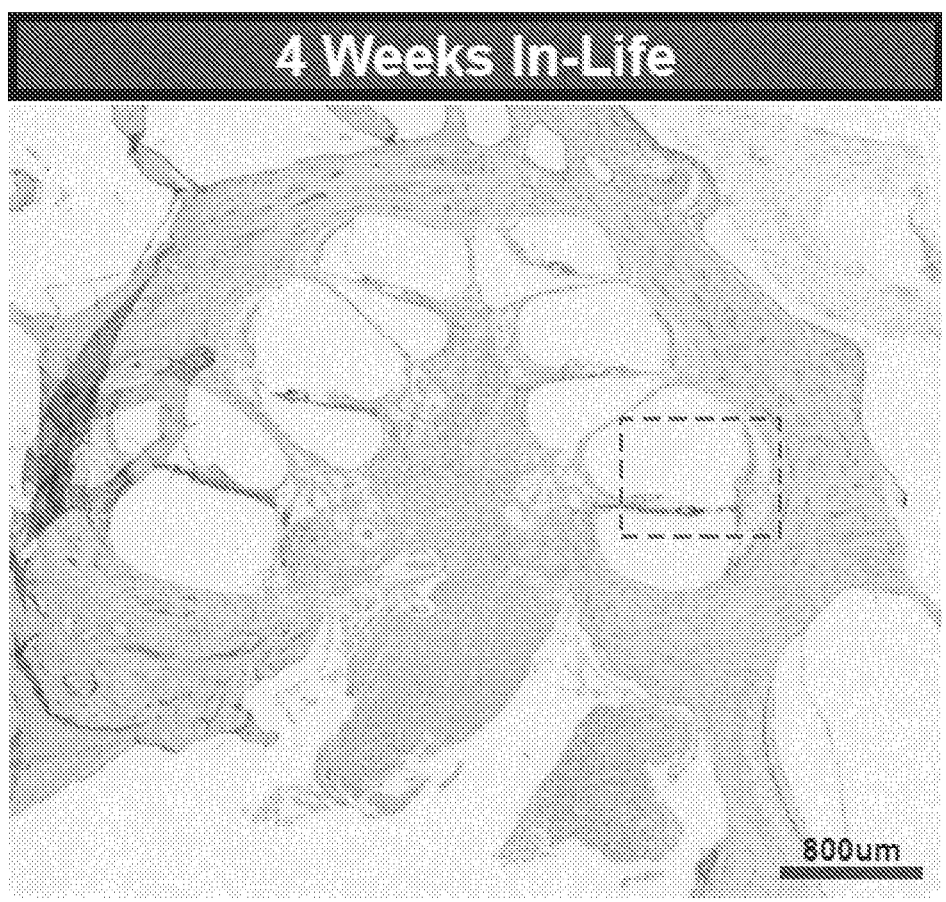
Figure 4D:
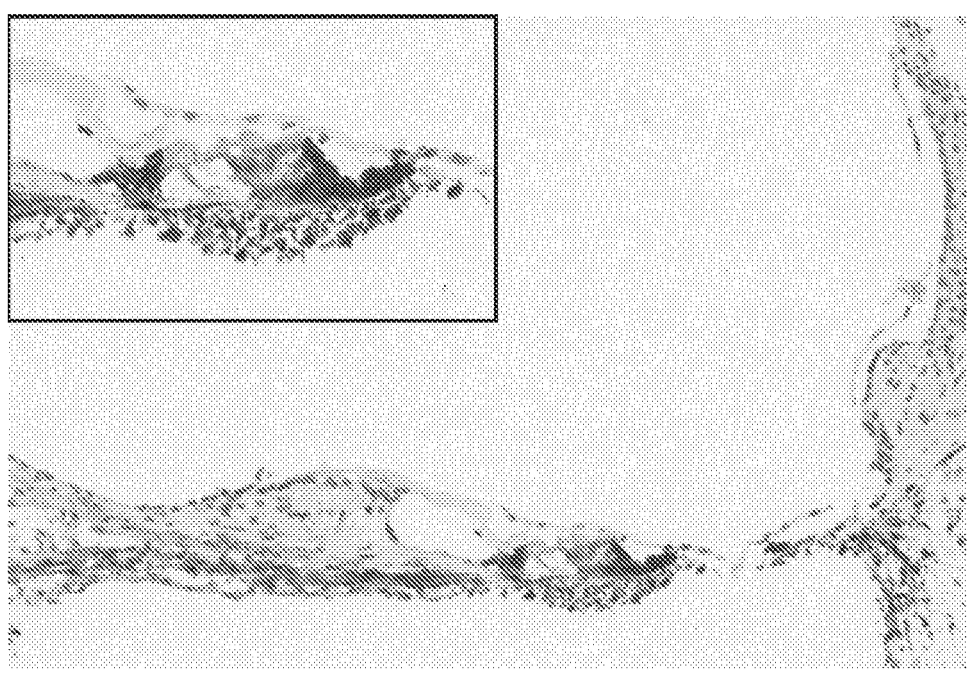
Figure 4E:
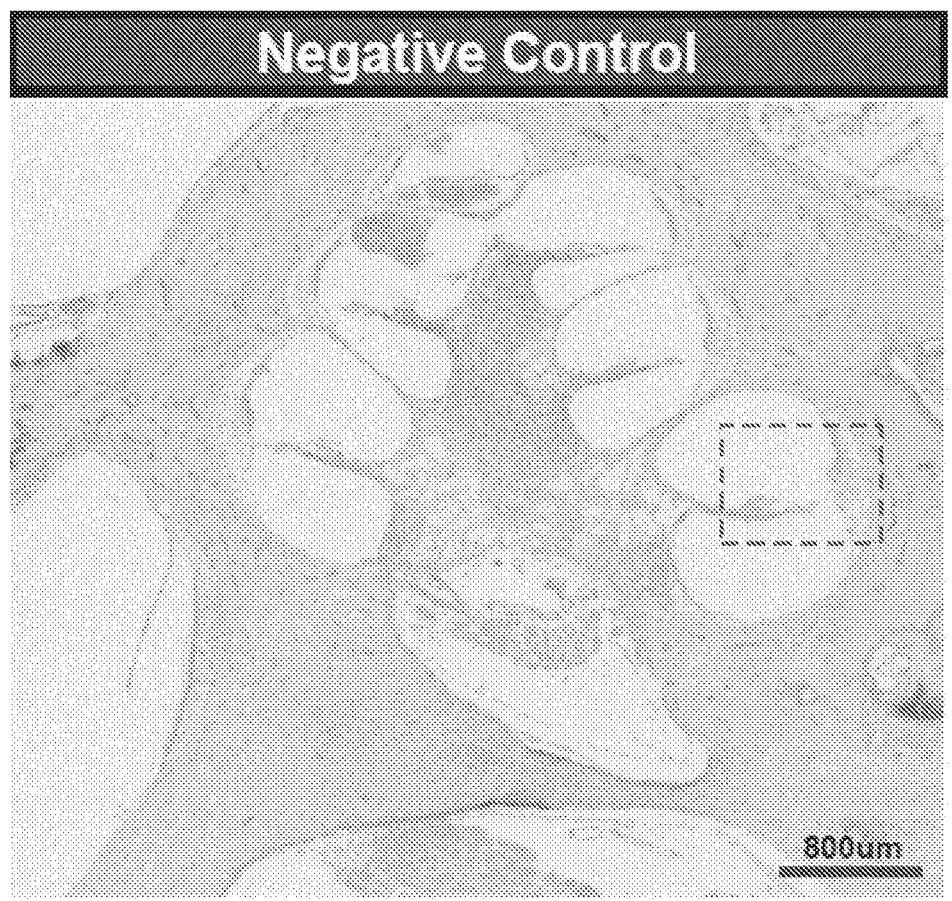

FIGS. 4A-4F are a series of images of paraffin sections of the inner ear of a cynomolgus monkey treated with an adeno-associated virus serotype 7m8 (AAV7m8) vector expressing green fluorescent protein (GFP) under control of the CAG promoter. Bilateral injections were used to administer 30 µL of AAV7m8-CAG-EGFP (viral titer at $9.4 \times 10^{12}$ genome copies/mL) to the round window of the inner ear at a flow rate of 15 µL/min. Two (n=1 animal) or four weeks (n=1 animal) post-injection, the inner ears were removed and embedded in paraffin for sectioning, mounting, immunostaining with an anti-GFP antibody, and histological analysis. In one animal, two weeks after transduction of the inner ear with AAV7m8-CAG-EGFP, EGFP expression was observed at the base turn of the cochlea (FIG. 4A, top panel: dashed square denotes the base turn of the cochlea), as visualized using immunostaining for EGFP. EGFP was expressed in IHCs, OHCs, and fibrocytes in the spiral ligament (FIG. 4B, enlargement of the dashed square in FIG. 4A; inset in the upper left: magnified view of the organ of Corti). In a different animal, four weeks after injection, EGFP expression was observed across the baso-apical axis of the cochlea (FIG. 4C, dashed square denotes the base turn of the cochlea and is enlarged in FIG. 4D). EGFP was expressed in IHCs, OHCs, and fibrocytes in the spiral ligament (FIG. 4D, organ of Corti enlarged in the inset at the upper left edge of the panel). As shown in FIG. 4E, secondary antibody in the absence of the primary anti-GFP antibody did not stain the cochlea (dashed square denotes the base turn of the cochlea). No staining was observed in the base (FIG. 4F, enlargement of the square in the FIG. 4E; organ of Corti magnified in upper left inset).

Figures 5A, 5B, 5C:
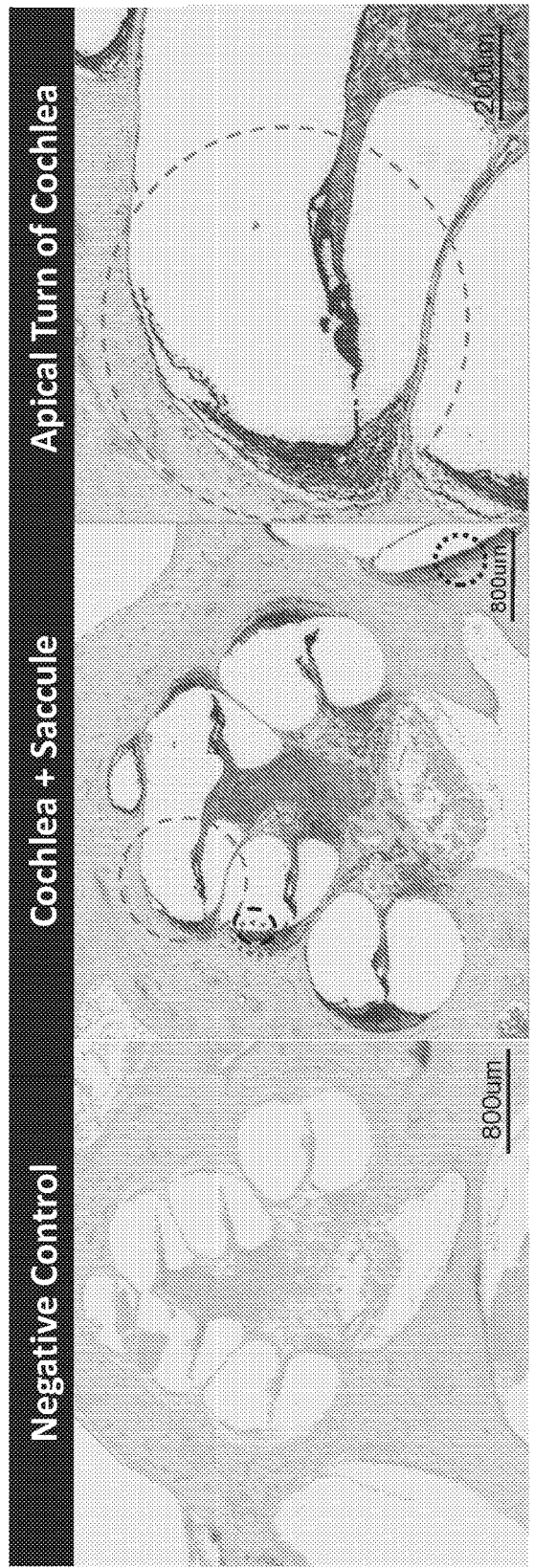
Figures 5D, 5E:
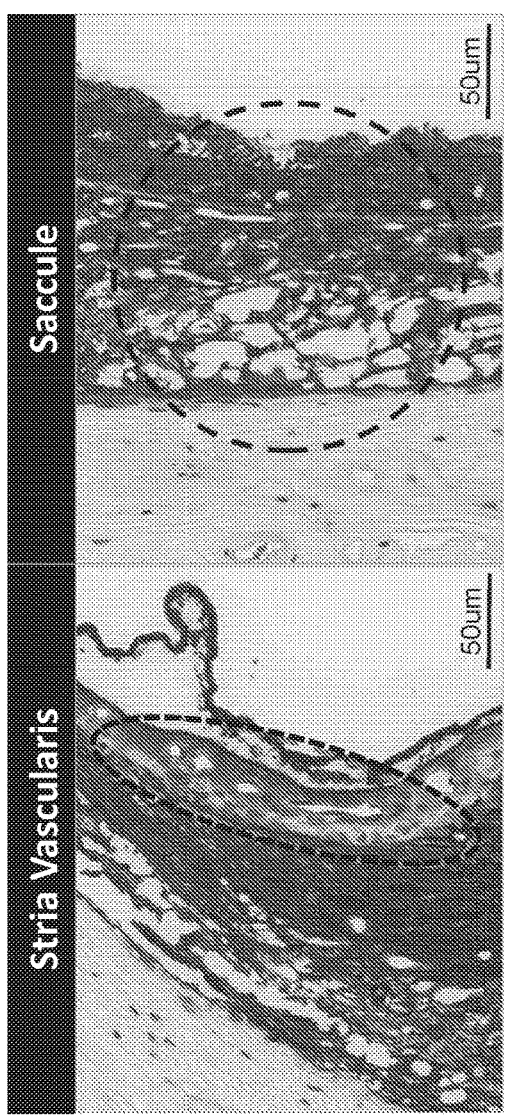

FIGS. 5A-5E are a series of images of paraffin sections of the inner ear of a cynomolgus monkey treated with an AAV1 vector expressing green fluorescent protein (GFP) under control of the CAG promoter. Bilateral injections were used to administer 30 µL of AAV1-CAG-GFP (viral titer at $9.9 \times 10^{12}$ genome copies/mL) to the round window of the inner ear at a flow rate of 15 µL/min. Four weeks post-injection, the inner ear was removed and embedded in paraffin for sectioning, mounting, immunostaining with an anti-GFP antibody, and histological analysis. As shown in FIG. 5A, staining with secondary antibody alone in the absence of the anti-GFP antibody did not stain the cochlea, confirming the specificity of the antibody. AAV1-CAG-GFP transduction of the inner ear resulted in robust GFP expression throughout the cochlea and saccule of the inner ear (FIG. 5B, large circle in the upper left denotes the apical turn of the cochlea, small oval in the left denotes the stria vascularis, and the small circle in the lower right denotes the saccule), as visualized using immunostaining for GFP. Immunostaining for GFP was detected in the apical turn of the cochlea (FIG. 5C, enlargement of upper left circle from FIG. 5B) and in all layers in the saccule (FIG. 5E, an enlargement of the lower right circle from FIG. 5B). Robust GFP expression was detected in the spiral ligament and in the marginal cells and intermediate cells of the stria vascularis. The basal cells of the stria vascularis did not exhibit GFP expression in this section, but GFP expression was visible in basal cells in other turns of the cochlea (FIG. 5D).

Figure 6B:
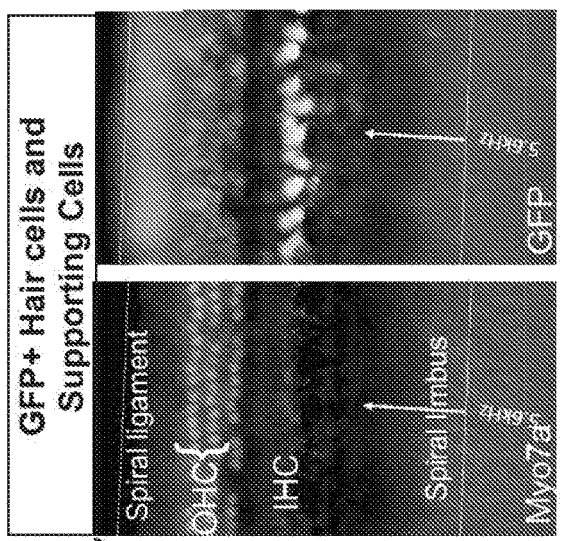
Figure 6C:
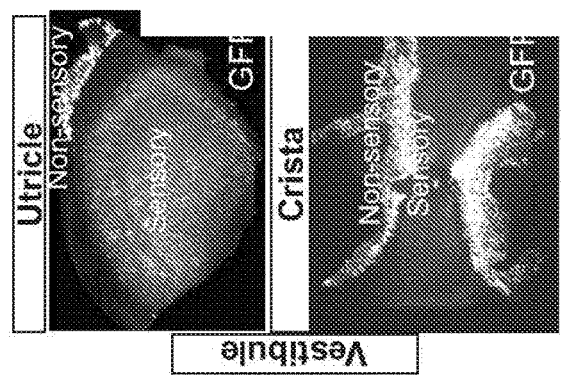
Figure 6A:
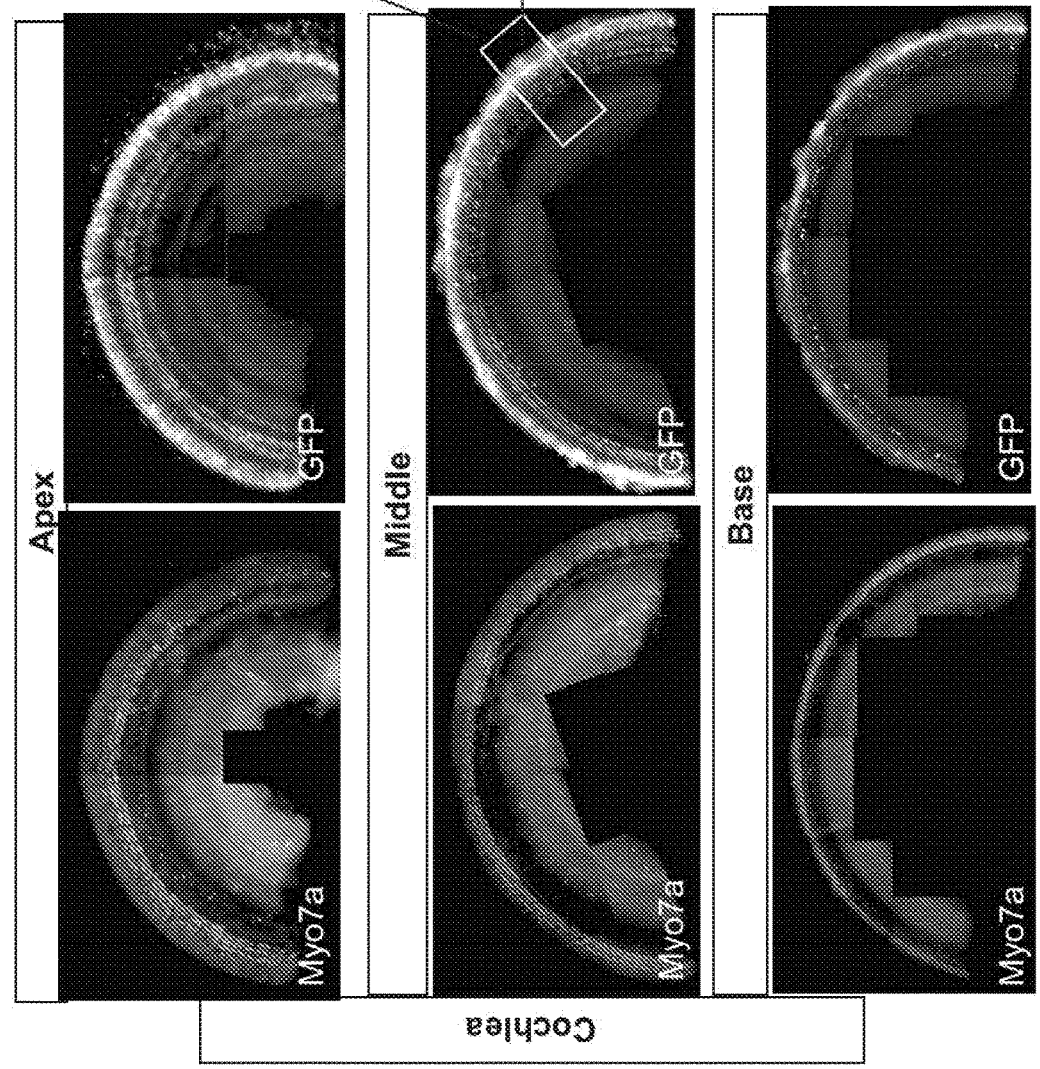

FIGS. 6A-6C are a series of fluorescence images of the inner ear of a rhesus monkey treated with an AAV1 vector expressing GFP under control of the CMV promoter. Unilateral (n=1 animal) and bilateral (n=2 animals) injections were used to administer 30 µL of AAV1-CMV-GFP (viral titer at $2.01 \times 10^{13}$ genome copies/mL) to the round window of the inner ear at a flow rate of 15 µL/min. Four weeks post-injection, inner ears were removed and a surface preparation of the basilar membranes, utricles, and cristae was performed. One of the representative inner ears is shown. Immunohistochemistry for Myo7A was used to visualize hair cells and GFP expression was used to monitor AAV1 infectivity (FIGS. 6A-6C). AAV1-CMV-GFP transduction of the inner ear of rhesus monkeys resulted in strong pantropic expression of GFP across the entire baso-apical axis of the cochlea (FIG. 6A). Cochlear GFP expression was observed within inner hair cells (IHCs), outer hair cells (OHCs), and supporting cells, as well as in the non-sensory spiral ligament and spiral limbus (FIG. 6B, enlargement of the boxed region in the middle turn of FIG. 6A). Vestibular structures such as the utricles and cristae also showed pronounced GFP expression in both sensory and non-sensory regions (FIG. 6C).

Figure 7D:
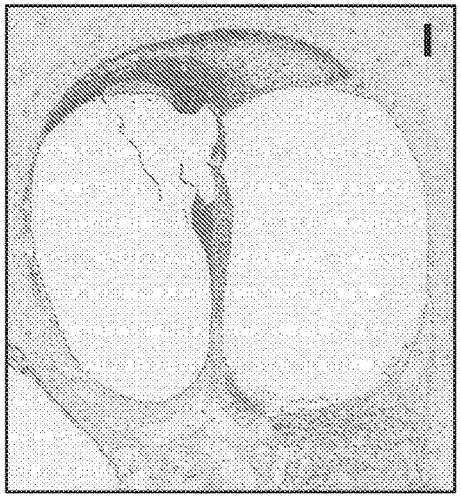
Figure 7D:
Figure 7D:
Figure 7D:
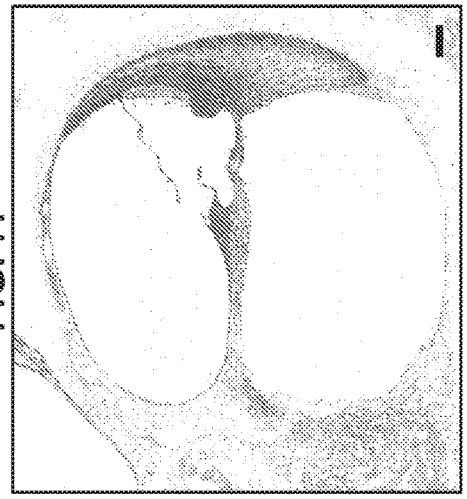
Figure 7E:
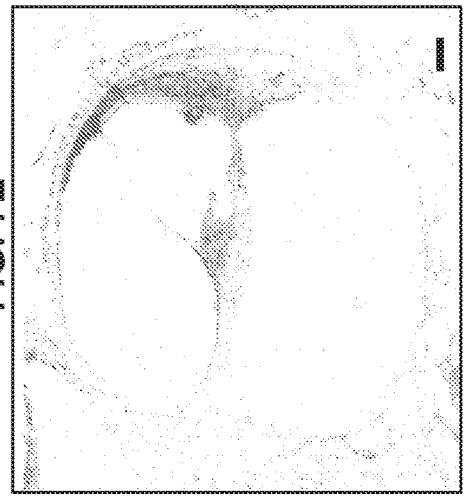
Figure 7F:
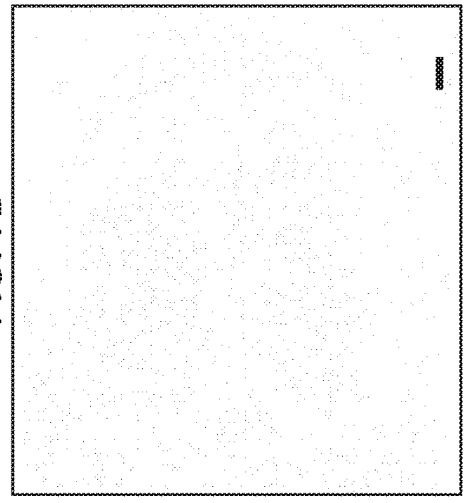

FIGS. 7A-7F are a series of images of paraffin sections of the inner ear of a cynomolgus monkey treated with an AAV1 vector expressing GFP under control of the CAG promoter. Bilateral injections were used to administer 30 µL of AAV1-CAG-GFP ($3.15 \times 10^{10}$ or $3.15 \times 10^{11}$ genome copies/ear) to the round window of the inner ear at a flow rate of 15 µL/min. Four weeks post-injection, the inner ear was removed and embedded in paraffin for sectioning, mounting, immunostaining with an anti-GFP antibody, and histological analysis. As shown in FIG. 7A, the anti-GFP antibody did not stain the cochlea of the non-AAV-injected ear, confirming the specificity of the antibody. FIG. 7B shows AAV1-CAG-GFP ($3.15 \times 10^{10}$ genome copies/ear) transduction of the inner ear resulted in robust GFP expression throughout the cochlea as visualized using immunostaining for GFP. Immunostaining for GFP was detected in hair cells, supporting cells, inner sulcus cells, outer sulcus cells, and cells in spiral ligaments. A higher dose of AAV-CAG-GFP ($3.15 \times 10^{11}$ genome copies/ear) showed stronger GFP expression in these cell types as shown in FIG. 7C. FIGS. 7D-7F show the same images as FIGS. 7A-7C, respectively, in which the nuclear staining has been removed (i.e., these images show GFP labeling only). All scale bars are 100 μm.

DETAILED DESCRIPTION

Described herein are compositions and methods for transducing developed primate (e.g., human) inner ear cells (e.g., cells of the cochlea and/or vestibular system, such as inner hair cells, outer hair cells, vestibular hair cells, cochlear supporting cells, and vestibular supporting cells). The invention features methods of transducing developed inner ear cells (e.g., 1, 2, 3, 4, 5, 6, 7, 8, 9, 10, 11, 12, 13, 14, 15, or more different types of developed inner ear cells) in a primate (e.g., human) subject using serotype 1 adeno-associated virus (AAV1) vectors. The invention also features methods of expressing a polynucleotide in a specific inner ear cell type (e.g., an outer hair cell, a vestibular hair cell, or a vestibular supporting cell) in a primate (e.g., human) subject using AAV1 vectors, and AAV1 vectors containing a promoter (e.g., a promoter that induces gene expression in one or more inner ear cell types) and/or a polynucleotide (e.g., a polynucleotide corresponding to a gene that encodes a therapeutic protein, such as a gene that is expressed in normal inner ear cells, or a gene that encodes a protein that regulates inner ear cell survival, regeneration, cell fate, and/or cell proliferation). The compositions and methods described herein can be used to express one or more polynucleotides in all or in a subset of primate (e.g., human) inner ear cells, and, therefore, the compositions described herein can be administered to a primate (e.g., human) subject to treat disorders caused by damage, degeneration, loss, and/or dysfunction of inner ear cells, such as hearing loss (e.g., sensorineural hearing loss), tinnitus, or vestibular dysfunction.

Inner Ear Cells

The inner ear is populated by a number of specialized cells. Both the cochlea and vestibular system contain hair cells, which are the primary sensory cells of the inner ear. Cochlear hair cells are made up of two main cell types: inner hair cells (IHCs), which are responsible for sensing sound, and outer hair cells (OHCs), which are thought to amplify low-level sound. Vestibular hair cells are located in the semicircular canals and otolith organs (e.g., utricle and saccule) of the vestibular system, and are involved in the sensation of movement that contributes to the sense of balance and spatial orientation. Spiral ganglion neurons innervate cochlear hair cells and send axons into the central nervous system, while neurons of the vestibular ganglion innervate vestibular hair cells. Non-sensory cells called supporting cells reside between hair cells in the cochlea and in the vestibular system and perform a number of important functions, such as providing a structural scaffold to allow for mechanical stimulation of hair cells, maintaining the ionic composition of the endolymph and perilymph, and regulating synaptogenesis of ribbon synapses. Within the cochlea, supporting cells can be subdivided into five different types: 1) Hensen's cells, 2) Deiters' cells, 3) pillar cells; 4) inner phalangeal cells; and 5) border cells, all of which have distinct morphologies and patterns of gene expression. Mutations in genes expressed in cochlear hair cells, cochlear supporting cells, and/or spiral ganglion neurons have been associated with hearing loss (e.g., sensorineural hearing loss), auditory neuropathy, deafness, and tinnitus, as has damage, injury, degeneration, or loss (e.g., death) of these cells. Similarly, mutations in genes expressed in cells of the vestibular system (e.g., in vestibular hair cells, vestibular supporting cells, and/or vestibular ganglion neurons) and damage, injury, degeneration, or loss (e.g., death) of cells of the vestibular system have been associated with vestibular dysfunction (e.g., vertigo, dizziness, and/or balance loss). Gene therapy has recently emerged as an attractive therapeutic approach for treating hearing loss and vestibular dysfunction; however, given the large number of cell types that may need to be targeted to address the various causes of hearing loss and vestibular dysfunction, there exists a need for a viral vector with broad tropism for transducing the many cell types of the primate (e.g., human) inner ear.

The present invention is based, in part, on the discovery that administration of an AAV1 vector containing a ubiquitous promoter operably linked to green fluorescent protein (GFP) to the inner ear of adult non-human primates leads to pantropic transduction and strong expression of GFP in most or all cell types of the inner ear, in contrast to the tropism observed using other AAV serotypes. Without wishing to be bound by theory, the high degree of similarity between humans and non-human primates indicates that an AAV1 vector can be used to transduce most or all developed human inner ear cells (e.g., most or all inner ear cells in a human adult, adolescent, child, or term newborn). The compositions and methods described herein can, therefore, be used to induce expression of a polynucleotide in all cells of the developed primate (e.g., human) inner ear, or they can be used to induce expression of a polynucleotide in particular regions (e.g., the cochlea or the vestibular system) or cell types (e.g., one or more inner ear cell types, such as inner hair cells, outer hair cells, vestibular hair cells, cochlear supporting cells, and/or vestibular supporting cells) of the inner ear based on the promoter contained in the AAV1 vector. Thus, the methods and compositions described herein can be administered to a primate (e.g., human) subject to treat a disorder caused by a genetic mutation in or damage, degeneration, loss, and/or dysfunction of all cell types of the inner ear, or to treat a disorder caused by a genetic mutation in or damage, degeneration, loss, and/or dysfunction of one or a subset of inner ear cell types.

In some embodiments, the AAV1 vector (e.g., an AAV1 vector containing a wild-type AAV1 capsid) is administered to the developed inner ear of a primate (e.g., human) subject in an amount sufficient to transduce 3 or more (e.g., 3, 4, 5, 6, 7, 8, 9, 10, 11, 12, 13, 14, 15, 20, or more) inner ear cell types selected from the group including outer hair cells, vestibular hair cells, vestibular dark cells, vestibular fibrocytes, Scarpa's ganglion neurons (vestibular ganglion neurons), endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells. The pantropic transduction of inner ear cells by the AAV1 vector can be used to induce expression of a polynucleotide throughout the inner ear (e.g., in an AAV1 vector in which the polynucleotide is operably linked to a ubiquitous promoter). The ability to transduce 3 or more (e.g., 3, 4, 5, 6, 7, 8, 9, 10, 11, 12, 13, 14, 15, or more) different inner ear cell types is beneficial for therapeutic approaches in which it is desirable to express a polynucleotide in many or most cell types of the inner ear, for example, to deliver the wild-type version of a gene that is mutated in all inner ear cell types, or to produce a large quantity of a secreted protein that produces a therapeutic effect at high concentrations.

In some embodiments, the AAV1 vector (e.g., an AAV1 vector containing a wild-type AAV1 capsid) is administered to a primate (e.g., human) subject to express a polynucleotide in a particular cell type (e.g., a supporting cell, such as a cochlear and/or vestibular supporting cell; an OHC; a vestibular hair cell; or a spiral ganglion neuron) or region (e.g., cochlea or vestibular system). A cell type-specific promoter can be included in the AAV1 vector (e.g., an AAV1 vector containing a wild-type AAV1 capsid) to induce gene expression in one or more cell types. Cell type-specific expression can be used to mimic the endogenous expression pattern of a polynucleotide that is naturally expressed in only one or a few cell types. This approach is beneficial in that it can be used to avoid ectopic expression of the polynucleotide in cells in which it is not normally expressed.

Expression of Exogenous Polynucleotides in Human Cells

Mutations in a variety of genes, such as Myosin 7A (MYO7A), POU Class 4 Homeobox 3 (POU4F3), Solute Carrier Family 17 Member 8 (SLC17A8), Gap Junction Protein Beta 2 (GJB2), Claudin 14 (CLDN14), Cochlin (COCH), Protocadherin Related 15 (PCDH15), and Transmembrane 1 (TMC1), have been linked to sensorineural hearing loss and/or deafness, and some of these mutations, such as mutations in MYO7A, POU4F3, and COCH are also associated with vestibular dysfunction. The compositions and methods described herein can be used to induce or increase the expression of a protein encoded by a polynucleotide (e.g., a nucleic acid corresponding to a gene expressed in healthy inner ear cells, such as the wild-type form of a gene implicated in hearing loss and/or vestibular dysfunction, or a gene involved in inner ear cell development, function, cell fate specification, regeneration, survival, proliferation, and/or maintenance) in developed human inner ear cells. AAV1 vectors (e.g., AAV1 vectors containing a wild-type AAV1 capsid) containing the polynucleotide can be administered to a human subject (e.g., to the inner ear of the subject) to induce or increase expression of the protein encoded by the polynucleotide in one or more inner ear cell types. A wide array of methods has been established for the delivery of proteins to human cells and for the stable expression of polynucleotides encoding proteins in human cells.

The AAV1 vectors described herein can be used to express a polynucleotide in one or more inner ear cell types. In some embodiments, the AAV1 vectors described herein can be used to express two or more (e.g., 2, 3, 4, or more) polynucleotides in one or more cell types. A list of inner ear cell types and polynucleotides that can be expressed in each cell type are provided in Table 2, below. Accession numbers for the polynucleotides of Table 2 are provided in Table 3.

TABLE 2

Polynucleotides that can be expressed in one or more inner ear cell types

| Cell type | Polynucleotide |
| --- | --- |
| Inner hair cells (IHCs) | Otoferlin (Otof), Soluble Carrier Family 17 Member 8 (Slc17a8, also known as Vglut3) |
| Outer hair cells (OHCs) | Stereocilin (Strc), Cholinergic Receptor Nicotinic Alpha 9 Subunit (Chrna9), Cholinergic Receptor Nicotinic Alpha 10 Subunit (Chrna10), Oncomodulin (Ocm) |
| IHCs and vestibular hair cells | Whirlin (Whrn) |
| Cochlear hair cells (IHCs and OHCs) | Atonal BHLH Transcription Factor 1 (Atoh1), POU Class 4 Homeobox 3 (Pou4f3), Growth Factor Independent 1 Transcriptional Repressor (Gfi1), ISL LIM Homeobox 1 (Isl1), Clarin 1 (Clrn1), Protocadherin Related 15 (Pcdh15), Cadherin Related 23 (Cdh23), Myosin 7a (Myo7a), Transmembrane Channel Like 1 (Tmc1), Harmonin (Ush1c) |
| Cells of the stria vascularis (SV) | Potassium Voltage-Gated Channel Subfamily Q Member (Kcnq1), Potassium Voltage-Gated Channel Subfamily E Regulatory Subunit 1 (Kcne1), Gap Junction Protein Beta 2 (Gjb2), Gap Junction Protein Beta 6 (Gjb6), Tyrosinase (Tyr), a nuclease (e.g., CRISPR Associated Protein 9 (Cas9), Transcription Activator-Like Effector Nuclease (TALEN), Zinc Finger Nuclease (ZFN), or gRNA), a microRNA (miRNA, e.g., miR-183, miR-96, or miR-182) |
| Fibrocytes/mesenchyme | Collagens (e.g., Collagen Type I Alpha 1 Chain (Col1a1), Collagen Type I Alpha 2 Chain (Col1a2), Collagen Type II Alpha 1 Chain (Col2a1), or other collagen genes) |
| Interdental cells | Carcinoembryonic Antigen Related Cell Adhesion Molecule 16 (Ceacam16), Otoancorin (Otoa), Gjb2, Gjb6 |
| Spiral prominence cells | Solute Carrier Family 26 Member 4 (Slc26a4) |
| Root cells | Slc26a4 |
| Cochlear and vestibular supporting cells | SRY-Box 9 (Sox9), Spalt Like Transcription Factor 2 (Sall2), Calmodulin Binding Transcription Activator 1 (Camta1), Hes Related Family BHLH Transcription Factor With YRPW Motif 2 (Hey2), Gata Binding Protein 2 (Gata2), Hes Related Family BHLH Transcription Factor With YRPW Motif 1 (Hey1), Ceramide Synthase 2 (Lass2), SRY-Box 10 (Sox10), GATA Binding Protein 3 (Gata3), Cut Like Homeobox 1 (Cux1), Nuclear Receptor Subfamily 2 Group F Member (Nr2f1), Hes Family BHLH Transcription Factor 1 (Hes1), RAR Related Orphan Receptor B (Rorb), Jun Proto- |

TABLE 2-continued

Polynucleotides that can be expressed in one or more inner ear cell types

| Cell type | Polynucleotide |
|---|---|
| | Oncogene AP-1 Transcription Factor Subunit (Jun), Zinc Finger Protein 667 (Zfp667), LIM Homeobox 3 (Lhx3), Nescient Helix-Loop-Helix 1 (Nhlh1), MAX Dimerization Protein 4 (Mxd4), Zinc Finger MIZ-Type Containing 1 (Zmiz1), Myelin Transcription Factor 1 (Myt1), Signal Transducer And Activator Of Transcription 3 (Stat3), BarH Like Homeobox 1 (Barhl1), Thymocyte Selection Associated High Mobility Group Box (Tox), Prospero Homeobox 1 (Prox1), Nuclear Factor I A (Nfia), Thyroid Hormone Receptor Beta (Thrb), MYCL Proto-Oncogene BHLH Transcription Factor (Mycl1), Lysine Demethylase 5A (Kdm5a), CAMP Responsive Element Binding Protein 3 Like 4 (Creb3l4), ETS Variant 1 (Etv1), Paternally Expressed 3 (Peg3), BTB Domain And CNC Homolog 2 (Bach2), ISL LIM Homeobox (Isl1), Zinc Finger And BTB Domain Containing 38 (Zbtb38), Limb Bud And Heart Development (Lbh), Tubby Bipartite Transcription Factor (Tub), Ubiquitin C (Hmg20), RE1 Silencing Transcription Factor (Rest), Zinc Finger Protein 827 (Zfp827), AF4/FMR2 Family Member 3 (Aff3), PBX/Knotted 1 Homeobox 2 (Pknox2), AT-Rich Interaction Domain 3B (Arid3b), MLX Interacting Protein (Mlxip), Zinc Finger Protein (Zfp532), IKAROS Family Zinc Finger 2 (Ikzf2), Spalt Like Transcription Factor 1 (Sall1), SIX Homeobox 2 (Six2), Spalt Like Transcription Factor 3 (Sall3), Lin-28 Homolog B (Lin28b), Pou4f3, Regulatory Factor X7 (Rfx7), Atoh1, a polynucleotide encoding an Atoh1 variant containing mutations at amino acids 328, 331, and/or 334 (e.g., S328A, S331A, S334A, S328A/S331A, S328A/S334A, S331A/S334A, and S328A/S331A/S334, e.g., a polynucleotide encoding a variant having the sequence of any one of SEQ ID NOs: 4-10), Gfi1, SRY-Box 4 (Sox4), Brain Derived Neurotrophic Factor (Bdnf), Neurotrophin 3 (Ntf3), SRY-Box 11 (Sox11), TEA Domain Transcription Factor 2 (Tead2), Yes Associated Protein 1 (Yap1), a nuclease (e.g., Cas9, TALEN, ZFN, or gRNA), a microRNA (miRNA, e.g., miR-183, miR-96, or miR-182), |
| Vestibular and cochlear hair cells | Bdnf, Ntf3, Transmembrane and Tetratricopeptide Repeat Containing 4 (Tmtc4), a nuclease (e.g., Cas9, TALEN, ZFN, or gRNA), a microRNA (miRNA, e.g., miR-183, miR-96, or miR-182) |
| Border cells (cochlear supporting cell subtype) | Bdnf, Ntf3, Tectorin Beta (Tectb), Tectorin Alpha (Tecta), Gjb2, Gjb6 |
| Inner phalangeal cells (cochlear supporting cell subtype) | Bdnf, Ntf3, Tectb, Tecta, Transmembrane Protein 16A (Tmem16a), Gjb2, Gjb6 |
| Pillar cells (cochlear supporting cell subtype) | Nerve Growth Factor Receptor (Ngfr), Bdnf, Ntf3, Tectb, Tecta, Gjb2, Gjb6 |
| Deiters cells (cochlear supporting cell subtype) | Bdnf, Ntf3, Tectb, Tecta, Ikzf2, Gjb2, Gjb6 |
| Hensen's cells (cochlear supporting cell subtype) | Gjb2, Gjb6 |
| Claudius cells (cochlear supporting cell subtype) | Gjb2, Gjb6 |
| Spiral ganglion neurons (SGN) | Bdnf, Ntf3, a nuclease (e.g., Cas9, TALEN, ZFN, or gRNA), a microRNA (miRNA, e.g., miR-183, miR-96, or miR-182), shRNA directed to RGMA, |
| Scarpa's ganglion | Bdnf, Ntf3, shRNA directed to RGMA |
| All fibrocytes and epithelia | Gjb2, Gjb6 |
| Vestibular dark cells | Kcnq1, Kcne1, Slc26a4 |
| Glia | Peripheral Myelin Protein 22 (Pmp22), Bdnf, Ntf3, Myelin Protein Zero (Mpz) |

TABLE 3

Accession numbers for polynucleotides listed in Table 2

| Gene name | NCBI Accession number |
|---|---|
| Otof, Otoferlin (variant 1) | NM_194248 |
| Otof, Otoferlin (variant 2) | NM_004802 |
| Otof, Otoferlin (variant 3) | NM_194322 |
| Otof, Otoferlin (variant 4) | NM_194323 |
| Otof, Otoferlin (variant 5) | NM_001287489 |
| Vglut3, Vesicular glutamate transporter 3 (variant 1) | NM_139319 |
| Vglut3, Vesicular glutamate transporter 3 (variant 2) | NM_001145288 |
| Strc, Stereocilin | NM_153700 |
| Tmc1, Transmembrane channel like 1 | NM_138691 |

TABLE 3-continued

Accession numbers for polynucleotides listed in Table 2

| Gene name | NCBI Accession number |
|---|---|
| Myo7a, Myosin VIIa (variant 1) | NM_000260 |
| Myo7a, Myosin VIIa (variant 2) | NM_001127180 |
| Harmonin (variant 1) | NM_005709 |
| Harmonin (variant b3) | NM_153676 |
| Harmonin (variant 3) | NM_001297764 |
| Whirlin (variant 1) | NM_015404 |
| Whirlin (variant 2) | NM_001083885 |
| Whirlin (variant 3) | NM_001173425 |
| Atoh1, Atonal BHLH transcription factor 1 | NM_005172 |
| Pou4f3, POU class 4 homeobox 3 | NM_002700 |
| Gfi1, Growth factor independent 1 transcriptional repressor (variant 1) | NM_005263 |
| Gfi1, Growth factor independent 1 transcriptional repressor (variant 2) | NM_001127215 |
| Gfi1, Growth factor independent 1 transcriptional repressor (variant 3) | NM_001127216 |
| Isl1, ISL LIM homeobox 1 | NM_00220 |
| Clrn1, Clarin 1 (variant 1) | NM_174878 |
| | NM_174879 |
| Clrn1, Clarin 1 (variant 4) | NM_052995 |
| Clrn1, Clarin 1 (variant 5) | NM_001195794 |
| Clrn1, Clarin 1 (variant 6) | NM_001256819 |
| Pcdh15, Protocadherin related 15 | NM_033056 |
| Cdh23, Cadherin related 23 (variant 1) | NM_022124 |
| Cdh23, Cadherin related 23 (variant 2) | NM_052836 |
| Cdh23, Cadherin related 23 (variant 3) | NM_001171930 |
| Cdh23, Cadherin related 23 (variant 4) | NM_001171931 |
| Cdh23, Cadherin related 23 (variant 5) | NM_001171932 |
| Cdh23, Cadherin related 23 (variant 6) | NM_001171933 |
| Cdh23, Cadherin related 23 (variant 7) | NM_001171934 |
| Cdh23, Cadherin related 23 (variant 8) | NM_001171935 |
| Cdh23, Cadherin related 23 (variant 9) | NM_001171936 |
| Kcnq1, Potassium voltage-gated channel subfamily Q member 1 (variant 1) | NM_000218 |
| Kcnq1, Potassium voltage-gated channel subfamily Q member 1 (variant 2) | NM_181798 |
| Kcne1, Potassium voltage-gated channel subfamily E regulatory subunit 1 (variant 1) | NM_001127670 |
| Kcne1, Potassium voltage-gated channel subfamily E regulatory subunit 1 (variant 2) | NM_000219 |
| Kcne1, Potassium voltage-gated channel subfamily E regulatory subunit 1 (variant 3) | NM_001127668 |
| Kcne1, Potassium voltage-gated channel subfamily E regulatory subunit 1 (variant 4) | NM_001127669 |
| Kcne1, Potassium voltage-gated channel subfamily E regulatory subunit 1 (variant 5) | NM_001270402 |
| Kcne1, Potassium voltage-gated channel subfamily E regulatory subunit 1 (variant 6) | NM_001270403 |
| Kcne1, Potassium voltage-gated channel subfamily E regulatory subunit 1 (variant 7) | NM_001270404 |
| Kcne1, Potassium voltage-gated channel subfamily E regulatory subunit 1 (variant 8) | NM_001270405 |
| Col1a1, Collagen type I alpha 1 chain | NM_000088 |
| Col1a2, Collagen type I alpha 2 chain | NM_000089 |
| Col2a1, Collagen type II alpha 1 chain (variant 1) | NM_001844 |
| Col2a1, Collagen type II alpha 1 chain (variant 2) | NM_033150 |
| Col3a1, Collagen type III alpha 1 chain | NM_000090 |
| Col4a1, Collagen type IV alpha 1 chain (variant 1) | NM_001845 |
| Col4a1, Collagen type IV alpha 1 chain (variant 2) | NM_001303110 |
| Col4a2, Collagen type IV alpha 2 chain | NM_001846 |
| Col4a3, Collagen type IV alpha 3 chain | NM_000091 |
| Col4a4, Collagen type IV alpha 4 chain | NM_000092 |
| Col4a5, Collagen type IV alpha 5 chain (variant 1) | NM_000495 |
| Col4a5, Collagen type IV alpha 5 chain (variant 2) | NM_033380 |
| Col4a6, Collagen type IV alpha 6 chain (variant A) | NM_001847 |
| Col4a6, Collagen type IV alpha 6 chain (variant B) | NM_033641 |
| Col4a6, Collagen type IV alpha 6 chain (variant 3) | NM_001287758 |
| Col4a6, Collagen type IV alpha 6 chain (variant 4) | NM_001287759 |
| Col4a6, Collagen type IV alpha 6 chain (variant 5) | NM_001287760 |
| Col5a1, Collagen type V alpha 1 chain (variant 1) | NM_000093 |
| Col5a1, Collagen type V alpha 1 chain (variant 2) | NM_001278074 |
| Col5a2, Collagen type V alpha 2 chain | NM_000393 |
| Col5a3, Collagen type V alpha 3 chain | NM_015719 |
| Col6a1, Collagen type VI alpha 1 chain | NM_001848 |
| Col6a2, Collagen type VI alpha 2 chain (variant 2C2) | NM_001849 |
| Col6a2, Collagen type VI alpha 2 chain (variant 2C2a) | NM_058174 |
| Col6a2, Collagen type VI alpha 2 chain (variant 2C2a') | NM_058175 |
| Col6a3, Collagen type VI alpha 3 chain (variant 1) | NM_004369 |
| Col6a3, Collagen type VI alpha 3 chain (variant 2) | NM_057164 |

TABLE 3-continued

Accession numbers for polynucleotides listed in Table 2

| Gene name | NCBI Accession number |
|---|---|
| Col6a3, Collagen type VI alpha 3 chain (variant 3) | NM_057165 |
| Col6a3, Collagen type VI alpha 3 chain (variant 4) | NM_057166 |
| Col6a3, Collagen type VI alpha 3 chain (variant 5) | NM_057167 |
| Col6a5, Collagen type VI alpha 5 chain (variant 1) | NM_001278298 |
| Col6a5, Collagen type VI alpha 5 chain (variant 2) | NM_153264 |
| Col6a6, Collagen type VI alpha 6 chain | NM_001102608 |
| Col7a1, Collagen type VII alpha 1 chain | NM_000094 |
| Col8a1, Collagen type VIII alpha 1 chain (variant 1) | NM_001850 |
| Col8a1, Collagen type VIII alpha 1 chain (variant 2) | NM_020351 |
| Col8a2, Collagen type VIII alpha 2 chain (variant 1) | NM_005202 |
| Col8a2, Collagen type VIII alpha 2 chain (variant 2) | NM_001294347 |
| Col9a1, Collagen type IX alpha 1 chain (variant 1) | NM_001851 |
| Col9a1, Collagen type IX alpha 1 chain (variant 2) | NM_078485 |
| Col9a2, Collagen type IX alpha 2 chain | NM_001852 |
| Col9a3, Collagen type IX alpha 3 chain | NM_001853 |
| Col10a1, Collagen type X alpha 1 chain | NM_000493 |
| Col11a1, Collagen type XI alpha 1 chain (variant A) | NM_001854 |
| Col11a1, Collagen type XI alpha 1 chain (variant B) | NM_080629 |
| Col11a1, Collagen type XI alpha 1 chain (variant C) | NM_080630 |
| | NM_001168249 |
| Col11a1, Collagen type XI alpha 1 chain (variant E) | NM_001190709 |
| Col11a2, Collagen type XI alpha 2 chain (variant 1) | NM_080680 |
| Col11a2, Collagen type XI alpha 2 chain (variant 2) | NM_080681 |
| Col11a2, Collagen type XI alpha 2 chain (variant 3) | NM_080679 |
| Col11a2, Collagen type XI alpha 2 chain (variant 4) | NM_001163771 |
| Col12a1, Collagen type XII alpha 1 chain (short variant) | NM_080645 |
| Col12a1, Collagen type XII alpha 1 chain (long variant) | NM_004370 |
| Col13a1, Collagen type XIII alpha 1 chain (variant 1) | NM_001130103 |
| Col13a1, Collagen type XIII alpha 1 chain (variant 5) | NM_080801 |
| Col13a1, Collagen type XIII alpha 1 chain (variant 11) | NM_080800 |
| Col13a1, Collagen type XIII alpha 1 chain (variant 15) | NM_080802 |
| Col13a1, Collagen type XIII alpha 1 chain (variant 21) | NM_080798 |
| Col13a1, Collagen type XIII alpha 1 chain (variant 22) | NM_001320951 |
| Col14a1, Collagen type XIV alpha 1 chain | NM_021110 |
| Col15a1, Collagen type XV alpha 1 chain | NM_001855 |
| Col16a1, Collagen type XVI alpha 1 chain | NM_001856 |
| Col17a1, Collagen type XVII alpha 1 chain | NM_000494 |
| Col18a1, Collagen type XVIII alpha 1 chain (variant 1) | NM_030582 |
| Col18a1, Collagen type XVIII alpha 1 chain (variant 2) | NM_130444 |
| Col18a1, Collagen type XVIII alpha 1 chain (variant 3) | NM_130445 |
| Col19a1, Collagen type XIX alpha 1 chain | NM_001858 |
| Col20a1, Collagen type XX alpha 1 chain | NM_020882 |
| Col21a1, Collagen type XXI alpha 1 chain (variant 1) | NM_030820 |
| Col21a1, Collagen type XXI alpha 1 chain (variant 2) | NM_001318751 |
| Col21a1, Collagen type XXI alpha 1 chain (variant 3) | NM_001318752 |
| Col21a1, Collagen type XXI alpha 1 chain (variant 4) | NM_001318753 |
| Col21a1, Collagen type XXI alpha 1 chain (variant 5) | NM_001318754 |
| Col22a1, Collagen type XXII alpha 1 chain | NM_152888 |
| Col23a1, Collagen type XXIII alpha 1 chain | NM_173465 |
| Col24a1, Collagen type XXIV alpha 1 chain (variant 1) | NM_152890 |
| Col24a1, Collagen type XXIV alpha 1 chain (variant 2) | NM_001349955 |
| Col25a1, Collagen type XXV alpha 1 chain (variant 1) | NM_198721 |
| Col25a1, Collagen type XXV alpha 1 chain (variant 2) | NM_032518 |
| Col25a1, Collagen type XXV alpha 1 chain (variant 3) | NM_001256074 |
| Col26a1, Collagen type XXVI alpha 1 chain (variant 1) | NM_001278563 |
| Col26a1, Collagen type XXVI alpha 1 chain (variant 2) | NM_133457 |
| Col27a1, Collagen type XXVII alpha 1 chain | NM_032888 |
| Col28a1, Collagen type XXVIII alpha 1 chain | NM_001037763 |
| Ceacam16, Carcinoembryonic antigen related cell adhesion molecule 16 | NM_001039213 |
| Otoa, Otoancorin (variant 1) | NM_144672 |
| Otoa, Otoancorin (variant 2) | NM_170664 |
| Otoa, Otoancorin (variant 3) | NM_001161683 |
| Slc26a4, Solute carrier family 26 member 4 | NM_000441 |
| Sox9, SRY-box 9 | NM_000346 |
| Sox10, SRY-box 10 | NM_006941 |
| Sall2, Spalt like transcription factor 2 (variant 1) | NM_005407 |
| Sall2, Spalt like transcription factor 2 (variant 2) | NM_001291446 |
| Sall2, Spalt like transcription factor 2 (variant 3) | NM_001291447 |
| Sall2, Spalt like transcription factor 2 (variant 6) | NM_001364564 |
| Camta1, Calmodulin binding transcription activator 1 (variant 1) | NM_015215 |
| Camta1, Calmodulin binding transcription activator 1 (variant 2) | NM_00119556 |
| Camta1, Calmodulin binding transcription activator 1 (variant 3) | NM_001242701 |
| Camta1, Calmodulin binding transcription activator 1 (variant 5) | NM_001349608 |
| Camta1, Calmodulin binding transcription activator 1 (variant 6) | NM_001349609 |

TABLE 3-continued

Accession numbers for polynucleotides listed in Table 2

| Gene name | NCBI Accession number |
|---|---|
| Camta1, Calmodulin binding transcription activator 1 (variant 7) | NM_001349610 |
| Camta1, Calmodulin binding transcription activator 1 (variant 8) | NM_001349612 |
| Camta1, Calmodulin binding transcription activator 1 (variant 9) | NM_001349613 |
| Camta1, Calmodulin binding transcription activator 1 (variant 10) | NM_001349614 |
| Camta1, Calmodulin binding transcription activator 1 (variant 11) | NM_001349615 |
| Camta1, Calmodulin binding transcription activator 1 (variant 12) | NM_001349616 |
| Camta1, Calmodulin binding transcription activator 1 (variant 13) | NM_001349617 |
| Camta1, Calmodulin binding transcription activator 1 (variant 14) | NM_001349618 |
| Camta1, Calmodulin binding transcription activator 1 (variant 15) | NM_00134961 |
| Camta1, Calmodulin binding transcription activator 1 (variant 16) | NM_001349620 |
| Camta1, Calmodulin binding transcription activator 1 (variant 17) | NM_001349621 |
| Camta1, Calmodulin binding transcription activator 1 (variant 18) | NM_001349622 |
| Camta1, Calmodulin binding transcription activator 1 (variant 19) | NM_001349623 |
| Camta1, Calmodulin binding transcription activator 1 (variant 20) | NM_001349624 |
| Camta1, Calmodulin binding transcription activator 1 (variant 21) | NM_001349625 |
| Camta1, Calmodulin binding transcription activator 1 (variant 22) | NM_001349626 |
| Camta1, Calmodulin binding transcription activator 1 (variant 23) | NM_001349627 |
| Hey1, Hes related family bHLH transcription factor with YRPW motif 1 (variant 1) | NM_012258 |
| Hey1, Hes related family bHLH transcription factor with YRPW motif 1 (variant 2) | NM_001040708 |
| Hey1, Hes related family bHLH transcription factor with YRPW motif 1 (variant 3) | NM_001282851 |
| Hey2, Hes related family bHLH transcription factor with YRPW motif 2 | NM_012259 |
| Gata2, GATA binding protein 2 (variant 1) | NM_001145661 |
| Gata2, GATA binding protein 2 (variant 2) | NM_032638 |
| Gata2, GATA binding protein 2 (variant 3) | NM_001145662 |
| Gata3, GATA binding protein 3 (variant 1) | NM_001002295 |
| Gata3, GATA binding protein 3 (variant 2) | NM_002051 |
| Lass2, Ceramide synthase 2 (variant 1) | NM_181746 |
| Lass2, Ceramide synthase 2 (variant 2) | NM_022075 |
| Cux1, Cut like homeobox 1 (variant 1) | NM_181552 |
| Cux1, Cut like homeobox 1 (variant 2) | NM_001913 |
| Cux1, Cut like homeobox 1 (variant 3) | NM_181500 |
| Cux1, Cut like homeobox 1 (variant 4) | NM_001202543 |
| Cux1, Cut like homeobox 1 (variant 5) | NM_001202544 |
| Cux1, Cut like homeobox 1 (variant 6) | NM_001202545 |
| Cux1, Cut like homeobox 1 (variant 7) | NM_001202546 |
| Nr2f1, Nuclear receptor subfamily 2 group F member 1 | NM_005654 |
| Hes1, Hes family bHLH transcription factor 1 | NM_005524 |
| Rorb, RAR related orphan receptor B (variant 1) | NM_006914 |
| Rorb, RAR related orphan receptor B (variant 2) | NM_001365023 |
| Jun, Jun proto-oncogene AP-1 transcription factor subunit | NM_002228 |
| Zfp667 (human Znf667), Zinc finger protein 667 (variant 1) | NM_022103 |
| Zfp667 (human Znf667), Zinc finger protein 667 (variant 2) | NM_00132135 |
| Zfp667 (human Znf667), Zinc finger protein 667 (variant 3) | NM_001321355 |
| Lhx3, Lim homeobox 3 (variant 1) | NM_178138 |
| Lhx3, Lim homeobox 3 (variant 2) | NM_014564 |
| Lhx3, Lim homeobox 3 (variant 3) | NM_001363746 |
| Nhlh1, Nescient helix-loop-helix 1 | NM_005598 |
| Zmiz1, Zinc finger MIZ-type containing 1 | NM_020338 |
| Myt1, Myelin transcription factor 1 | NM_004535 |
| Stat3, Signal transducer and activator of transcription 3 (variant 1) | NM_139276 |
| Stat3, Signal transducer and activator of transcription 3 (variant 2) | NM_003150 |
| Stat3, Signal transducer and activator of transcription 3 (variant 3) | NM_213662 |
| Barhl1, BarH like homeobox 1 | NM_020064 |
| Tox, Thyomocyte selection associated high mobility group box | NM_014729 |
| Prox1, Prospero homeobox 1 (variant 1) | NM_001270616 |
| Prox1, Prospero homeobox 1 (variant 2) | NM_002763 |
| Nfia, Nuclear factor I A (variant 1) | NM_00113467 |
| Nfia, Nuclear factor I A (variant 2) | NM_005595 |
| Nfia, Nuclear factor I A (variant 3) | NM_001145511 |
| Nfia, Nuclear factor I A (variant 4) | NM_001145512 |
| Thrb, Thyroid hormone receptor beta (variant 1) | NM_000461 |
| Thrb, Thyroid hormone receptor beta (variant 2) | NM_001128176 |
| Thrb, Thyroid hormone receptor beta (variant 3) | NM_001128177 |
| Thrb, Thyroid hormone receptor beta (variant 4) | NM_001252634 |
| Thrb, Thyroid hormone receptor beta (variant 5) | NM_001354708 |
| Thrb, Thyroid hormone receptor beta (variant 6) | NM_001354709 |
| Thrb, Thyroid hormone receptor beta (variant 7) | NM_001354710 |
| Thrb, Thyroid hormone receptor beta (variant 8) | NM_001354711 |
| Thrb, Thyroid hormone receptor beta (variant 9) | NM_001354712 |
| Thrb, Thyroid hormone receptor beta (variant 10) | NM_001354713 |
| Thrb, Thyroid hormone receptor beta (variant 11) | NM_001354714 |
| Thrb, Thyroid hormone receptor beta (variant 12) | NM_001354715 |
| Mycl1, MYCL proto-oncogene BHLH transcription factor (variant 1) | NM_001033081 |
| Mycl1, MYCL proto-oncogene BHLH transcription factor (variant 2) | NM_001033082 |

TABLE 3-continued

Accession numbers for polynucleotides listed in Table 2

| Gene name | NCBI Accession number |
|---|---|
| Mycl1, MYCL proto-oncogene BHLH transcription factor (variant 3) | NM_005376 |
| Kdm5a, Lysine demethylase 5A | NM_001042603 |
| Creb3l4, cAMP responsive element binding protein 3 like 4 (variant 1) | NM_130898 |
| Creb3l4, cAMP responsive element binding protein 3 like 4 (variant 2) | NM_001255978 |
| Creb3l4, cAMP responsive element binding protein 3 like 4 (variant 3) | NM_001255979 |
| Creb3l4, cAMP responsive element binding protein 3 like 4 (variant 4) | NM_001255980 |
| Creb3l4, cAMP responsive element binding protein 3 like 4 (variant 5) | NM_001255981 |
| Creb3l4, cAMP responsive element binding protein 3 like 4 (variant 6) | NR_045658 |
| Etv1, ETS variant 1 (variant 1) | NM_004956 |
| Etv1, ETS variant 1 (variant 2) | NM_001163147 |
| Etv1, ETS variant 1 (variant 3) | NM_001163148 |
| Etv1, ETS variant 1 (variant 4) | NM_001163149 |
| Etv1, ETS variant 1 (variant 5) | NM_001163150 |
| Etv1, ETS variant 1 (variant 6) | NM_001163151 |
| Etv1, ETS variant 1 (variant 7) | NM_001163152 |
| Peg3, Paternally expressed 3 (variant 1) | NM_006210 |
| Peg3, Paternally expressed 3 (variant 2) | NM_001146184 |
| Peg3, Paternally expressed 3 (variant 3) | NM_001146185 |
| Peg3, Paternally expressed 3 (variant 4) | NM_001146186 |
| Peg3, Paternally expressed 3 (variant 5) | NM_001146187 |
| Bach2, BTB domain and CNC homolog 2 (variant 1) | NM_021813 |
| Bach2, BTB domain and CNC homolog 2 (variant 2) | NM_001170794 |
| Zbtb38, Zinc finger and BTB domain containing 38 (variant 1) | NM_001080412 |
| Zbtb38, Zinc finger and BTB domain containing 38 (variant 2) | NM_001350099 |
| Zbtb38, Zinc finger and BTB domain containing 38 (variant 3) | NM_001350100 |
| Lbh, Limb bud and heart development | NM_030915 |
| Tub, Tubby bipartite transcription factor (variant 1) | NM_003320 |
| Tub, Tubby bipartite transcription factor (variant 2) | NM_177972 |
| Hmg20, High mobility group20A (variant 1) | NM_018200 |
| Hmg20, High mobility group20A (variant 2) | NM_001304504 |
| Hmg20, High mobility group20A (variant 3) | NM_001304505 |
| Rest, RE1 silencing transcription factor (variant 1) | NM_005612 |
| Rest, RE1 silencing transcription factor (variant 2) | NM_001193508 |
| Rest, RE1 silencing transcription factor (variant 3) | NM_001363453 |
| Zfp827 (human Znf827;), Zinc finger protein 827 (variant 1) | NM_001306215 |
| Zfp827 (human Znf827;), Zinc finger protein 827 (variant 2) | NM_178835 |
| Aff3, AFR/FMR2 family member 3 (variant 1) | NM_002285 |
| Aff3, AFR/FMR2 family member 3 (variant 2) | NM_001025108 |
| Pknox2, PBX/knotted homeobox 2 | NM_022062 |
| Arid3b, AT-rich interaction domain 3B (variant 1) | NM_001307939 |
| Arid3b, AT-rich interaction domain 3B (variant 2) | NM_006465 |
| Mlxip, MLX interacting protein | NM_014938 |
| Zfp532 (human Znf532), Zinc finger protein 532 (variant 1) | NM_018181 |
| Zfp532 (human Znf532), Zinc finger protein 532 (variant 2) | NM_001318726 |
| Zfp532 (human Znf532), Zinc finger protein 532 (variant 3) | NM_001318727 |
| Zfp532 (human Znf532), Zinc finger protein 532 (variant 4) | NM_001318728 |
| Zfp532 (human Znf532), Zinc finger protein 532 (variant 5) | NM_001353525 |
| Zfp532 (human Znf532), Zinc finger protein 532 (variant 6) | NM_001353526 |
| Zfp532 (human Znf532), Zinc finger protein 532 (variant 7) | NM_001353527 |
| Zfp532 (human Znf532), Zinc finger protein 532 (variant 8) | NM_001353528 |
| Zfp532 (human Znf532), Zinc finger protein 532 (variant 9) | NM_001353529 |
| Zfp532 (human Znf532), Zinc finger protein 532 (variant 10) | NM_001353530 |
| Zfp532 (human Znf532), Zinc finger protein 532 (variant 11) | NM_001353531 |
| Zfp532 (human Znf532), Zinc finger protein 532 (variant 12) | NM_001353532 |
| Zfp532 (human Znf532), Zinc finger protein 532 (variant 13) | NM_001353533 |
| Zfp532 (human Znf532), Zinc finger protein 532 (variant 14) | NM_001353534 |
| Zfp532 (human Znf532), Zinc finger protein 532 (variant 15) | NM_001353535 |
| Zfp532 (human Znf532), Zinc finger protein 532 (variant 16) | NM_001353536 |
| Zfp532 (human Znf532), Zinc finger protein 532 (variant 17) | NM_001353537 |
| Zfp532 (human Znf532), Zinc finger protein 532 (variant 18) | NM_001353538 |
| Ikzf2, IKAROS family zinc finger 2 (variant 1) | NM_016260 |
| Ikzf2, IKAROS family zinc finger 2 (variant 2) | NM_001079526 |
| Sall1, Spalt like transcription factor 1 (variant 1) | NM_00296 |
| Sall1, Spalt like transcription factor 1 (variant 2) | NM_001127892 |
| Six2, SIX homeobox 2 | NM_016932 |
| Sall3, Spalt like transcription factor 3 | NM_171999 |
| Lin28b, Lin-28 homolog B | NM_001004317 |
| Rfx7, Regulatory factor X7 | NM_022841 |
| Sox4, SRY-box 4 | NM_003107 |
| Bdnf, Brain derived neurotrophic factor (variant 1) | NM_170735 |
| Bdnf, Brain derived neurotrophic factor (variant 2) | NM_170732 |
| Bdnf, Brain derived neurotrophic factor (variant 3) | NM_170731 |
| Bdnf, Brain derived neurotrophic factor (variant 4) | NM_001709 |
| Bdnf, Brain derived neurotrophic factor (variant 5) | NM_17073 |

TABLE 3-continued

Accession numbers for polynucleotides listed in Table 2

| Gene name | NCBI Accession number |
|---|---|
| Bdnf, Brain derived neurotrophic factor (variant 6) | NM_170734 |
| Bdnf, Brain derived neurotrophic factor (variant 7) | NM_001143805 |
| Bdnf, Brain derived neurotrophic factor (variant 8) | NM_001143806 |
| Bdnf, Brain derived neurotrophic factor (variant 9) | NM_001143807 |
| Bdnf, Brain derived neurotrophic factor (variant 10) | NM_001143808 |
| Bdnf, Brain derived neurotrophic factor (variant 11) | NM_001143811 |
| Bdnf, Brain derived neurotrophic factor (variant 12) | NM_001143812 |
| Bdnf, Brain derived neurotrophic factor (variant 13) | NM_001143813 |
| Bdnf, Brain derived neurotrophic factor (variant 14) | NM_001143814 |
| Bdnf, Brain derived neurotrophic factor (variant 16) | NM_001143816 |
| Bdnf, Brain derived neurotrophic factor (variant 17) | NM_001143809 |
| Bdnf, Brain derived neurotrophic factor (variant 18) | NM_001143810 |
| Ntf3, Neurotrophin 3 (variant 1) | NM_001102654 |
| Ntf3, Neurotrophin 3 (variant 2) | NM_002527 |
| Sox11, SRY-box 11 | NM_003108 |
| Tecta, Tectorin alpha | NM_005422 |
| Tectb, Tectorin beta | NM_058222 |
| Gjb2, Gap junction protein beta 2 | NM_004004 |
| Gjb6, Gap junction protein beta 6 (variant 1) | NM_001110219 |
| Gjb6, Gap junction protein beta 6 (variant 2) | NM_001110220 |
| Gjb6, Gap junction protein beta 6 (variant 3) | NM_006783 |
| Gjb6, Gap junction protein beta 6 (variant 4) | NM_001110221 |
| Tmem16a, Transmembrane protein 16A | NM_018043 |
| Ngfr, Nerve growth factor receptor | NM_002507 |
| Pmp22, peripheral myelin protein 22 (variant 1) | NM_000304 |
| Pmp22, peripheral myelin protein 22 (variant 2) | NM_153321 |
| Pmp22, peripheral myelin protein 22 (variant 3) | NM_153322 |
| Pmp22, peripheral myelin protein 22 (variant 4) | NM_001281455 |
| Pmp22, peripheral myelin protein 22 (variant 5) | NM_001281456 |
| Pmp22, peripheral myelin protein 22 (variant 8) | NM_001330143 |
| Mpz, Myelin protein zero | NM_000530 NM_001315491 |
| Mxd4, Max dimerization protein 4 | NM_006454 |
| miR-183, microRNA 183 | NR_029615 |
| miR-96, microRNA 96 | NR_029512 |
| miR-182, microRNA 182 | NR_029614 |

TABLE 4

Amino acid sequences of Atoh1 variants

| Variant | Amino acid sequence |
|---|---|
| Atoh1 variant S328A amino acid sequence | MSRLLHAEEWAEVKELGDHHRQPQPHHLPQPPPPPQPPATLQAREHPVYPPELSLL DSTDPRAWLAPTLQGICTARAAQYLLHSPELGASEAAAPRDEVDGRGELVRRSSGG ASSSKSPGPVKVREQLCKLKGGVVVDELGCSRQRAPSSKQVNGVQKQRRLAANAR ERRRMHGLNHAFDQLRNVIPSFNNDKKLSKYETLQMAQIYINALSELLQTPSGGEQP PPPPASCKSDHHHLRTAASYEGGAGNATAAGAQQASGGSQRPTPPGSCRTRFSAP ASAGGYSVQLDALHFSTFEDSALTAMMAQKNLSPSLPGSILQPVQEENAKTSPRSH RSDGEFSPHSHYSDSDEAS (SEQ ID NO: 4) |
| Atoh1 variant S331A amino acid sequence | MSRLLHAEEWAEVKELGDHHRQPQPHHLPQPPPPPQPPATLQAREHPVYPPELSLL DSTDPRAWLAPTLQGICTARAAQYLLHSPELGASEAAAPRDEVDGRGELVRRSSGG ASSSKSPGPVKVREQLCKLKGGVVVDELGCSRQRAPSSKQVNGVQKQRRLAANAR ERRRMHGLNHAFDQLRNVIPSFNNDKKLSKYETLQMAQIYINALSELLQTPSGGEQP PPPPASCKSDHHHLRTAASYEGGAGNATAAGAQQASGGSQRPTPPGSCRTRFSAP ASAGGYSVQLDALHFSTFEDSALTAMMAQKNLSPSLPGSILQPVQEENSKTAPRSH RSDGEFSPHSHYSDSDEAS (SEQ ID NO: 5) |
| Atoh1 variant S334A amino acid sequence | MSRLLHAEEWAEVKELGDHHRQPQPHHLPQPPPPPQPPATLQAREHPVYPPELSLL DSTDPRAWLAPTLQGICTARAAQYLLHSPELGASEAAAPRDEVDGRGELVRRSSGG ASSSKSPGPVKVREQLCKLKGGVVVDELGCSRQRAPSSKQVNGVQKQRRLAANAR ERRRMHGLNHAFDQLRNVIPSFNNDKKLSKYETLQMAQIYINALSELLQTPSGGEQP PPPPASCKSDHHHLRTAASYEGGAGNATAAGAQQASGGSQRPTPPGSCRTRFSAP ASAGGYSVQLDALHFSTFEDSALTAMMAQKNLSPSLPGSILQPVQEENSKTSPRAH RSDGEFSPHSHYSDSDEAS (SEQ ID NO: 6) |
| Atoh1 variant S328A/S331A amino acid sequence | MSRLLHAEEWAEVKELGDHHRQPQPHHLPQPPPPPQPPATLQAREHPVYPPELSLL DSTDPRAWLAPTLQGICTARAAQYLLHSPELGASEAAAPRDEVDGRGELVRRSSGG ASSSKSPGPVKVREQLCKLKGGVVVDELGCSRQRAPSSKQVNGVQKQRRLAANAR ERRRMHGLNHAFDQLRNVIPSFNNDKKLSKYETLQMAQIYINALSELLQTPSGGEQP |

TABLE 4-continued

Amino acid sequences of Atoh1 variants

| Variant | Amino acid sequence |
|---|---|
| | PPPPASCKSDHHHLRTAASYEGGAGNATAAGAQQASGGSQRPTPPGSCRTRFSAP<br>ASAGGYSVQLDALHFSTFEDSALTAMMAQKNLSPSLPGSILQPVQEENAKTAPRSH<br>RSDGEFSPHSHYSDSDEAS (SEQ ID NO: 7) |
| Atoh1 variant<br>S328A/S334A<br>amino acid<br>sequence | MSRLLHAEEWAEVKELGDHHRQPQPHHLPQPPPPPQPPATLQAREHPVYPPELSLL<br>DSTDPRAWLAPTLQGICTARAAQYLLHSPELGASEAAAPRDEVDGRGELVRRSSGG<br>ASSSKSPGPVKVREQLCKLKGGVVVDELGGSRQRAPSSKQVNGVQKQRRLAANAR<br>ERRRMHGLNHAFDQLRNVIPSFNNDKKLSKYETLQMAQIYINALSELLQTPSGGEQP<br>PPPPASCKSDHHHLRTAASYEGGAGNATAAGAQQASGGSQRPTPPGSCRTRFSAP<br>ASAGGYSVQLDALHFSTFEDSALTAMMAQKNLSPSLPGSILQPVQEENAKTSPRAH<br>RSDGEFSPHSHYSDSDEAS (SEQ ID NO: 8) |
| Atoh1 variant<br>S331A/S334A<br>amino acid<br>sequence | MSRLLHAEEWAEVKELGDHHRQPQPHHLPQPPPPPQPPATLQAREHPVYPPELSLL<br>DSTDPRAWLAPTLQGICTARAAQYLLHSPELGASEAAAPRDEVDGRGELVRRSSGG<br>ASSSKSPGPVKVREQLCKLKGGVVVDELGCSRQRAPSSKQVNGVQKQRRLAANAR<br>ERRRMHGLNHAFDQLRNVIPSFNNDKKLSKYETLQMAQIYINALSELLQTPSGGEQP<br>PPPPASCKSDHHHLRTAASYEGGAGNATAAGAQQASGGSQRPTPPGSGRTRFSAP<br>ASAGGYSVQLDALHFSTFEDSALTAMMAQKNLSPSLPGSILQPVQEENSKTAPRAH<br>RSDGEFSPHSHYSDSDEAS (SEQ ID NO: 9) |
| Atoh1 variant<br>S328A/S331A/<br>S334<br>amino acid<br>sequence | MSRLLHAEEWAEVKELGDHHRQPQPHHLPQPPPPPQPPATLQAREHPVYPPELSLL<br>DSTDPRAWLAPTLQGICTARAAQYLLHSPELGASEAAAPRDEVDGRGELVRRSSGG<br>ASSSKSPGPVKVREQLCKLKGGVVVDELGCSRQRAPSSKQVNGVQKQRRLAANAR<br>ERRRMHGLNHAFDQLRNVIPSFNNDKKLSKYETLQMAQIYINALSELLQTPSGGEQP<br>PPPPASCKSDHHHLRTAASYEGGAGNATAAGAQQASGGSQRPTPPGSCRTRFSAP<br>ASAGGYSVQLDALHFSTFEDSALTAMMAQKNLSPSLPGSILQPVQEENAKTAPRAH<br>RSDGEFSPHSHYSDSDEAS (SEQ ID NO: 10) |

In some embodiments, the polynucleotide is or encodes a component of a gene editing system. An AAV1 vector containing a component of a gene editing system operably linked to a cell type-specific promoter (e.g., a cell type-specific promoter listed in Table 5) can be used for cell type-specific gene editing. For example, the component of a gene editing system can be used to introduce an alteration (e.g., insertion, deletion (e.g., knockout), translocation, inversion, single point mutation, or other mutation) in a gene known to regulate inner ear cell function, such as a gene that is implicated in sensorineural hearing loss or vestibular dysfunction. Exemplary gene editing systems include zinc finger nucleases (ZFNs), Transcription Activator-Like Effector-based Nucleases (TALENs), and the clustered regulatory interspaced short palindromic repeat (CRISPR) system. ZFNs, TALENs, and CRISPR-based methods are described, e.g., in Gaj et al., Trends Biotechnol. 31:397-405, 2013.

CRISPR refers to a set of (or system including a set of) clustered regularly interspaced short palindromic repeats. A CRISPR system refers to a system derived from CRISPR and Cas (a CRISPR-associated protein) or another nuclease that can be used to silence or mutate a gene described herein. The CRISPR system is a naturally occurring system found in bacterial and archaeal genomes. The CRISPR locus is made up of alternating repeat and spacer sequences. In naturally occurring CRISPR systems, the spacers are typically sequences that are foreign to the bacterium (e.g., plasmid or phage sequences). The CRISPR system has been modified for use in gene editing (e.g., changing, silencing, and/or enhancing certain genes) in eukaryotes. See, e.g., Wiedenheft et al., Nature 482: 331, 2012. For example, such modification of the system includes introducing into a eukaryotic cell a plasmid containing a specifically-designed CRISPR and one or more appropriate Cas proteins. The CRISPR locus is transcribed into RNA and processed by Cas proteins into small RNAs that comprise a repeat sequence flanked by a spacer. The RNAs serve as guides to direct Cas proteins to silence specific DNA/RNA sequences, depending on the spacer sequence. See, e.g., Horvath et al., Science 327: 167, 2010; Makarova et al., Biology Direct 1:7, 2006; Pennisi, Science 341:833, 2013. In some examples, the CRISPR system includes the Cas9 protein, a nuclease that cuts on both strands of the DNA. See, e.g., Id.

In some embodiments, in a CRISPR system for use described herein, e.g., in accordance with one or more methods described herein, the spacers of the CRISPR are derived from a target gene sequence, e.g., from a gene known to regulate inner ear cell function, such as a gene that is implicated in sensorineural hearing loss or vestibular dysfunction.

In some embodiments, the polynucleotide includes a guide RNA (gRNA) for use in a clustered regulatory interspaced short palindromic repeat (CRISPR) system for gene editing. In some embodiments, the polynucleotide includes or encodes a zinc finger nuclease (ZFN), or an mRNA encoding a ZFN, that targets (e.g., cleaves) a nucleic acid sequence (e.g., DNA sequence) of a gene known to regulate inner ear cell function, such as a gene that is implicated in sensorineural hearing loss or vestibular dysfunction. In some embodiments, the polynucleotide includes or encodes a TALEN, or an mRNA encoding a TALEN, that targets (e.g., cleaves) a nucleic acid sequence (e.g., DNA sequence) of a gene known to regulate inner ear cell function, such as a gene that is implicated in sensorineural hearing loss or vestibular dysfunction.

For example, the gRNA can be used in a CRISPR system to engineer an alteration in a gene (e.g., a gene known to regulate inner ear cell function, such as a gene that is implicated in sensorineural hearing loss or vestibular dysfunction). In other examples, the ZFN and/or TALEN can be used to engineer an alteration in a gene (e.g., a gene known to regulate inner ear cell function, such as a gene that is implicated in sensorineural hearing loss or vestibular dysfunction). Exemplary alterations include insertions, deletions (e.g., knockouts), translocations, inversions, single point mutations, or other mutations. The alteration can be introduced in the gene in a cell, e.g., in vitro, ex vivo, or in vivo. In some embodiments, the alteration decreases the level and/or activity of (e.g., knocks down or knocks out) a gene known to regulate inner ear cell function, such as a gene that is implicated in sensorineural hearing loss or vestibular dysfunction, e.g., the alteration is a negative regulator of function. In yet another example, the alteration corrects a defect (e.g., a mutation causing a defect), in a gene known to regulate inner ear cell function, such as a gene that is implicated in sensorineural hearing loss or vestibular dysfunction.

In certain embodiments, the CRISPR system is used to edit (e.g., to add or delete a base pair) a target gene, e.g., a gene known to regulate inner ear cell function, such as a gene that is implicated in sensorineural hearing loss or vestibular dysfunction. In other embodiments, the CRISPR system is used to introduce a premature stop codon, e.g., thereby decreasing the expression of a target gene. In yet other embodiments, the CRISPR system is used to turn off a target gene in a reversible manner, e.g., similarly to RNA interference. In some embodiments, the CRISPR system is used to direct Cas to a promoter of a target gene, e.g., a gene known to regulate inner ear cell function, such as a gene that is implicated in sensorineural hearing loss or vestibular dysfunction, thereby blocking an RNA polymerase sterically.

In some embodiments, a CRISPR system can be generated to edit a gene known to regulate inner ear cell function, such as a gene that is implicated in sensorineural hearing loss or vestibular dysfunction, using technology described in, e.g., U.S. Publication No. 20140068797; Cong, Science 339: 819, 2013; Tsai, Nature Biotechnol., 32:569, 2014; and U.S. Pat. Nos. 8,871,445; 8,865,406; 8,795,965; 8,771,945; and 8,697,359.

In some embodiments, the CRISPR interference (CRISPRi) technique can be used for transcriptional repression of specific genes, e.g., the gene encoding a gene known to regulate inner ear cell function, such as a gene that is implicated in sensorineural hearing loss or vestibular dysfunction. In CRISPRi, an engineered Cas9 protein (e.g., nuclease-null dCas9, or dCas9 fusion protein, e.g., dCas9-KRAB or dCas9-SID4X fusion) can pair with a sequence specific guide RNA (sgRNA). The Cas9-g RNA complex can block RNA polymerase, thereby interfering with transcription elongation. The complex can also block transcription initiation by interfering with transcription factor binding. The CRISPRi method is specific with minimal off-target effects and is multiplexable, e.g., can simultaneously repress more than one gene (e.g., using multiple gRNAs). Also, the CRISPRi method permits reversible gene repression.

In some embodiments, CRISPR-mediated gene activation (CRISPRa) can be used for transcriptional activation, e.g., of one or more genes described herein, e.g., a gene known to regulate inner ear cell function, such as a gene that is implicated in sensorineural hearing loss or vestibular dysfunction. In the CRISPRa technique, dCas9 fusion proteins recruit transcriptional activators. For example, dCas9 can be used to recruit polypeptides (e.g., activation domains) such as VP64 or the p65 activation domain (p65D) and used with sgRNA (e.g., a single sgRNA or multiple sgRNAs), to activate a gene or genes, e.g., endogenous gene(s). Multiple activators can be recruited by using multiple sgRNAs—this can increase activation efficiency. A variety of activation domains and single or multiple activation domains can be used. In addition to engineering dCas9 to recruit activators, sgRNAs can also be engineered to recruit activators. For example, RNA aptamers can be incorporated into a sgRNA to recruit proteins (e.g., activation domains) such as VP64. In some examples, the synergistic activation mediator (SAM) system can be used for transcriptional activation. In SAM, MS2 aptamers are added to the sgRNA. MS2 recruits the MS2 coat protein (MCP) fused to p65AD and heat shock factor 1 (HSF1). The CRISPRi and CRISPRa techniques are described in greater detail, e.g., in Dominguez et al., Nat. Rev. Mol. Cell Biol. 17:5, 2016, incorporated herein by reference.

Polynucleotides Encoding Proteins of Interest

One platform that can be used to achieve therapeutically effective intracellular concentrations of proteins of interest in primate (e.g., human) cells is via the stable expression of the nucleic acid encoding the protein of interest (e.g., by integration into the nuclear or mitochondrial genome of a primate (e.g., human) cell, or by episomal concatemer formation in the nucleus of a primate (e.g., human) cell). The nucleic acid is a polynucleotide that encodes the primary amino acid sequence of the corresponding protein. In order to introduce exogenous genes into a primate (e.g., human) cell, genes can be incorporated into a vector, such as an AAV1 vector (e.g., an AAV1 vector containing a wild-type AAV1 capsid). For introduction into an inner ear cell, the AAV1 vector can be administered locally to the inner ear of a primate (e.g., human) subject.

Recognition and binding of the polynucleotide encoding a protein of interest by primate (e.g., human) RNA polymerase is important for gene expression. As such, one may include sequence elements within the polynucleotide that exhibit a high affinity for transcription factors that recruit RNA polymerase and promote the assembly of the transcription complex at the transcription initiation site. Such sequence elements include, e.g., a promoter, the sequence of which can be recognized and bound by specific transcription initiation factors and ultimately RNA polymerase. Examples of promoters have been described in Smith, et al., Mol. Sys. Biol., 3:73, online publication, the disclosure of which is incorporated herein by reference. The promoter used in the methods and compositions described herein can be a ubiquitous promoter (e.g., to induce or increase expression of the polynucleotide in all cells of the inner ear) or a cell type-specific promoter (e.g., to induce or increase expression of the polynucleotide in one or more inner ear cell types). Ubiquitous promoters include the CAG promoter, cytomegalovirus (CMV) promoter, the smCBA promoter (described in Haire et al., Invest. Opthalmol. Vis. Sci. 47:3745-3753, 2006), the dihydrofolate reductase (DHFR) promoter, the β-actin promoter, the phosphoglycerol kinase (PGK) promoter, and the EF1α promoter. Alternatively, promoters derived from viral genomes can also be used for the stable expression of polynucleotides in primate (e.g., human) cells. Examples of functional viral promoters that can be used for the expression of polynucleotides in primate (e.g., human) cells include adenovirus late promoter, vaccinia virus 7.5K promoter, tk promoter of HSV, mouse mammary tumor virus (MMTV) promoter, LTR promoter of HIV, promoter of moloney virus, Epstein barr virus (EBV) promoter, and the Rous sarcoma virus (RSV) promoter.

Cell type-specific promoters that can be included in AAV1 vectors described herein to express a nucleic acid encoding a protein of interest (e.g., a polynucleotide listed in Table 2) in one or more inner ear cell types are provided in Table 5, below.

TABLE 5

Inner ear cell type-specific promoters

| Cell Type | Promoter |
|---|---|
| IHCs | Solute Carrier Family 17 Member 8 (SLC17A8), OTOF, Fibroblast Growth Factor 8 (FGF8) |
| OHCs | Prestin (SLC26A5), OCM, STRC, ATPase Plasma Membrane Ca2+ Transporting 2 (ATP2B2) |
| Cochlear hair cells (IHCs and OHCs) | Myosin 15A (MYO15), GFI1, POU4F3, MYO7A |
| Supporting cells | SRY-Box 2 (SOX2) |
| Supporting cell progenitors | Leucine Rich Repeat Containing G Protein-Coupled Receptor 5 (LGR5) |
| Vestibular HCs | MYO15, GFI1, POU4F3, MYO7A |
| Type I vestibular HCs | ATP2B2 |
| Type II vestibular HCs | Calbindin 2 (CALB2) |
| Vestibular supporting cells (e.g., supporting cells of the utricle) | Glial Acidic Fibrillary Protein (GFAP), Solute Carrier Family 1 Member 3 (GLAST), HES1, Jagged 1 (JAG1), Notch 1 (NOTCH1), LGR5, SOX2, Hes Family BHLH Transcription Factor 5 (HES5), and SOX9 |
| Border cells (cochlear supporting cell subtype) | GLAST, GJB2 |
| Inner phalangeal cells (cochlear supporting cell subtype) | GLAST, GJB2 |
| Pillar cells (cochlear supporting cell subtype) | CD44 Molecule (CD44), GJB2 |
| Deiters' cells (cochlear supporting cell subtype) | Fibroblast Growth Factor Receptor 3 (FGFR3), GJB2 |
| Hensen's cells (cochlear supporting cell subtype) | Frizzled Related Protein (FRZB), GJB2 |
| Claudius cells (cochlear supporting cell subtype) | FRZB, GJB2 |
| Spiral prominence cells | SLC26A4 |
| Root cells | SLC26A4 |
| Interdental cells | CEACAM16, GJB2 |
| Basal cells of the SV | Claudin 11 (CLDN11), GJB2 |
| Intermediate cells of the SV | Tyrosinase (TYR), Potassium Voltage-Gated Channel Subfamily J Member 10 (KCNJ10), GJB2 |
| Marginal cells of the SV | KCNE1, KCNQ1, GJB2 |
| SGNs | Basic Helix-Loop-Helix Family Member E22 (BHLHE22), Synapsin (SYN) |
| SGNs with a high rate of spontaneous firing | CALB2 |
| Glia | PMP22 |
| Vestibular dark cells | KCNE1 |
| Fibrocytes/mesenchyme | POU3F4, GJB2 |
| Scarpa's ganglion (Vestibular ganglion) | TUBB3, SYN |

Once a polynucleotide encoding a protein of interest has been incorporated into a primate (e.g., human) cell, the transcription of this polynucleotide can be induced by methods known in the art. For example, expression can be induced by exposing the primate (e.g., human) cell to an external chemical reagent, such as an agent that modulates the binding of a transcription factor and/or RNA polymerase to the promoter and thus regulates gene expression. The chemical reagent can serve to facilitate the binding of RNA polymerase and/or transcription factors to the promoter, e.g., by removing a repressor protein that has bound the promoter. Alternatively, the chemical reagent can serve to enhance the affinity of the promoter for RNA polymerase and/or transcription factors such that the rate of transcription of the gene located downstream of the promoter is increased in the presence of the chemical reagent. Examples of chemical reagents that potentiate polynucleotide transcription by the above mechanisms include tetracycline and doxycycline. These reagents are commercially available (Life Technologies, Carlsbad, CA) and can be administered to a primate (e.g., human) cell in order to promote gene expression according to established protocols.

Other DNA sequence elements that may be included in polynucleotides for use in the compositions and methods described herein include enhancer sequences. Enhancers represent another class of regulatory elements that induce a conformational change in the polynucleotide containing the polynucleotide such that the DNA adopts a three-dimensional orientation that is favorable for binding of transcription factors and RNA polymerase at the transcription initiation site. Thus, polynucleotides for use in the compositions and methods described herein include those that encode a protein of interest and additionally include an enhancer sequence. Many enhancer sequences are now known, and examples include enhancers from the genes that encode globin, elastase, albumin, α-fetoprotein, and insulin. Enhancers for use in the compositions and methods described herein also include those that are derived from the genetic material of a virus capable of infecting a eukaryotic cell. Examples include the SV40 enhancer on the late side of the replication origin (bp 100-270), the cytomegalovirus early promoter enhancer, the polyoma enhancer on the late side of the replication origin, and adenovirus enhancers. Additional enhancer sequences that induce activation of eukaryotic gene transcription include the CMV enhancer and RSV enhancer. An enhancer may be spliced into a vector containing a polynucleotide encoding a protein of interest, for example, at a position 5' or 3' to this gene. In a preferred orientation, the enhancer is positioned at the 5' side of the promoter, which in turn is located 5' relative to the polynucleotide encoding a protein of interest.

The AAV1 vectors described herein may include a Woodchuck Posttranscriptional Regulatory Element (WPRE). The WPRE acts at the transcriptional level, by promoting nuclear export of transcripts and/or by increasing the efficiency of polyadenylation of the nascent transcript, thus increasing the total amount of mRNA in the cell. The addition of the WPRE to a vector can result in a substantial improvement in the level of transgene expression from several different promoters, both in vitro and in vivo.

In some embodiments, the AAV1 vectors described herein include a reporter sequence, which can be useful in verifying the expression of a nucleic acid contained in the AAV1 vector, for example, in cells and tissues (e.g., in the cochlea and/or vestibular system, or in specific inner ear cell types, such as IHCs, OHCs, cochlear supporting cells, vestibular hair cells, and/or vestibular supporting cells). Reporter sequences that may be provided in a transgene include DNA sequences encoding β-lactamase, β-galactosidase (LacZ), alkaline phosphatase, thymidine kinase, green fluorescent protein (GFP), chloramphenicol acetyltransferase (Cat), luciferase, and others well known in the art. When associated with regulatory elements that drive their expression, such as a ubiquitous or cell type-specific promoter described herein, the reporter sequences provide signals detectable by conventional means, including enzymatic, radiographic, colorimetric, fluorescence or other spectrographic assays, fluorescent activating cell sorting assays and immunological assays, including enzyme linked immunosorbent assay (ELISA), radioimmunoassay (RIA), and immunohistochemistry. For example, where the marker sequence is the LacZ gene, the presence of the vector carrying the signal is detected by assays for β-galactosidase activity. Where the transgene is green fluorescent protein or luciferase, the vector carrying the signal may be measured visually by color or light production in a luminometer.

In some embodiments, the AAV1 vectors described herein are used to express two or more polynucleotides (e.g., two or more polynucleotides listed in Table 2, e.g., the AAV1 vector contains polynucleotides encoding two different proteins of interest). In some embodiments, the two or more polynucleotides are expressed using a bicistronic or polycistronic expression cassette. In some embodiments, the polycistronic expression cassette includes an internal ribosomal entry site (IRES) positioned between the two or more polynucleotides (e.g., an IRES positioned between the polynucleotides encoding two different proteins of interest). In some embodiments, the polycistronic expression cassette includes a foot-and-mouth disease virus 2A (FMDV 2A) polynucleotide positioned between the two or more polynucleotides (e.g., an FMDV 2A polynucleotide positioned between each nucleic acid encoding a protein of interest).

In some embodiments, two or more AAV1 vectors described herein (e.g., 2, 3, 4, or more AAV1 vectors) may be used to express a single polynucleotide (e.g., a single polynucleotide listed in Table 2), such as a polynucleotide having a coding sequence of 3 kb or longer (e.g., 3 kb, 3.5 kb, 4 kb, 4.5 kb, 5 kb, 5.5 kb, 6 kb, 6.5 kb, or longer). For example, two or more AAV1 vectors may be used to express a polynucleotide encoding Otoferlin, which has a coding sequence of approximately 6 kb. In embodiments in which two or more AAV1 vectors are used to express a single polynucleotide, the coding sequence of the polynucleotide is divided between the vectors such that the full-length coding sequence can be reconstituted in vivo. In some embodiments, a dual vector system including two AAV1 vectors can be used to express a single polynucleotide (e.g., a single polynucleotide listed in Table 2). A portion of the coding sequence of the polynucleotide (e.g., a polynucleotide having a coding sequence of 3 kb, 3.5 kb, 4 kb, 4.5 kb, 5 kb, 5.5 kb, 6 kb, 6.5 kb, or longer) can be contained within each AAV1 vector (e.g., one AAV1 vector may include an N-terminal portion of the coding sequence and the other AAV1 vector may include a C-terminal portion of the coding sequence). Exemplary dual vector systems include fragmented dual vectors, overlapping dual vectors, trans-splicing dual vectors, and dual hybrid vectors. These systems are described in McClements and MacLaren, Yale J Biol Med. 90:611-623, 2017, the disclosure of which is incorporated herein by reference.

In some embodiments, the AAV1 vectors described herein contain polynucleotide sequences that enhance the rate of translation of polynucleotides or improve the stability or nuclear export of the mRNA that results from gene transcription. These sequence elements include, e.g., 5' and 3' untranslated regions, an IRES, and polyadenylation signal site in order to direct efficient transcription of the nucleic acid carried in the vector. The vectors suitable for use with the compositions and methods described herein may also contain a polynucleotide encoding a marker for selection of cells that contain such a vector. Examples of a suitable marker include genes that encode resistance to antibiotics, such as ampicillin, chloramphenicol, kanamycin, or nourseothricin.

AAV1 Vectors for Nucleic Acid Delivery

In some embodiments, polynucleotides (e.g., polynucleotides corresponding to genes expressed in healthy inner ear cells, such as the wild-type form of genes implicated in hearing loss and/or vestibular dysfunction, or genes involved in inner ear cell development, function, cell fate specification, regeneration, survival, proliferation, and/or maintenance) are incorporated into AAV1 vectors and/or virions (e.g., AAV1 vectors containing a wild-type AAV1 capsid) in order to facilitate their introduction into a cell. In some embodiments, AAV1 vectors useful in the compositions and methods described herein contain wild-type AAV1 capsid proteins having the amino acid sequences SEQ ID NOs: 1-3, as shown below.

In some embodiments, the wild-type AAV1 capsid protein VP1 has the amino acid sequence of SEQ ID NO: 1.

```
                                            (SEQ ID NO: 1)
MAADGYLPDWLEDNLSEGIREWWDLKPGAPKPKANQQKQDDGRGLVLPGY

KYLGPFNGLDKGEPVNAADAAALEHDKAYDQQLKAGDNPYLRYNHADAEF

QERLQEDTSFGGNLGRAVFQAKKRVLEPLGLVEEGAKTAPGKKRPVEQSP

QEPDSSSGIGKTGQQPAKKRLNFGQTGDSESVPDPQPLGEPPATPAAVGP

TTMASGGGAPMADNNEGADGVGNASGNWHCDSTWLGDRVITTSTRTWALP

TYNNHLYKQISSASTGASNDNHYFGYSTPWGYFDFNRFHCHFSPRDWQRL

INNNWGFRPKRLNFKLFNIQVKEVTTNDGVTTIANNLTSTVQVFSDSEYQ

LPYVLGSAHQGCLPPFPADVFMIPQYGYLTLNNGSQAVGRSSFYCLEYFP

SQMLRTGNNFTFSYTFEEVPFHSSYAHSQSLDRLMNPLIDQYLYYLNRTQ

NQSGSAQNKDLLFSRGSPAGMSVQPKNWLPGPCYRQQRVSKTKTDNNNSN

FTWTGASKYNLNGRESIINPGTAMASHKDDEDKFFPMSGVMIFGKESAGA

SNTALDNVMITDEEEIKATNPVATERFGTVAVNFQSSSTDPATGDVHAMG

ALPGMVWQDRDVYLQGPIWAKIPHTDGHFHPSPLMGGFGLKNPPPQILIK
```

-continued
NTPVPANPPAEFSATKFASFITQYSTGQVSVEIEWELQKENSKRWNPEVQ

YTSNYAKSANVDFTVDNNGLYTEPRPIGTRYLTRPL

In some embodiments, the wild-type AAV1 capsid protein VP2 has the amino acid sequence of SEQ ID NO: 2.

(SEQ ID NO: 2)
TAPGKKRPVEQSPQEPDSSSGIGKTGQQPAKKRLNFGQTGDSESVPDPQP

LGEPPATPAAVGPTTMASGGGAPMADNNEGADGVGNASGNWHCDSTWLGD

RVITTSTRTWALPTYNNHLYKQISSASTGASNDNHYFGYSTPWGYFDFNR

FHCHFSPRDWQRLINNNWGFRPKRLNFKLFNIQVKEVTTNDGVTTIANNL

TSTVQVFSDSEYQLPYVLGSAHQGCLPPFPADVFMIPQYGYLTLNNGSQA

VGRSSFYCLEYFPSQMLRTGNNFTFSYTFEEVPFHSSYAHSQSLDRLMNP

LIDQYLYYLNRTQNQSGSAQNKDLLFSRGSPAGMSVQPKNWLPGPCYRQQ

RVSKTKTDNNNSNFTWTGASKYNLNGRESIINPGTAMASHKDDEDKFFPM

SGVMIFGKESAGASNTALDNVMITDEEEIKATNPVATERFGTVAVNFQSS

STDPATGDVHAMGALPGMVWQDRDVYLQGPIWAKIPHTDGHFHPSPLMGG

FGLKNPPPQILIKNTPVPANPPAEFSATKFASFITQYSTGQVSVEIEWEL

QKENSKRWNPEVQYTSNYAKSANVDFTVDNNGLYTEPRPIGTRYLTRPL

In some embodiments, the wild-type AAV1 capsid protein VP3 has the amino acid sequence of SEQ ID NO: 3.

(SEQ ID NO: 3)
MASGGGAPMADNNEGADGVGNASGNWHCDSTWLGDRVITTSTRTWALPTY

NNHLYKQISSASTGASNDNHYFGYSTPWGYFDFNRFHCHFSPRDWQRLIN

NNWGFRPKRLNFKLFNIQVKEVTTNDGVTTIANNLTSTVQVFSDSEYQLP

YVLGSAHQGCLPPFPADVFMIPQYGYLTLNNGSQAVGRSSFYCLEYFPSQ

MLRTGNNFTFSYTFEEVPFHSSYAHSQSLDRLMNPLIDQYLYYLNRTQNQ

SGSAQNKDLLFSRGSPAGMSVQPKNWLPGPCYRQQRVSKTKTDNNNSNFT

WTGASKYNLNGRESIINPGTAMASHKDDEDKFFPMSGVMIFGKESAGASN

TALDNVMITDEEEIKATNPVATERFGTVAVNFQSSSTDPATGDVHAMGAL

PGMVWQDRDVYLQGPIWAKIPHTDGHFHPSPLMGGFGLKNPPPQILIKNT

PVPANPPAEFSATKFASFITQYSTGQVSVEIEWELQKENSKRWNPEVQYT

SNYAKSANVDFTVDNNGLYTEPRPIGTRYLTRPL

AAV1 vectors useful in the compositions and methods described herein are recombinant nucleic acid constructs that include one or more of (1) a promoter described herein (e.g., a ubiquitous promoter or a cell type-specific promoter), (2) a heterologous sequence to be expressed (e.g., a polynucleotide listed in Table 2), and (3) viral sequences that facilitate integration and expression of the heterologous genes. The viral sequences may include those sequences of AAV that are required in cis for replication and packaging (e.g., functional ITRs) of the DNA into a virion. In typical applications, the heterologous transgene encodes a protein expressed in healthy inner ear cells that can promote inner ear cell development, function, cell fate specification, regeneration, survival, proliferation, and/or maintenance, or a wild-type form of a hair cell protein that is mutated in subjects with hereditary or genetic hearing loss, deafness, and/or vestibular dysfunction (e.g., dizziness, vertigo, or imbalance). Such AAV1 vectors may also contain marker or reporter genes. Useful AAV1 vectors have one or more of the AAV WT genes deleted in whole or in part, but retain functional flanking ITR sequences. The AAV ITRs included in the AAV1 vectors described herein may be of any serotype suitable for a particular application (e.g., the ITRs may be AAV1, AAV2, AAV3, AAV4, AAV5, AAV6, AAV7, AAV8, AAV9, AAV10, or AAV11 ITRs). For use in the methods and compositions described herein, the ITRs can be AAV2 ITRs. Methods for using AAV vectors are described, for example, in Tal et al., J. Biomed. Sci. 7:279 (2000), and Monahan and Samulski, Gene Delivery 7:24 (2000), the disclosures of each of which are incorporated herein by reference as they pertain to AAV vectors for gene delivery.

The promoters and polynucleotides described herein can be incorporated into an AAV1 virion in order to facilitate introduction of the promoter and/or polynucleotide into a primate (e.g., human) inner ear cell. The capsid proteins of AAV1 compose the exterior, non-nucleic acid portion of the virion and are encoded by the AAV1 cap gene. The cap gene encodes three viral coat proteins, VP1, VP2 and VP3, which are required for virion assembly. The construction of AAV virions has been described, for instance, in U.S. Pat. Nos. 5,173,414; 5,139,941; 5,863,541; 5,869,305; 6,057,152; and 6,376,237; as well as in Rabinowitz et al., J. Virol. 76:791 (2002) and Bowles et al., J. Virol. 77:423 (2003), the disclosures of each of which are incorporated herein by reference as they pertain to AAV vectors for gene delivery. The capsid proteins of the AAV1 vectors for use in the compositions and methods described herein can have the amino acid sequences (and be encoded by the polynucleotide sequence) described in U.S. Pat. No. 6,759,237, which is incorporated herein by reference.

AAV virions useful in conjunction with the compositions and methods described herein include those derived from AAV serotype 1 (e.g., an AAV1 vector containing a wild-type AAV1 capsid). Construction and use of AAV vectors and AAV proteins of different serotypes are described, for instance, in Chao et al., Mol. Ther. 2:619 (2000); Davidson et al., Proc. Natl. Acad. Sci. USA 97:3428 (2000); Xiao et al., J. Virol. 72:2224 (1998); Halbert et al., J. Virol. 74:1524 (2000); Halbert et al., J. Virol. 75:6615 (2001); and Auricchio et al., Hum. Molec. Genet. 10:3075 (2001), the disclosures of each of which are incorporated herein by reference as they pertain to AAV vectors for gene delivery.

Also useful in conjunction with the compositions and methods described herein are pseudotyped rAAV vectors. Pseudotyped vectors include AAV vectors of a given serotype (e.g., AAV2, AAV3, AAV4, AAV5, AAV6, AAV7, AAV8, AAV9, or AAV8) pseudotyped with a capsid gene derived from AAV1 (e.g., a wild-type AAV1 capsid). Techniques involving the construction and use of pseudotyped rAAV virions are known in the art and are described, for instance, in Duan et al., J. Virol. 75:7662 (2001); Halbert et al., J. Virol. 74:1524 (2000); Zolotukhin et al., Methods, 28:158 (2002); and Auricchio et al., Hum. Molec. Genet. 10:3075 (2001).

Pharmaceutical Compositions

The AAV1 vectors (e.g., an AAV1 vector containing a wild-type AAV1 capsid) described herein can be incorporated into a vehicle for administration into a patient, such as a primate (e.g., human) patient suffering from sensorineural hearing loss, deafness, auditory neuropathy, tinnitus, and/or vestibular dysfunction. Pharmaceutical compositions containing vectors, such as AAV1 vectors, can be prepared using methods known in the art. For example, such compositions can be prepared using, e.g., physiologically acceptable carriers, excipients or stabilizers (Remington: The Science and Practice of Pharmacology 22nd edition, Allen, L. Ed. (2013); incorporated herein by reference), and in a desired form, e.g., in the form of lyophilized formulations or aqueous solutions.

Mixtures of AAV1 vectors may be prepared in water suitably mixed with one or more excipients, carriers, or diluents. Dispersions may also be prepared in glycerol, liquid polyethylene glycols, and mixtures thereof and in oils. Under ordinary conditions of storage and use, these preparations may contain a preservative to prevent the growth of microorganisms. The pharmaceutical forms suitable for injectable use include sterile aqueous solutions or dispersions and sterile powders for the extemporaneous preparation of sterile injectable solutions or dispersions (described in U.S. Pat. No. 5,466,468, the disclosure of which is incorporated herein by reference). In any case the formulation may be sterile and may be fluid to the extent that easy syringability exists. Formulations may be stable under the conditions of manufacture and storage and may be preserved against the contaminating action of microorganisms, such as bacteria and fungi. The carrier can be a solvent or dispersion medium containing, for example, water, ethanol, polyol (e.g., glycerol, propylene glycol, and liquid polyethylene glycol, and the like), suitable mixtures thereof, and/or vegetable oils. Proper fluidity may be maintained, for example, by the use of a coating, such as lecithin, by the maintenance of the required particle size in the case of dispersion and by the use of surfactants. The prevention of the action of microorganisms can be brought about by various antibacterial and antifungal agents, for example, parabens, chlorobutanol, phenol, sorbic acid, thimerosal, and the like. In many cases, it will be preferable to include isotonic agents, for example, sugars or sodium chloride. Prolonged absorption of the injectable compositions can be brought about by the use in the compositions of agents delaying absorption, for example, aluminum monostearate and gelatin.

For example, a solution containing a pharmaceutical composition described herein may be suitably buffered, if necessary, and the liquid diluent first rendered isotonic with sufficient saline or glucose. These particular aqueous solutions are especially suitable for intravenous, intramuscular, subcutaneous, and intraperitoneal administration. In this connection, sterile aqueous media that can be employed will be known to those of skill in the art in light of the present disclosure. For example, one dosage may be dissolved in 1 ml of isotonic NaCl solution and either added to 1000 ml of hypodermoclysis fluid or injected at the proposed site of infusion. Some variation in dosage will necessarily occur depending on the condition of the subject being treated. For local administration to the inner ear, the composition may be formulated to contain a synthetic perilymph solution. An exemplary synthetic perilymph solution includes 20-200 mM NaCl, 1-5 mM KCl, 0.1-10 mM $CaCl_2$, 1-10 mM glucose, and 2-50 mM HEPEs, with a pH between about 6 and 9 and an osmolality of about 300 mOsm/kg. The person responsible for administration will, in any event, determine the appropriate dose for the individual subject. Moreover, for primate (e.g., human) administration, preparations may meet sterility, pyrogenicity, general safety, and purity standards as required by FDA Office of Biologics standards.

Methods of Treatment

The AAV1 vectors (e.g., AAV1 vectors containing a wild-type AAV1 capsid) described herein may be administered to a subject with sensorineural hearing loss, auditory neuropathy, deafness, tinnitus, and/or vestibular dysfunction by a variety of routes, such as local administration to the inner ear or middle ear (e.g., administration into the perilymph or endolymph, such as through the oval window, endolymphatic sac, round window, or semicircular canal, e.g., transtympanic or intratympanic injection), intravenous, parenteral, intradermal, transdermal, intramuscular, intranasal, subcutaneous, percutaneous, intratracheal, intraperitoneal, intraarterial, intravascular, inhalation, perfusion, lavage, and oral administration. The most suitable route for administration in any given case will depend on the particular composition administered, the patient, pharmaceutical formulation methods, administration methods (e.g., administration time and administration route), the patients age, body weight, sex, severity of the disease being treated, the patient's diet, and the patient's excretion rate. Compositions may be administered once, or more than once (e.g., once annually, twice annually, three times annually, bi-monthly, or monthly).

Subjects that may be treated as described herein are subjects having or at risk of developing sensorineural hearing loss, deafness, auditory neuropathy, tinnitus, and/or vestibular dysfunction (e.g., subjects having or at risk of developing hearing loss, vestibular dysfunction, or both). The compositions and methods described herein can be used to treat subjects having or at risk of developing damage to cells of the inner ear (e.g., cochlear hair cells, vestibular hair cells, cochlear supporting cells, vestibular supporting cells, and/or spiral ganglion neurons, e.g., damage related to acoustic trauma, disease or infection, head trauma, ototoxic drugs, or aging), subjects having or at risk of developing sensorineural hearing loss, deafness, tinnitus, or auditory neuropathy, subjects having or at risk of developing vestibular dysfunction (e.g., dizziness, vertigo, or imbalance), subjects having tinnitus (e.g., tinnitus alone, or tinnitus that is associated with sensorineural hearing loss or vestibular dysfunction), subjects having a genetic mutation associated with hearing loss and/or vestibular dysfunction, or subjects with a family history of hereditary hearing loss, deafness, auditory neuropathy, tinnitus, or vestibular dysfunction. In some embodiments, the subject has hearing loss and/or vestibular dysfunction that is associated with or results from damage, degeneration, dysfunction, or loss of inner ear cells (e.g., cochlear hair cells, vestibular hair cells, cochlear supporting cells, vestibular supporting cells, and/or spiral ganglion neurons). The methods described herein may include a step of screening a subject for one or more mutations in genes known to be associated with hearing loss or vestibular dysfunction prior to treatment with or administration of the compositions described herein. A subject can be screened for a genetic mutation using standard methods known to those of skill in the art (e.g., genetic testing). The methods described herein may also include a step of assessing hearing and/or vestibular function in a subject prior to treatment with or administration of the compositions described herein. Hearing can be assessed using standard tests, such as audiometry, auditory brainstem response (ABR), electrochocleography (ECOG), and otoacoustic emissions. Vestibular function may be assessed using standard tests, such as eye movement testing (e.g., electronystagmogram (ENG) or videonystagmogram (VNG)), posturography, rotary-chair testing, ECOG, vestibular evoked myogenic potentials (VEMP), and specialized clinical balance tests, such as those described in Mancini and Horak, Eur J Phys Rehabil Med, 46:239 (2010). These tests can also be used to assess hearing and/or vestibular function in a subject after treatment with or administration of the compositions described herein. The compositions and methods described herein may also be administered as a preventative treatment to patients at risk of developing hearing loss and/or vestibular dysfunction, e.g., patients who have a family history of hearing loss or vestibular dysfunction (e.g., inherited hearing loss or vestibular dysfunction), patients carrying a genetic mutation associated with hearing loss or vestibular dysfunction who do not yet exhibit hearing impairment or vestibular dysfunction, or patients exposed to risk factors for acquired hearing loss (e.g., acoustic trauma, disease or infection, head trauma, ototoxic drugs, or aging) or vestibular dysfunction (e.g., disease or infection, head trauma, ototoxic drugs, or aging). In some embodiments, the compositions and methods described herein are used to treat hearing loss or vestibular dysfunction that results from autoimmune inner ear disease, inflammation (e.g., labyrnthitis or vestibular neuritis), or Meniere's disease.

The compositions and methods described herein can be used to promote or induce inner ear cell regeneration in a primate (e.g., human) subject (e.g., regeneration of cochlear hair cells, vestibular hair cells, or spiral ganglion neurons) and/or to increase the number of hair cells (e.g., IHCs, OHCs, and/or vestibular hair cells) and/or SGNs in a primate (e.g., human) subject. The compositions and methods described herein can also be used to increase the number of supporting cells (e.g., cochlear and/or vestibular supporting cells, for example, by inducing or increasing supporting cell proliferation) or to induce the differentiation of supporting cells into hair cells (e.g., to induce cochlear supporting cell differentiation into IHCs and/or OHCs, and/or to induce vestibular supporting cell differentiation into vestibular hair cells). Subjects that may benefit from compositions that promote or induce inner ear cell regeneration, increase the number of hair cells, SGNs, and/or supporting cells (e.g., cochlear and/or vestibular supporting cells), and/or induce the differentiation of supporting cells (e.g., cochlear and/or vestibular supporting cells) into hair cells include subjects suffering from hearing loss or vestibular dysfunction as a result of damage, degeneration, dysfunction, or loss of inner ear cells (e.g., IHCs, OHCs, SGNs, vestibular hair cells, or supporting cells (e.g., cochlear and/or vestibular supporting cells), e.g., damage, degeneration, or loss of inner ear cells related to trauma (e.g., acoustic trauma or head trauma), disease or infection, ototoxic drugs, or aging), and subjects with abnormal inner ear cells (e.g., inner ear cells that do not function properly when compared to normal, healthy inner ear cells), or reduced inner ear cell numbers due to genetic mutations or congenital abnormalities. The compositions and methods described herein can also be used to promote or increase inner ear cell survival (e.g., increase survival of damaged inner ear cells, promote repair of damaged inner ear cells, or preserve inner cells in a subject at risk of damage to, or degeneration or loss of inner ear cells (e.g., loss of inner ear cells due to age, exposure to loud noise, disease or infection, head trauma, or ototoxic drugs)).

The compositions and methods described herein can also be used to prevent or reduce ototoxic drug-induced inner ear cell damage or death (e.g., IHC, OHC, SGN, cochlear supporting cell, vestibular supporting cell, and/or vestibular hair cell damage or death) in subjects who have been treated with ototoxic drugs, or who are currently undergoing or soon to begin treatment with ototoxic drugs. Ototoxic drugs are toxic to the cells of the inner ear, and can cause sensorineural hearing loss, vestibular dysfunction (e.g., vertigo, dizziness, or imbalance), tinnitus, or a combination of these symptoms. Drugs that have been found to be ototoxic include aminoglycoside antibiotics (e.g., gentamycin, neomycin, streptomycin, tobramycin, kanamycin, vancomycin, and amikacin), viomycin, antineoplastic drugs (e.g., platinum-containing chemotherapeutic agents, such as cisplatin, carboplatin, and oxaliplatin), loop diuretics (e.g., ethacrynic acid and furosemide), salicylates (e.g., aspirin, particularly at high doses), and quinine. In some embodiments, the methods described herein prevent or reduce inner ear cell damage or death (e.g., IHC, OHC, SGN, cochlear supporting cell, vestibular supporting cell, and/or vestibular hair cell damage or death) related to acoustic trauma, disease or infection, head trauma, or aging.

The compositions and methods described herein can also be used to maintain or improve the connections between hair cells and neurons in the inner ear (e.g., synaptic connections between cochlear hair cells (IHCs and/or OHCs) and SGNs or vestibular hair cells and vestibular ganglion neurons). In some embodiments, the compositions and methods described herein preserve ribbon synapses or promote or increase ribbon synapse formation. In some embodiments, the compositions and methods described herein maintain or increase innervation of hair cells (e.g., cochlear hair cells (IHCs and/or OHCs) or vestibular hair cells) by neurons (e.g., SGNs or vestibular ganglion neurons) in the inner ear.

Treatment may include administration of a composition containing an AAV1 vector (e.g., an AAV1 vector containing a wild-type AAV1 capsid) described herein in various unit doses. Each unit dose will ordinarily contain a predetermined-quantity of the therapeutic composition. The quantity to be administered, and the particular route of administration and formulation, are within the skill of those in the clinical arts. A unit dose need not be administered as a single injection but may comprise continuous infusion over a set period of time. Dosing may be performed using a syringe pump to control infusion rate in order to minimize damage to the inner ear (e.g., the cochlea). The AAV1 vectors may have a titer of, for example, from about $1 \times 10^9$ vector genomes (VG)/mL to about $1 \times 10^{15}$ VG/mL (e.g., $1 \times 10^9$ VG/mL, $2 \times 10^9$ VG/mL, $3 \times 10^9$ VG/mL, $4 \times 10^9$ VG/mL, $5 \times 10^9$ VG/mL, $6 \times 10^9$ VG/mL, $7 \times 10^9$ VG/mL, $8 \times 10^9$ VG/mL, $9 \times 10^9$ VG/mL, $1 \times 10^{10}$ VG/mL, $2 \times 10^{10}$ VG/mL, $3 \times 10^{10}$ VG/mL, $4 \times 10^{10}$ VG/mL, $5 \times 10^{10}$ VG/mL, $6 \times 10^{10}$ VG/mL, $7 \times 10^{10}$ VG/mL, $8 \times 10^{10}$ VG/mL, $9 \times 10^{10}$ VG/mL, $1 \times 10^{11}$ VG/mL, $2 \times 10^{11}$ VG/mL, $3 \times 10^{11}$ VG/mL, $4 \times 10^{11}$ VG/mL, $5 \times 10^{11}$ VG/mL, $6 \times 10^{11}$ VG/mL, $7 \times 10^{11}$ VG/mL, $8 \times 10^{11}$ VG/mL, $9 \times 10^{11}$ VG/mL, $1 \times 10^{12}$ VG/mL, $2 \times 10^{12}$ VG/mL, $3 \times 10^{12}$ VG/mL, $4 \times 10^{12}$ VG/mL, $5 \times 10^{12}$ VG/mL, $6 \times 10^{12}$ VG/mL, $7 \times 10^{12}$ VG/mL, $8 \times 10^{12}$ VG/mL, $9 \times 10^{12}$ VG/mL, $1 \times 10^{13}$ VG/mL, $2 \times 10^{13}$ VG/mL, $3 \times 10^{13}$ VG/mL, $4 \times 10^{13}$ VG/mL, $5 \times 10^{13}$ VG/mL, $6 \times 10^{13}$ VG/mL, $7 \times 10^{13}$ VG/mL, $8 \times 10^{13}$ VG/mL, $9 \times 10^{13}$ VG/mL, $1 \times 10^{14}$ VG/mL, $2 \times 10^{14}$ VG/mL, $3 \times 10^{14}$ VG/mL, $4 \times 10^{14}$ VG/mL, $5 \times 10^{14}$ VG/mL, $6 \times 10^{14}$ VG/mL, $7 \times 10^{14}$ VG/mL, $8 \times 10^{14}$ VG/mL, $9 \times 10^{14}$ VG/mL, or $1 \times 10^{15}$ VG/mL) and may be administered in a volume of 1 µL to 200 µL (e.g., 1, 2, 3, 5, 6, 7, 8, 9, 10, 15, 20, 25, 30, 35, 40, 45, 50, 55, 60, 65, 70, 75, 80, 85, 90, 95, 100, 110, 120, 130, 140, 150, 160, 170, 180, 190, or 200 µL). The AAV1 vectors may be administered to the subject at a dose of $1 \times 10^7$ VG/ear to $2 \times 10^{14}$ VG/ear (e.g., $1 \times 10^7$ VG/ear, $2 \times 10^7$ VG/ear, $3 \times 10^7$ VG/ear, $4 \times 10^7$ VG/ear, $5 \times 10^7$ VG/ear, $6 \times 10^7$ VG/ear, $7 \times 10^7$ VG/ear, $8 \times 10^7$ VG/ear, $9 \times 10^7$ VG/ear, $1 \times 10^8$ VG/ear, $2 \times 10^8$ VG/ear, $3 \times 10^8$ VG/ear, $4 \times 10^8$ VG/ear, $5 \times 10^8$ VG/ear, $6 \times 10^8$ VG/ear, $7 \times 10^8$ VG/ear, $8 \times 10^8$ VG/ear, $9 \times 10^8$ VG/ear, $1 \times 10^9$ VG/ear, $2 \times 10^9$ VG/ear, $3 \times 10^9$ VG/ear, $4 \times 10^9$ VG/ear, $5 \times 10^9$ VG/ear, $6 \times 10^9$ VG/ear, $7 \times 10^9$ VG/ear, $8 \times 10^9$ VG/ear, $9 \times 10^9$ VG/ear, $1 \times 10^{10}$ VG/ear, $2 \times 10^{10}$ VG/ear, $3 \times 10^{10}$ VG/ear, $4 \times 10^{10}$ VG/ear, $5 \times 10^{10}$ VG/ear, $6\times10^{10}$ VG/ear, $7\times10^{10}$ VG/ear, $8\times10^{10}$ VG/ear, $9\times10^{10}$ VG/ear, $1\times10^{11}$ VG/ear, $2\times10^{11}$ VG/ear, $3\times10^{11}$ VG/ear, $4\times10^{11}$ VG/ear, $5\times10^{11}$ VG/ear, $6\times10^{11}$ VG/ear, $7\times10^{11}$ VG/ear, $8\times10^{11}$ VG/ear, $9\times10^{11}$ VG/ear, $1\times10^{12}$ VG/ear, $2\times10^{12}$ VG/ear, $3\times10^{12}$ VG/ear, $4\times10^{12}$ VG/ear, $5\times10^{12}$ VG/ear, $6\times10^{12}$ VG/ear, $7\times10^{12}$ VG/ear, $8\times10^{12}$ VG/ear, $9\times10^{12}$ VG/ear, $1\times10^{13}$ VG/ear, $2\times10^{13}$ VG/ear, $3\times10^{13}$ VG/ear, $4\times10^{13}$ VG/ear, $5\times10^{13}$ VG/ear, $6\times10^{13}$ VG/ear, $7\times10^{13}$ VG/ear, $8\times10^{13}$ VG/ear, $9\times10^{13}$ VG/ear, $1\times10^{14}$ VG/ear, or $2\times10^{14}$ VG/ear).

In some embodiments, the compositions described herein are administered in an amount sufficient to transduce three or more (e.g., 3, 4, 5, 6, 7, 8, 9, 10, 11, 12, 13, 14, 15, or more) developed inner ear cell types selected from the group including outer hair cells, vestibular hair cells, vestibular dark cells, vestibular fibrocytes, Scarpa's ganglion neurons (vestibular ganglion neurons), endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells. In some embodiments, the compositions described herein are administered in an amount sufficient to transduce all or most developed inner ear cell types.

The compositions described herein are administered in an amount sufficient to improve hearing, improve vestibular function (e.g., improve balance or reduce dizziness or vertigo), reduce tinnitus, increase expression of a polynucleotide contained in an AAV1 vector, increase function of a protein encoded by a polynucleotide contained in an AAV1 vector, promote or induce inner ear cell regeneration (e.g., regeneration of cochlear hair cells, vestibular hair cells, or spiral ganglion neurons), increase hair cell numbers (e.g., IHC, OHC, and/or vestibular hair cell numbers), increase SGN numbers, increase supporting cell numbers (e.g., cochlear and/or vestibular supporting cells, e.g., increase supporting cell proliferation), increase the differentiation of supporting cells into hair cells (e.g., induce cochlear supporting cell differentiation into IHCs and/or OHCs, and/or induce vestibular supporting cell differentiation into vestibular hair cells), prevent or reduce inner ear cell damage or death (e.g., IHC, OHC, SGN, cochlear supporting cell, vestibular supporting cell, and/or vestibular hair cell damage or death related to acoustic trauma, head trauma, ototoxic drugs, disease or infection, or aging), promote or increase inner ear cell development, promote or increase inner ear cell survival (e.g., increase survival of damaged inner ear cells, promote repair of damaged inner ear cells, or preserve inner cells in a subject at risk of damage to, or degeneration or loss of inner ear cells (e.g., loss of inner ear cells due to age, exposure to loud noise, disease or infection, head trauma, or ototoxic drugs)), improve inner ear cell function, preserve ribbon synapses, promote or increase ribbon synapse formation, maintain the connections (e.g., synaptic connections) between hair cells and neurons (e.g., SGNs and/or vestibular ganglion neurons), or increase or restore the connections (e.g., synaptic connections) between hair cells and neurons (e.g., SGNs and/or vestibular ganglion neurons). Hearing may be evaluated using standard hearing tests (e.g., audiometry, ABR, electrochochleography (ECOG), and otoacoustic emissions) and may be improved by 5% or more (e.g., 5%, 10%, 15%, 20%, 30%, 40%, 50%, 60%, 70%, 80%, 90%, 100%, 125%, 150%, 200% or more) compared to hearing measurements obtained prior to treatment. Vestibular function may be evaluated using standard tests for balance and vertigo (e.g., eye movement testing (e.g., ENG or VNG), posturography, rotary-chair testing, ECOG, VEMP, and specialized clinical balance tests) and may be improved by 5% or more (e.g., 5%, 10%, 15%, 20%, 30%, 40%, 50%, 60%, 70%, 80%, 90%, 100%, 125%, 150%, 200% or more) compared to measurements obtained prior to treatment. In some embodiments, the compositions are administered in an amount sufficient to improve the subject's ability to understand speech. The compositions described herein may also be administered in an amount sufficient to slow or prevent the development or progression of sensorineural hearing loss and/or vestibular dysfunction (e.g., in subjects who carry a genetic mutation associated with hearing loss or vestibular dysfunction, who have a family history of hearing loss or vestibular dysfunction (e.g., hereditary hearing loss or vestibular dysfunction), or who have been exposed to risk factors associated with hearing loss or vestibular dysfunction (e.g., ototoxic drugs, head trauma, disease or infection, or acoustic trauma), but who do not exhibit hearing impairment or vestibular dysfunction (e.g., vertigo, dizziness, or imbalance), or in subjects exhibiting mild to moderate hearing loss or vestibular dysfunction). Expression of a protein encoded by a polynucleotide may be evaluated using immunohistochemistry, Western blot analysis, quantitative real-time PCR, or other methods known in the art for detection protein or mRNA, and may be increased by 5% or more (e.g., 5%, 10%, 15%, 20%, 30%, 40%, 50%, 60%, 70%, 80%, 90%, 100%, 125%, 150%, 200% or more) compared to expression prior to administration of the compositions described herein. Inner ear cell numbers, inner ear cell function, hair cell or SGN regeneration, or function of the protein encoded by the polynucleotide contained in the AAV1 vector may be evaluated indirectly based on hearing tests or tests of vestibular function, and may be increased by 5% or more (e.g., 5%, 10%, 15%, 20%, 30%, 40%, 50%, 60%, 70%, 80%, 90%, 100%, 125%, 150%, 200% or more) compared to inner ear cell numbers, inner ear cell function, hair cell or SGN regeneration, or function of the protein encoded by the polynucleotide prior to administration of the compositions described herein. Inner ear cell damage or death may be reduced by 5% or more (e.g., 5%, 10%, 15%, 20%, 30%, 40%, 50%, 60%, 70%, 80%, 90%, 100%, 125%, 150%, 200% or more) compared to inner ear cell damage and death typically observed in untreated subjects, and can be evaluated indirectly based on standard tests of hearing and/or vestibular function. These effects may occur, for example, within 1 week, 2 weeks, 3 weeks, 4 weeks, 5 weeks, 6 weeks, 7 weeks, 8 weeks, 9 weeks, 10 weeks, 15 weeks, 20 weeks, 25 weeks, or more, following administration of the compositions described herein. The patient may be evaluated 1 month, 2 months, 3 months, 4 months, 5 months, 6 months or more following administration of the composition depending on the dose and route of administration used for treatment. Depending on the outcome of the evaluation, the patient may receive additional treatments.

Kits

The compositions described herein can be provided in a kit for use in treating sensorineural hearing loss or vestibular dysfunction. Compositions may include an AAV1 vector containing a promoter and/or a nucleic acid sequence of a polynucleotide, and may be provided in unit dosage form, optionally in a pharmaceutically acceptable excipient (e.g., saline or artificial perilymph), in an amount sufficient to transduce three or more (e.g., 3, 4, 5, 6, 7, 8, 9, 10, 11, 12, 13, 14, 15, or more) developed inner ear cell types selected from the group including outer hair cells, vestibular hair cells, vestibular dark cells, vestibular fibrocytes, Scarpa's ganglion neurons (vestibular ganglion neurons), endothelial cells of vestibular capillaries, vestibular supporting cells, Border cells, inner phalangeal cells, inner pillar cells, outer pillar cells, first row Deiters' cells, second row Deiters' cells, third row Deiters' cells, Hensen's cells, Claudius cells, spiral prominence cells, root cells, interdental cells, basal cells of the stria vascularis, intermediate cells of the stria vascularis, marginal cells of the stria vascularis, spiral ganglion neurons, endothelial cells of cochlear capillaries, fibrocytes, cells of Reissner's membrane, and glial cells. The kit can further include a package insert that instructs a user of the kit, such as a physician, to perform the methods described herein. The kit may optionally include a syringe or other device for administering the composition.

EXAMPLES

The following examples are put forth so as to provide those of ordinary skill in the art with a description of how the compositions and methods described herein may be used, made, and evaluated, and are intended to be purely exemplary of the invention and are not intended to limit the scope of what the inventors regard as their invention.

The examples below demonstrate the unexpectedly superior tropism of AAV1 viral vectors in the inner ear of non-human primates as compared to the tropism of AAV2 and AAV7m8 serotype vectors. Unlike AAV1 tropism in mice, which exhibited limited transduction of a few cell types of the inner ear, AAV1 mediated transgene delivery to the inner ear of non-human primates exhibited broad transduction of multiple cell types. This is in contrast to serotypes such as AAV7m8, which exhibited broad transduction of multiple inner ear cell types in mouse, but showed much more restricted tropism in the inner ear of non-human primates.

In all of the examples described below, AAV1 vectors contain capsid proteins having the amino acid sequences of SEQ ID NOs: 1-3.

Example 1

In Vivo Administration of a Composition Containing an AAV1 Viral Vector Carrying a Transgene to the Mouse Cochlea To determine transduction efficacy of AAV1 viral vectors within the inner ear of mice, a composition containing an AAV1 vector carrying an EGFP transgene under control of the CMV promoter (AAV1-CMV-EGFP) was delivered unilaterally into the inner ear of 9-10 week old CBA/CaJ mice (n=6 mice) by way of injection to the posterior canal of the inner ear. Injections (1 µL) of viral titer at $2.94 \times 10^{13}$ genome copies/mL were performed at an injection rate of 0.1 µL/min. Two weeks following injections, inner ears were surgically removed and a surface preparation of the basilar membrane was performed. To assess AAV-1 mediated transduction of the inner ear, EGFP expression was directly observed using fluorescence microscopy. EGFP expression was observed throughout the baso-apical axis of the cochlea, but varied across cell types along the length of the frequency map. (FIG. 1A; upper left panel: apex of the cochlea; lower panel: middle turn of the cochlea; upper right panel: base turn of the cochlea). Inner hair cells (IHCs) expressed EGFP across the baso-apical axis of the cochlea, but outer hair cells (OHCs) primarily exhibited GFP expression the apical region of the cochlea. EGFP expression was also observed within some cells of the spiral limbus (FIG. 1B).

Example 2

In Vivo Administration of a Composition Containing an AAV7m8 Vector Carrying a Transgene to the Mouse Cochlea To determine transduction efficacy of AAV7m8 viral vectors within the inner ear of mice, a composition containing an AAV7m8 vector carrying an EGFP transgene under control of a CAG promoter (AAV7m8-CAG-EGFP) was delivered unilaterally into the inner ear of 9-10 week-old CBA/CaJ mice (n=8 mice) by way of injection to the posterior canal of the inner ear. Injections (1 µL) of viral titer at $9.4 \times 10^{12}$ genome copies/mL were performed at an injection rate of 0.1 µL/min. Two weeks following injections, inner ears were surgically removed and a surface preparation of the basilar membrane was performed. EGFP expression was observed throughout the entire cochlea (FIG. 2A). A higher-power image shows EGFP expression in multiple cell types including IHCs, OHCs, and cells of the spiral ganglion and spiral limbus throughout the basal-to-apical extent of the cochlea (FIG. 2B; left panel: apex of the cochlea; middle panel: middle turn of the cochlea; right panel: base turn of the cochlea).

Example 3

In Vivo Administration of a Composition Containing an AAV2 Vector Carrying a Transgene to the Inner Ear of Adult Non-Human Primates To determine transduction efficacy of AAV2 viral vectors within the inner ear of adult non-human primates, a composition containing an AAV2 vector carrying a GFP transgene under control of a CMV promoter was delivered unilaterally (n=1 animals) and bilaterally (n=2 animals) into the inner ear of rhesus monkeys by way of injection through the round window membrane. Injections (30 µL) of viral titer at $3.39 \times 10^{12}$ genome copies/mL were performed at an injection rate of 15 µL/min. Four weeks post-injection, inner ears were surgically removed and surface preparation of basilar membranes was performed. Immunolabeling for Myo7A was used to identify hair cells of the inner ear (FIG. 3A, panels in the right column) and AAV2-mediated transduction of inner ear cells was measured by direct GFP fluorescence (FIG. 3A, panels in the left column). GFP expression was observed across the baso-apical axis of the cochlea, particularly within IHCs and some cells of the spiral limbus (FIG. 3A, panels in the left column). To determine the transduction efficacy of the AAV2-CMV-GFP vector in the IHCs of the inner ear in rhesus monkeys, GFP expression was quantified in IHCs along the frequency map of the cochlea, demonstrating GFP expression in 40-80% of the cells (FIG. 3B)

Example 4

Figure 4F:
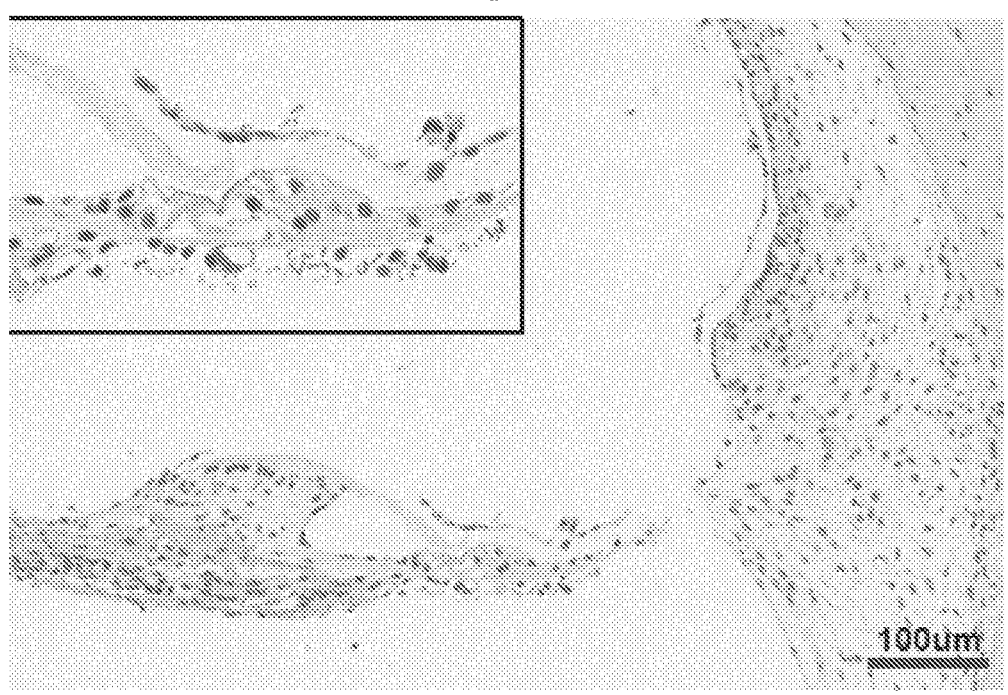

In Vivo Administration of a Composition Containing an AAV7m8 Vector Carrying a Transgene to the Inner Ear of Adult Non-Human Primates To determine transduction efficacy of AAV7m8 viral vectors within the inner ear of adult non-human primates, a composition containing an AAV7m8 vector carrying an EGFP transgene under the control of a CAG promoter was delivered bilaterally into the inner ear of cynomolgus monkeys by way of injection through the round window membrane. Injections (30 µL) of viral titer at $9.4 \times 10^{12}$ genome copies/mL were performed at an injection rate of 15 µL/min. Two (n=1 animal) or four weeks (n=1 animal) post-injection, inner ears were surgically removed and embedded in paraffin for sectioning, mounting, and immunostaining with an anti-GFP antibody for histological analysis. In one animal, two weeks after transduction of the inner ear with AAV7m8-CAG-EGFP, EGFP expression was observed mostly at the base turn of the cochlea (FIG. 4A, top panel: dashed square denotes the base turn of the cochlea). EGFP was observed in IHCs, OHCs, and fibrocytes in the spiral ligament (FIG. 4B, enlargement of the dashed square in FIG. 4A; inset in the upper left: magnified view of the organ of Corti). In a different animal, four weeks after injection, EGFP expression was observed across the baso-apical axis of the cochlea (FIG. 4C, dashed square denotes the base turn of the cochlea and is enlarged in FIG. 4D). EGFP was expressed in the IHCs, OHCs, and fibrocytes in spiral ligament (FIG. 4D, organ of Corti enlarged in the inset at the upper left edge of the panel). As a negative control, immunostaining with the secondary antibody in the absence of the anti-GFP primary antibody showed no staining within the cochlea (FIG. 4E-F).

Example 5

In Vivo Administration of a Composition Containing an AAV1 Viral Vector Carrying a Transgene to the Inner Ear of Adult Non-Human Primates To determine transduction efficacy of AAV1 viral vectors within the inner ear of adult non-human primates, a composition containing an AAV1 vector carrying a GFP transgene under the control of a CAG promoter (AAV1-CAG-GFP) was delivered bilaterally into the inner ear of a cynomolgus monkey by way of injection through the round window membrane. Injections (30 µL) of viral titer at $9.9 \times 10^{12}$ GC/mL were performed at an injection rate of 15 µL/min. Four weeks post-injection, inner ears were surgically removed and embedded in paraffin for sectioning and histological analysis. To assess AAV1-mediated transduction of the inner ear, paraffin sections were immunolabeled with a rabbit monoclonal anti-GFP antibody (Abcam EPR14104). GFP expression was observed in multiple inner ear structures, including the cochlea (FIGS. 5B and 5C) and the saccule (FIGS. 5B and 5E). Robust GFP expression was detected in the spiral ligament and in the marginal cells and intermediate cells of the stria vascularis. The basal cells of the stria vascularis did not exhibit GFP expression in the section shown in the image, but GFP expression was visible in basal cells in other turns of the cochlea (FIG. 5D). Staining with secondary antibody alone in the absence of the anti-GFP antibody was used as a negative control to confirm the specificity of the antibody (FIG. 5A).

To determine whether the broad transduction of the AAV1 vector observed in the cynomolgus monkey inner ear could be observed in other primate species, another set of experiments was performed in rhesus monkeys using injection of an AAV1 vector carrying a GFP transgene under control of the CMV promoter (AAV1-CMV-GFP). A viral titer at $2.01 \times 10^{13}$ GC/mL was injected unilaterally (n=1 animal) and bilaterally (n=2 animals) through the round window of the inner ear, delivering 30 µL of the composition at an injection rate of 15 µL/min. Tropism of the AAV1 vector was assayed 4 weeks post-injection by surgical removal of the inner ear and surface preparation of the basilar membrane, utricle, and cristae. AAV1-mediated GFP expression was monitored directly by GFP fluorescence and hair cells of the inner ear were identified by immunolabeling with an antibody for Myo7a. Fluorescence imaging revealed robust GFP expression throughout the entire baso-apical axis of the cochlea (FIG. 6A) that was strongly pronounced in the inner hair cell (IHC) and outer hair cell (OHC) layers (FIG. 6B). GFP expression was also observed in supporting cells and the non-sensory spiral ligament and spiral limbus (FIG. 6B). Furthermore, vestibular structures of the inner ear showed strong GFP expression in sensory and non-sensory cells of the utricle and crista (FIG. 6C).

Thus, as shown in FIGS. 5 and 6, AAV1 exhibits robust pantropic transduction within the inner ear of non-human primates. This broad tropism in sensory and non-sensory cells of the cochlea and vestibule can be leveraged for therapeutic benefit. A summary of the tropism observed in the non-human primate inner ear using different AAV capsids is provided in Table 6, below.

TABLE 6

Tropism of different capsids in the non-human primate inner ear

| | Inner hair cells | Outer hair cells | Supporting cells | Spiral ganglion neurons | Spiral ligament (stria) and spiral limbus |
|---|---|---|---|---|---|
| AAV2 | Strong | Little/None | Weak | Little/None | Medium |
| AAV7m8 | Strong | Medium | Little/None | Medium | Medium |
| AAV1 | Strong | Strong | Medium | Strong | Strong |

Strong = strong expression;
medium = medium expression;
weak = weak expression;
little/none = little or no expression Example 6

In Vivo Administration of a Composition Containing an AAV1 Viral Vector Carrying a Transgene to the Inner Ear of Adult Non-Human Primates Using Low and High Viral Titers To determine the effect of viral titer on the transduction efficacy of AAV1 viral vectors within the inner ear of adult non-human primates, a composition containing an AAV1 vector carrying a GFP transgene under the control of a CAG promoter (AAV1-CAG-GFP) was delivered bilaterally into the inner ear of a cynomolgus monkey by way of injection through the round window membrane. Injections (30 µL) of viral titer at either $1.05 \times 10^{12}$ GC/mL ($3.15 \times 10^{10}$ GC/ear; "AAV1 Low") or $1.05 \times 10^{13}$ GC/mL ($3.15 \times 10^{11}$ GC/ear; "AAV1 High") were performed at an injection rate of 15 µL/min. Four weeks post-injection, inner ears were surgically removed and embedded in paraffin for sectioning and histological analysis. To assess AAV1-mediated transduction of the inner ear, paraffin sections were immunolabeled with a rabbit monoclonal anti-GFP antibody (Abcam EPR14104). FIGS. 7A-7C demonstrate GFP labeling in a non-AAV-injected ear (FIG. 7A), in the AAV Low-injected ear (FIG. 7B), and in the AAV High-injected ear (FIG. 7C).

FIGS. 7D-7F show the same images as FIGS. 7A-7C, respectively, without nuclear staining (i.e., GFP staining only). The anti-GFP antibody did not label the cochlea of non-AAV-injected ear, confirming the specificity of the antibody (FIGS. 7A and 7D). The AAV1 Low-injected ear showed robust GFP expression from the base to the apex of the cochlea in a variety of cell types, including hair cells, supporting cells, inner sulcus cells, outer sulcus cells, and cells in spiral ligaments (FIGS. 7B and 7E). Increasing the viral titer in resulted in stronger GFP expression in the aforementioned cell types, as well as GFP expression in additional cells and cell types (FIGS. 7C and 7F). Thus, AAV1 exhibits robust pantropic transduction within the inner ear of non-human primates that may be enhanced by increasing the viral titer.

Example 7

Expression of a Polynucleotide in an Outer Hair Cell in the Inner Ear of a Human Subject According to the methods and compositions disclosed herein, a physician of skill in the art can administer to a human subject a composition containing an AAV1 vector (e.g., an AAV1 vector containing a wild-type AAV1 capsid) to induce expression of a polynucleotide in OHCs. To this end, a physician of skill in the art can administer a composition containing AAV1 vector containing a polynucleotide (e.g., a polynucleotide encoding Strc, Chrna9, Chrna10, Ocm, Tmc1, Myo7a, or Ush1c) operably linked to an OHC-specific promoter (e.g., a SLC26A5 promoter, an OCM promoter, a STRC promoter, or an ATP2B2 promoter) locally to the inner ear (e.g., to the endolymph or perilymph, such as by administration to or through the round window, oval window, or horizontal canal or by transtympanic or intratympanic injection) of the human subject. To induce expression of the polynucleotide in an OHC, the AAV1 vector can be administered at a dose of, for example, $1 \times 10^7$ VG/ear to $2 \times 10^{14}$ VG/ear (e.g., $1 \times 10^7$ VG/ear, $2 \times 10^7$ VG/ear, $3 \times 10^7$ VG/ear, $4 \times 10^7$ VG/ear, $5 \times 10^7$ VG/ear, $6 \times 10^7$ VG/ear, $7 \times 10^7$ VG/ear, $8 \times 10^7$ VG/ear, $9 \times 10^7$ VG/ear, $1 \times 10^8$ VG/ear, $2 \times 10^8$ VG/ear, $3 \times 10^8$ VG/ear, $4 \times 10^8$ VG/ear, $5 \times 10^8$ VG/ear, $6 \times 10^8$ VG/ear, $7 \times 10^8$ VG/ear, $8 \times 10^8$ VG/ear, $9 \times 10^8$ VG/ear, $1 \times 10^9$ VG/ear, $2 \times 10^9$ VG/ear, $3 \times 10^9$ VG/ear, $4 \times 10^9$ VG/ear, $5 \times 10^9$ VG/ear, $6 \times 10^9$ VG/ear, $7 \times 10^9$ VG/ear, $8 \times 10^9$ VG/ear, $9 \times 10^9$ VG/ear, $1 \times 10^{10}$ VG/ear, $2 \times 10^{10}$ VG/ear, $3 \times 10^{10}$ VG/ear, $4 \times 10^{10}$ VG/ear, $5 \times 10^{10}$ VG/ear, $6 \times 10^{10}$ VG/ear, $7 \times 10^{10}$ VG/ear, $8 \times 10^{10}$ VG/ear, $9 \times 10^{10}$ VG/ear, $1 \times 10^{11}$ VG/ear, $2 \times 10^{11}$ VG/ear, $3 \times 10^{11}$ VG/ear, $4 \times 10^{11}$ VG/ear, $5 \times 10^{11}$ VG/ear, $6 \times 10^{11}$ VG/ear, $7 \times 10^{11}$ VG/ear, $8 \times 10^{11}$ VG/ear, $9 \times 10^{11}$ VG/ear, $1 \times 10^{12}$ VG/ear, $2 \times 10^{12}$ VG/ear, $3 \times 10^{12}$ VG/ear, $4 \times 10^{12}$ VG/ear, $5 \times 10^{12}$ VG/ear, $6 \times 10^{12}$ VG/ear, $7 \times 10^{12}$ VG/ear, $8 \times 10^{12}$ VG/ear, $9 \times 10^{12}$ VG/ear, $1 \times 10^{13}$ VG/ear, $2 \times 10^{13}$ VG/ear, $3 \times 10^{13}$ VG/ear, $4 \times 10^{13}$ VG/ear, $5 \times 10^{13}$ VG/ear, $6 \times 10^{13}$ VG/ear, $7 \times 10^{13}$ VG/ear, $8 \times 10^{13}$ VG/ear, $9 \times 10^{13}$ VG/ear, $1 \times 10^{14}$ VG/ear, or $2 \times 10^{14}$ VG/ear).

Following administration of the composition to a human subject, a practitioner of skill in the art can monitor gene expression and/or expression of the protein encoded by the polynucleotide, and the patient's improvement in response to the therapy, by a variety of methods. For example, a physician can indirectly assess gene expression and/or protein production and monitor the patient's hearing by performing standard tests, such as audiometry, ABR, electrocochleography (ECOG), and distortion product of otoacoustic emissions (DPOAE) following administration of the composition. Hearing measurements collected post-treatment can be compared to measurements obtained prior to treatment. A finding that the patient exhibits improved hearing in one or more of the tests following administration of the composition (e.g., improved OHC function as indexed by DPOAE measurements) compared to hearing test results prior to administration of the composition indicates that the patient is responding favorably to the treatment. Subsequent doses can be determined and administered as needed.

Example 8

Treatment of Vestibular Dysfunction in a Human Subject by Administration of an AAV1 Vector According to the methods disclosed herein, a physician of skill in the art can treat a subject, such as a human patient, having vestibular dysfunction (e.g., vertigo, dizziness, or balance loss) so as to improve or restore vestibular function (e.g., balance, spatial orientation, righting, gait, and/or vestibulo-ocular reflex). To this end, a physician of kill in the art can administer to the human patient a composition containing an AAV1 vector (e.g., an AAV1 vector containing a wild-type AAV1 capsid) containing a polynucleotide encoding a transgene (e.g., a polynucleotide encoding Atoh1, Gfi1, Sox11, Ntf3, Bdnf, Whirlin, Sox11, Tmtc4, or Pou4f3) operably linked to a vestibular cell type-specific promoter (e.g., a utricle supporting cell-specific promoter, such as a GFAP promoter, a GLAST promoter, a HES1 promoter, a JAG1 promoter, a NOTCH1 promoter, a LGR5 promoter, a SOX2 promoter, a HES5 promoter, or a SOX9 promoter; or a vestibular hair cell-specific promoter, such as a MYOSIN 15 promoter, a GFI1 promoter, a POU4F3 promoter, or a MYOSIN 7A promoter). The composition containing the AAV vector may be administered to the patient, for example, by local administration to the inner ear (e.g., to the endolymph or perilymph, such as by administration to or through the round window, oval window, or horizontal canal, or by administration to the semicircular canal), to treat vestibular dysfunction. To treat vestibular dysfunction, the AAV1 vector that can be administered at a dose of, for example, $1 \times 10^7$ VG/ear to $2 \times 10^{14}$ VG/ear (e.g., $1 \times 10^7$ VG/ear, $2 \times 10^7$ VG/ear, $3 \times 10^7$ VG/ear, $4 \times 10^7$ VG/ear, $5 \times 10^7$ VG/ear, $6 \times 10^7$ VG/ear, $7 \times 10^7$ VG/ear, $8 \times 10^7$ VG/ear, $9 \times 10^7$ VG/ear, $1 \times 10^8$ VG/ear, $2 \times 10^8$ VG/ear, $3 \times 10^8$ VG/ear, $4 \times 10^8$ VG/ear, $5 \times 10^8$ VG/ear, $6 \times 10^8$ VG/ear, $7 \times 10^8$ VG/ear, $8 \times 10^8$ VG/ear, $9 \times 10^8$ VG/ear, $1 \times 10^9$ VG/ear, $2 \times 10^9$ VG/ear, $3 \times 10^9$ VG/ear, $4 \times 10^9$ VG/ear, $5 \times 10^9$ VG/ear, $6 \times 10^9$ VG/ear, $7 \times 10^9$ VG/ear, $8 \times 10^9$ VG/ear, $9 \times 10^9$ VG/ear, $1 \times 10^{10}$ VG/ear, $2 \times 10^{10}$ VG/ear, $3 \times 10^{10}$ VG/ear, $4 \times 10^{10}$ VG/ear, $5 \times 10^{10}$ VG/ear, $6 \times 10^{10}$ VG/ear, $7 \times 10^{10}$ VG/ear, $8 \times 10^{10}$ VG/ear, $9 \times 10^{10}$ VG/ear, $1 \times 10^{11}$ VG/ear, $2 \times 10^{11}$ VG/ear, $3 \times 10^{11}$ VG/ear, $4 \times 10^{11}$ VG/ear, $5 \times 10^{11}$ VG/ear, $6 \times 10^{11}$ VG/ear, $7 \times 10^{11}$ VG/ear, $8 \times 10^{11}$ VG/ear, $9 \times 10^{11}$ VG/ear, $1 \times 10^{12}$ VG/ear, $2 \times 10^{12}$ VG/ear, $3 \times 10^{12}$ VG/ear, $4 \times 10^{12}$ VG/ear, $5 \times 10^{12}$ VG/ear, $6 \times 10^{12}$ VG/ear, $7 \times 10^{12}$ VG/ear, $8 \times 10^{12}$ VG/ear, $9 \times 10^{12}$ VG/ear, $1 \times 10^{13}$ VG/ear, $2 \times 10^{13}$ VG/ear, $3 \times 10^{13}$ VG/ear, $4 \times 10^{13}$ VG/ear, $5 \times 10^{13}$ VG/ear, $6 \times 10^{13}$ VG/ear, $7 \times 10^{13}$ VG/ear, $8 \times 10^{13}$ VG/ear, $9 \times 10^{13}$ VG/ear, $1 \times 10^{14}$ VG/ear, or $2 \times 10^{14}$ VG/ear).

Following administration of the composition to a patient, a practitioner of skill in the art can monitor the patient's improvement in response to the therapy, by a variety of methods. For example, a physician can monitor the patient's vestibular function by performing standard tests such as electronystagmography, video nystagmography, rotation tests, vestibular evoked myogenic potential, or computerized dynamic posturography. A finding that the patient exhibits improved balance, gait, posture, and/or vestibulo-ocular reflex in one or more of the tests following administration of the composition compared to test results prior to administration of the composition indicates that the patient is responding favorably to the treatment. Subsequent doses can be determined and administered as needed.

Other Embodiments

Various modifications and variations of the described invention will be apparent to those skilled in the art without departing from the scope and spirit of the invention. Although the invention has been described in connection with specific embodiments, it should be understood that the invention as claimed should not be unduly limited to such specific embodiments. Indeed, various modifications of the described modes for carrying out the invention that are obvious to those skilled in the art are intended to be within the scope of the invention. Other embodiments are in the claims.

The invention claimed is:

1. A method of expressing a polynucleotide that encodes Gap Junction Protein Beta 2 (Gjb2) operably linked to a promoter in developed inner ear cells in a human subject, the method comprising administering to the developed inner ear cells of the subject a serotype 1 adeno-associated virus (AAV1) vector harvested from a cell lysate, the AAV1 vector comprising the polynucleotide, wherein the administering is in an amount that transduces one or more inner ear cell types selected from the group consisting of Border cells, inner phalangeal cells, inner pillar cells, outer pillar cells, first row Deiters' cells, second row Deiters' cells, third row Deiters' cells, Hensen's cells, Claudius cells, interdental cells, basal cells of the stria vascularis, intermediate cells of the stria vascularis, marginal cells of the stria vascularis, and fibrocytes.

2. The method of claim 1, wherein the AAV1 vector is administered transtympanically, intratympanically, or injected to the posterior canal of the inner ear of the human subject and through the round window membrane of the human subject.

3. The method of claim 1, wherein the polynucleotide encodes Gjb2 operably linked to a GJB2 promoter and the polynucleotide is expressed in one or more of an inner pillar cell, an outer pillar cell, a marginal cell of the stria vascularis, a basal cell of the stria vascularis, an intermediate cell of the stria vascularis, a border cell, an inner phalangeal cell, a first row Deiters' cell, a second row Deiters' cell, a third row Deiters' cell, a Hensen's cell, a Claudius cell, an interdental cell, and a fibrocyte.

* * * * *

SEQUENCE LISTING

```
<160> NUMBER OF SEQ ID NOS: 10

<210> SEQ ID NO 1
<211> LENGTH: 736
<212> TYPE: PRT
<213> ORGANISM: adeno-associated virus 1

<400> SEQUENCE: 1

Met Ala Ala Asp Gly Tyr Leu Pro Asp Trp Leu Glu Asp Asn Leu Ser
1               5                   10                  15

Glu Gly Ile Arg Glu Trp Trp Asp Leu Lys Pro Gly Ala Pro Lys Pro
            20                  25                  30

Lys Ala Asn Gln Gln Lys Gln Asp Asp Gly Arg Gly Leu Val Leu Pro
        35                  40                  45

Gly Tyr Lys Tyr Leu Gly Pro Phe Asn Gly Leu Asp Lys Gly Glu Pro
    50                  55                  60

Val Asn Ala Ala Asp Ala Ala Leu Glu His Asp Lys Ala Tyr Asp
65                  70                  75                  80

Gln Gln Leu Lys Ala Gly Asp Asn Pro Tyr Leu Arg Tyr Asn His Ala
                85                  90                  95

Asp Ala Glu Phe Gln Glu Arg Leu Gln Glu Asp Thr Ser Phe Gly Gly
            100                 105                 110

Asn Leu Gly Arg Ala Val Phe Gln Ala Lys Lys Arg Val Leu Glu Pro
        115                 120                 125

Leu Gly Leu Val Glu Glu Gly Ala Lys Thr Ala Pro Gly Lys Lys Arg
    130                 135                 140

Pro Val Glu Gln Ser Pro Gln Glu Pro Asp Ser Ser Ser Gly Ile Gly
145                 150                 155                 160

Lys Thr Gly Gln Gln Pro Ala Lys Lys Arg Leu Asn Phe Gly Gln Thr
                165                 170                 175

Gly Asp Ser Glu Ser Val Pro Asp Pro Gln Pro Leu Gly Glu Pro Pro
            180                 185                 190

Ala Thr Pro Ala Ala Val Gly Pro Thr Thr Met Ala Ser Gly Gly Gly
        195                 200                 205

Ala Pro Met Ala Asp Asn Asn Glu Gly Ala Asp Gly Val Gly Asn Ala
    210                 215                 220

Ser Gly Asn Trp His Cys Asp Ser Thr Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Ser Ala Ser Thr Gly Ala Ser Asn Asp Asn His
            260                 265                 270

Tyr Phe Gly Tyr Ser Thr Pro Trp Gly Tyr Phe Asp Phe Asn Arg Phe
        275                 280                 285

His Cys His Phe Ser Pro Arg Asp Trp Gln Arg Leu Ile Asn Asn Asn
    290                 295                 300
```

```
Trp Gly Phe Arg Pro Lys Arg Leu Asn Phe Lys Leu Phe Asn Ile Gln
305                 310                 315                 320

Val Lys Glu Val Thr Thr Asn Asp Gly Val Thr Thr Ile Ala Asn Asn
            325                 330                 335

Leu Thr Ser Thr Val Gln Val Phe Ser Asp Ser Glu Tyr Gln Leu Pro
            340                 345                 350

Tyr Val Leu Gly Ser Ala His Gln Gly Cys Leu Pro Pro Phe Pro Ala
            355                 360                 365

Asp Val Phe Met Ile Pro Gln Tyr Gly Tyr Leu Thr Leu Asn Asn Gly
            370                 375                 380

Ser Gln Ala Val Gly Arg Ser Ser Phe Tyr Cys Leu Glu Tyr Phe Pro
385                 390                 395                 400

Ser Gln Met Leu Arg Thr Gly Asn Asn Phe Thr Phe Ser Tyr Thr Phe
            405                 410                 415

Glu Glu Val Pro Phe His Ser Ser Tyr Ala His Ser Gln Ser Leu Asp
            420                 425                 430

Arg Leu Met Asn Pro Leu Ile Asp Gln Tyr Leu Tyr Tyr Leu Asn Arg
            435                 440                 445

Thr Gln Asn Gln Ser Gly Ser Ala Gln Asn Lys Asp Leu Leu Phe Ser
450                 455                 460

Arg Gly Ser Pro Ala Gly Met Ser Val Gln Pro Lys Asn Trp Leu Pro
465                 470                 475                 480

Gly Pro Cys Tyr Arg Gln Gln Arg Val Ser Lys Thr Lys Thr Asp Asn
            485                 490                 495

Asn Asn Ser Asn Phe Thr Trp Thr Gly Ala Ser Lys Tyr Asn Leu Asn
            500                 505                 510

Gly Arg Glu Ser Ile Ile Asn Pro Gly Thr Ala Met Ala Ser His Lys
            515                 520                 525

Asp Asp Glu Asp Lys Phe Phe Pro Met Ser Gly Val Met Ile Phe Gly
            530                 535                 540

Lys Glu Ser Ala Gly Ala Ser Asn Thr Ala Leu Asp Asn Val Met Ile
545                 550                 555                 560

Thr Asp Glu Glu Glu Ile Lys Ala Thr Asn Pro Val Ala Thr Glu Arg
                565                 570                 575

Phe Gly Thr Val Ala Val Asn Phe Gln Ser Ser Ser Thr Asp Pro Ala
            580                 585                 590

Thr Gly Asp Val His Ala Met Gly Ala Leu Pro Gly Met Val Trp Gln
            595                 600                 605

Asp Arg Asp Val Tyr Leu Gln Gly Pro Ile Trp Ala Lys Ile Pro His
            610                 615                 620

Thr Asp Gly His Phe His Pro Ser Pro Leu Met Gly Gly Phe Gly Leu
625                 630                 635                 640

Lys Asn Pro Pro Pro Gln Ile Leu Ile Lys Asn Thr Pro Val Pro Ala
            645                 650                 655

Asn Pro Pro Ala Glu Phe Ser Ala Thr Lys Phe Ala Ser Phe Ile Thr
            660                 665                 670

Gln Tyr Ser Thr Gly Gln Val Ser Val Glu Ile Glu Trp Glu Leu Gln
            675                 680                 685

Lys Glu Asn Ser Lys Arg Trp Asn Pro Glu Val Gln Tyr Thr Ser Asn
            690                 695                 700

Tyr Ala Lys Ser Ala Asn Val Asp Phe Thr Val Asp Asn Asn Gly Leu
705                 710                 715                 720
```

```
Tyr Thr Glu Pro Arg Pro Ile Gly Thr Arg Tyr Leu Thr Arg Pro Leu
                725                 730                 735
```

```
<210> SEQ ID NO 2
<211> LENGTH: 599
<212> TYPE: PRT
<213> ORGANISM: adeno-associated virus 1

<400> SEQUENCE: 2
```

```
Thr Ala Pro Gly Lys Lys Arg Pro Val Glu Gln Ser Pro Gln Glu Pro
1               5                   10                  15

Asp Ser Ser Gly Ile Gly Lys Thr Gly Gln Gln Pro Ala Lys Lys
            20                  25                  30

Arg Leu Asn Phe Gly Gln Thr Gly Asp Ser Glu Ser Val Pro Asp Pro
            35                  40                  45

Gln Pro Leu Gly Glu Pro Pro Ala Thr Pro Ala Ala Val Gly Pro Thr
    50                  55                  60

Thr Met Ala Ser Gly Gly Gly Ala Pro Met Ala Asp Asn Asn Glu Gly
65                  70                  75                  80

Ala Asp Gly Val Gly Asn Ala Ser Gly Asn Trp His Cys Asp Ser Thr
                85                  90                  95

Trp Leu Gly Asp Arg Val Ile Thr Thr Ser Thr Arg Thr Trp Ala Leu
            100                 105                 110

Pro Thr Tyr Asn Asn His Leu Tyr Lys Gln Ile Ser Ser Ala Ser Thr
        115                 120                 125

Gly Ala Ser Asn Asp Asn His Tyr Phe Gly Tyr Ser Thr Pro Trp Gly
    130                 135                 140

Tyr Phe Asp Phe Asn Arg Phe His Cys His Phe Ser Pro Arg Asp Trp
145                 150                 155                 160

Gln Arg Leu Ile Asn Asn Asn Trp Gly Phe Arg Pro Lys Arg Leu Asn
                165                 170                 175

Phe Lys Leu Phe Asn Ile Gln Val Lys Glu Val Thr Thr Asn Asp Gly
            180                 185                 190

Val Thr Thr Ile Ala Asn Asn Leu Thr Ser Thr Val Gln Val Phe Ser
        195                 200                 205

Asp Ser Glu Tyr Gln Leu Pro Tyr Val Leu Gly Ser Ala His Gln Gly
    210                 215                 220

Cys Leu Pro Pro Phe Pro Ala Asp Val Phe Met Ile Pro Gln Tyr Gly
225                 230                 235                 240

Tyr Leu Thr Leu Asn Asn Gly Ser Gln Ala Val Gly Arg Ser Ser Phe
                245                 250                 255

Tyr Cys Leu Glu Tyr Phe Pro Ser Gln Met Leu Arg Thr Gly Asn Asn
            260                 265                 270

Phe Thr Phe Ser Tyr Thr Phe Glu Glu Val Pro Phe His Ser Ser Tyr
        275                 280                 285

Ala His Ser Gln Ser Leu Asp Arg Leu Met Asn Pro Leu Ile Asp Gln
    290                 295                 300

Tyr Leu Tyr Tyr Leu Asn Arg Thr Gln Asn Gln Ser Gly Ser Ala Gln
305                 310                 315                 320

Asn Lys Asp Leu Leu Phe Ser Arg Gly Ser Pro Ala Gly Met Ser Val
                325                 330                 335

Gln Pro Lys Asn Trp Leu Pro Gly Pro Cys Tyr Arg Gln Gln Arg Val
            340                 345                 350

Ser Lys Thr Lys Thr Asp Asn Asn Asn Ser Asn Phe Thr Trp Thr Gly
        355                 360                 365
```

Ala Ser Lys Tyr Asn Leu Asn Gly Arg Glu Ser Ile Ile Asn Pro Gly
370                 375                 380

Thr Ala Met Ala Ser His Lys Asp Asp Glu Asp Lys Phe Phe Pro Met
385                 390                 395                 400

Ser Gly Val Met Ile Phe Gly Lys Glu Ser Ala Gly Ala Ser Asn Thr
            405                 410                 415

Ala Leu Asp Asn Val Met Ile Thr Asp Glu Glu Glu Ile Lys Ala Thr
            420                 425                 430

Asn Pro Val Ala Thr Glu Arg Phe Gly Thr Val Ala Val Asn Phe Gln
            435                 440                 445

Ser Ser Ser Thr Asp Pro Ala Thr Gly Asp Val His Ala Met Gly Ala
450                 455                 460

Leu Pro Gly Met Val Trp Gln Asp Arg Asp Val Tyr Leu Gln Gly Pro
465                 470                 475                 480

Ile Trp Ala Lys Ile Pro His Thr Asp Gly His Phe His Pro Ser Pro
            485                 490                 495

Leu Met Gly Gly Phe Gly Leu Lys Asn Pro Pro Gln Ile Leu Ile
            500                 505                 510

Lys Asn Thr Pro Val Pro Ala Asn Pro Pro Ala Glu Phe Ser Ala Thr
            515                 520                 525

Lys Phe Ala Ser Phe Ile Thr Gln Tyr Ser Thr Gly Gln Val Ser Val
            530                 535                 540

Glu Ile Glu Trp Glu Leu Gln Lys Glu Asn Ser Lys Arg Trp Asn Pro
545                 550                 555                 560

Glu Val Gln Tyr Thr Ser Asn Tyr Ala Lys Ser Ala Asn Val Asp Phe
                565                 570                 575

Thr Val Asp Asn Asn Gly Leu Tyr Thr Glu Pro Arg Pro Ile Gly Thr
                580                 585                 590

Arg Tyr Leu Thr Arg Pro Leu
        595

<210> SEQ ID NO 3
<211> LENGTH: 534
<212> TYPE: PRT
<213> ORGANISM: adeno-associated virus 1

<400> SEQUENCE: 3

Met Ala Ser Gly Gly Ala Pro Met Ala Asp Asn Asn Glu Gly Ala
1               5                   10                  15

Asp Gly Val Gly Asn Ala Ser Gly Asn Trp His Cys Asp Ser Thr Trp
            20                  25                  30

Leu Gly Asp Arg Val Ile Thr Thr Ser Thr Arg Thr Trp Ala Leu Pro
        35                  40                  45

Thr Tyr Asn Asn His Leu Tyr Lys Gln Ile Ser Ser Ala Ser Thr Gly
50                  55                  60

Ala Ser Asn Asp Asn His Tyr Phe Gly Tyr Ser Thr Pro Trp Gly Tyr
65                  70                  75                  80

Phe Asp Phe Asn Arg Phe His Cys His Phe Ser Pro Arg Asp Trp Gln
                85                  90                  95

Arg Leu Ile Asn Asn Asn Trp Gly Phe Arg Pro Lys Arg Leu Asn Phe
            100                 105                 110

Lys Leu Phe Asn Ile Gln Val Lys Glu Val Thr Thr Asn Asp Gly Val
        115                 120                 125

Thr Thr Ile Ala Asn Asn Leu Thr Ser Thr Val Gln Val Phe Ser Asp

```
            130                 135                 140
Ser Glu Tyr Gln Leu Pro Tyr Val Leu Gly Ser Ala His Gln Gly Cys
145                 150                 155                 160

Leu Pro Pro Phe Pro Ala Asp Val Phe Met Ile Pro Gln Tyr Gly Tyr
                165                 170                 175

Leu Thr Leu Asn Asn Gly Ser Gln Ala Val Gly Arg Ser Ser Phe Tyr
                180                 185                 190

Cys Leu Glu Tyr Phe Pro Ser Gln Met Leu Arg Thr Gly Asn Asn Phe
            195                 200                 205

Thr Phe Ser Tyr Thr Phe Glu Glu Val Pro Phe His Ser Ser Tyr Ala
        210                 215                 220

His Ser Gln Ser Leu Asp Arg Leu Met Asn Pro Leu Ile Asp Gln Tyr
225                 230                 235                 240

Leu Tyr Tyr Leu Asn Arg Thr Gln Asn Gln Ser Gly Ser Ala Gln Asn
                245                 250                 255

Lys Asp Leu Leu Phe Ser Arg Gly Ser Pro Ala Gly Met Ser Val Gln
                260                 265                 270

Pro Lys Asn Trp Leu Pro Gly Pro Cys Tyr Arg Gln Gln Arg Val Ser
            275                 280                 285

Lys Thr Lys Thr Asp Asn Asn Asn Ser Asn Phe Thr Trp Thr Gly Ala
        290                 295                 300

Ser Lys Tyr Asn Leu Asn Gly Arg Glu Ser Ile Ile Asn Pro Gly Thr
305                 310                 315                 320

Ala Met Ala Ser His Lys Asp Asp Glu Asp Lys Phe Phe Pro Met Ser
                325                 330                 335

Gly Val Met Ile Phe Gly Lys Glu Ser Ala Gly Ala Ser Asn Thr Ala
                340                 345                 350

Leu Asp Asn Val Met Ile Thr Asp Glu Glu Ile Lys Ala Thr Asn
            355                 360                 365

Pro Val Ala Thr Glu Arg Phe Gly Thr Val Ala Val Asn Phe Gln Ser
        370                 375                 380

Ser Ser Thr Asp Pro Ala Thr Gly Asp Val His Ala Met Gly Ala Leu
385                 390                 395                 400

Pro Gly Met Val Trp Gln Asp Arg Asp Val Tyr Leu Gln Gly Pro Ile
                405                 410                 415

Trp Ala Lys Ile Pro His Thr Asp Gly His Phe His Pro Ser Pro Leu
                420                 425                 430

Met Gly Gly Phe Gly Leu Lys Asn Pro Pro Gln Ile Leu Ile Lys
            435                 440                 445

Asn Thr Pro Val Pro Ala Asn Pro Pro Ala Glu Phe Ser Ala Thr Lys
450                 455                 460

Phe Ala Ser Phe Ile Thr Gln Tyr Ser Thr Gly Gln Val Ser Val Glu
465                 470                 475                 480

Ile Glu Trp Glu Leu Gln Lys Glu Asn Ser Lys Arg Trp Asn Pro Glu
                485                 490                 495

Val Gln Tyr Thr Ser Asn Tyr Ala Lys Ser Ala Asn Val Asp Phe Thr
                500                 505                 510

Val Asp Asn Asn Gly Leu Tyr Thr Glu Pro Arg Pro Ile Gly Thr Arg
            515                 520                 525

Tyr Leu Thr Arg Pro Leu
            530

<210> SEQ ID NO 4
```

```
<211> LENGTH: 354
<212> TYPE: PRT
<213> ORGANISM: Artificial Sequence
<220> FEATURE:
<223> OTHER INFORMATION: Synthetic Construct

<400> SEQUENCE: 4

Met Ser Arg Leu Leu His Ala Glu Glu Trp Ala Glu Val Lys Glu Leu
1               5                   10                  15

Gly Asp His His Arg Gln Pro Gln Pro His His Leu Pro Gln Pro Pro
            20                  25                  30

Pro Pro Pro Gln Pro Pro Ala Thr Leu Gln Ala Arg Glu His Pro Val
        35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Ala Arg Ala Ala Gln Tyr
65                  70                  75                  80

Leu Leu His Ser Pro Glu Leu Gly Ala Ser Glu Ala Ala Ala Pro Arg
                85                  90                  95

Asp Glu Val Asp Gly Arg Gly Glu Leu Val Arg Arg Ser Ser Gly Gly
            100                 105                 110

Ala Ser Ser Ser Lys Ser Pro Gly Pro Val Lys Val Arg Glu Gln Leu
        115                 120                 125

Cys Lys Leu Lys Gly Gly Val Val Val Asp Glu Leu Gly Cys Ser Arg
    130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Arg Met His Gly Leu Asn
                165                 170                 175

His Ala Phe Asp Gln Leu Arg Asn Val Ile Pro Ser Phe Asn Asn Asp
            180                 185                 190

Lys Lys Leu Ser Lys Tyr Glu Thr Leu Gln Met Ala Gln Ile Tyr Ile
        195                 200                 205

Asn Ala Leu Ser Glu Leu Leu Gln Thr Pro Ser Gly Gly Glu Gln Pro
    210                 215                 220

Pro Pro Pro Ala Ser Cys Lys Ser Asp His His His Leu Arg Thr
225                 230                 235                 240

Ala Ala Ser Tyr Glu Gly Gly Ala Gly Asn Ala Thr Ala Ala Gly Ala
                245                 250                 255

Gln Gln Ala Ser Gly Gly Ser Gln Arg Pro Thr Pro Pro Gly Ser Cys
            260                 265                 270

Arg Thr Arg Phe Ser Ala Pro Ala Ser Ala Gly Gly Tyr Ser Val Gln
        275                 280                 285

Leu Asp Ala Leu His Phe Ser Thr Phe Glu Asp Ser Ala Leu Thr Ala
    290                 295                 300

Met Met Ala Gln Lys Asn Leu Ser Pro Ser Leu Pro Gly Ser Ile Leu
305                 310                 315                 320

Gln Pro Val Gln Glu Glu Asn Ala Lys Thr Ser Pro Arg Ser His Arg
                325                 330                 335

Ser Asp Gly Glu Phe Ser Pro His Ser His Tyr Ser Asp Ser Asp Glu
            340                 345                 350

Ala Ser

<210> SEQ ID NO 5
<211> LENGTH: 354
```

```
<212> TYPE: PRT
<213> ORGANISM: Artificial Sequence
<220> FEATURE:
<223> OTHER INFORMATION: Synthetic Construct

<400> SEQUENCE: 5

Met Ser Arg Leu Leu His Ala Glu Glu Trp Ala Glu Val Lys Glu Leu
1               5                   10                  15

Gly Asp His His Arg Gln Pro Gln Pro His Leu Pro Gln Pro Pro
            20                  25                  30

Pro Pro Pro Gln Pro Pro Ala Thr Leu Gln Ala Arg Glu His Pro Val
        35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Ala Arg Ala Ala Gln Tyr
65                  70                  75                  80

Leu Leu His Ser Pro Glu Leu Gly Ala Ser Glu Ala Ala Pro Arg
                85                  90                  95

Asp Glu Val Asp Gly Arg Gly Glu Leu Val Arg Arg Ser Ser Gly Gly
                100                 105                 110

Ala Ser Ser Ser Lys Ser Pro Gly Pro Val Lys Val Arg Glu Gln Leu
                115                 120                 125

Cys Lys Leu Lys Gly Gly Val Val Asp Glu Leu Gly Cys Ser Arg
    130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Met His Gly Leu Asn
                165                 170                 175

His Ala Phe Asp Gln Leu Arg Asn Val Ile Pro Ser Phe Asn Asn Asp
                180                 185                 190

Lys Lys Leu Ser Lys Tyr Glu Thr Leu Gln Met Ala Gln Ile Tyr Ile
                195                 200                 205

Asn Ala Leu Ser Glu Leu Leu Gln Thr Pro Ser Gly Gly Glu Gln Pro
                210                 215                 220

Pro Pro Pro Pro Ala Ser Cys Lys Ser Asp His His Leu Arg Thr
225                 230                 235                 240

Ala Ala Ser Tyr Glu Gly Gly Ala Gly Asn Ala Thr Ala Ala Gly Ala
                245                 250                 255

Gln Gln Ala Ser Gly Gly Ser Gln Arg Pro Thr Pro Gly Ser Cys
                260                 265                 270

Arg Thr Arg Phe Ser Ala Pro Ala Ser Ala Gly Gly Tyr Ser Val Gln
                275                 280                 285

Leu Asp Ala Leu His Phe Ser Thr Phe Glu Asp Ser Ala Leu Thr Ala
                290                 295                 300

Met Met Ala Gln Lys Asn Leu Ser Pro Ser Leu Pro Gly Ser Ile Leu
305                 310                 315                 320

Gln Pro Val Gln Glu Glu Asn Ser Lys Thr Ala Pro Arg Ser His Arg
                325                 330                 335

Ser Asp Gly Glu Phe Ser Pro His Ser His Tyr Ser Asp Ser Asp Glu
                340                 345                 350

Ala Ser

<210> SEQ ID NO 6
<211> LENGTH: 354
<212> TYPE: PRT
```

<213> ORGANISM: Artificial Sequence
<220> FEATURE:
<223> OTHER INFORMATION: Synthetic Construct

<400> SEQUENCE: 6

```
Met Ser Arg Leu Leu His Ala Glu Glu Trp Ala Glu Val Lys Glu Leu
1               5                   10                  15

Gly Asp His His Arg Gln Pro Gln Pro His His Leu Pro Gln Pro Pro
            20                  25                  30

Pro Pro Pro Gln Pro Pro Ala Thr Leu Gln Ala Arg Glu His Pro Val
        35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Ala Arg Ala Ala Gln Tyr
65                  70                  75                  80

Leu Leu His Ser Pro Glu Leu Gly Ala Ser Glu Ala Ala Ala Pro Arg
                85                  90                  95

Asp Glu Val Asp Gly Arg Gly Glu Leu Val Arg Ser Ser Gly Gly
            100                 105                 110

Ala Ser Ser Ser Lys Ser Pro Gly Pro Val Lys Val Arg Glu Gln Leu
            115                 120                 125

Cys Lys Leu Lys Gly Gly Val Val Asp Glu Leu Gly Cys Ser Arg
            130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Met His Gly Leu Asn
                165                 170                 175

His Ala Phe Asp Gln Leu Arg Asn Val Ile Pro Ser Phe Asn Asn Asp
                180                 185                 190

Lys Lys Leu Ser Lys Tyr Glu Thr Leu Gln Met Ala Gln Ile Tyr Ile
            195                 200                 205

Asn Ala Leu Ser Glu Leu Leu Gln Thr Pro Ser Gly Gly Glu Gln Pro
        210                 215                 220

Pro Pro Pro Pro Ala Ser Cys Lys Ser Asp His His His Leu Arg Thr
225                 230                 235                 240

Ala Ala Ser Tyr Glu Gly Gly Ala Gly Asn Ala Thr Ala Ala Gly Ala
                245                 250                 255

Gln Gln Ala Ser Gly Gly Ser Gln Arg Pro Thr Pro Pro Gly Ser Cys
            260                 265                 270

Arg Thr Arg Phe Ser Ala Pro Ala Ser Ala Gly Gly Tyr Ser Val Gln
            275                 280                 285

Leu Asp Ala Leu His Phe Ser Thr Phe Glu Asp Ser Ala Leu Thr Ala
    290                 295                 300

Met Met Ala Gln Lys Asn Leu Ser Pro Ser Leu Pro Gly Ser Ile Leu
305                 310                 315                 320

Gln Pro Val Gln Glu Glu Asn Ser Lys Thr Ser Pro Arg Ala His Arg
                325                 330                 335

Ser Asp Gly Glu Phe Ser Pro His Ser His Tyr Ser Asp Ser Asp Glu
            340                 345                 350

Ala Ser
```

<210> SEQ ID NO 7
<211> LENGTH: 354
<212> TYPE: PRT
<213> ORGANISM: Artificial Sequence
<220> FEATURE:
<223> OTHER INFORMATION: Synthetic Construct

<400> SEQUENCE: 7

Met Ser Arg Leu Leu His Ala Glu Glu Trp Ala Glu Val Lys Glu Leu
1               5                   10                  15

Gly Asp His His Arg Gln Pro Gln Pro His His Leu Pro Gln Pro Pro
                20                  25                  30

Pro Pro Pro Gln Pro Pro Ala Thr Leu Gln Ala Arg Glu His Pro Val
            35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Ala Arg Ala Ala Gln Tyr
65                  70                  75                  80

Leu Leu His Ser Pro Glu Leu Gly Ala Ser Ala Ala Ala Pro Arg
                85                  90                  95

Asp Glu Val Asp Gly Arg Gly Glu Leu Val Arg Arg Ser Ser Gly Gly
                100                 105                 110

Ala Ser Ser Ser Lys Ser Pro Gly Pro Val Lys Val Arg Glu Gln Leu
            115                 120                 125

Cys Lys Leu Lys Gly Gly Val Val Asp Glu Leu Gly Cys Ser Arg
            130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Met His Gly Leu Asn
                165                 170                 175

His Ala Phe Asp Gln Leu Arg Asn Val Ile Pro Ser Phe Asn Asn Asp
                180                 185                 190

Lys Lys Leu Ser Lys Tyr Glu Thr Leu Gln Met Ala Gln Ile Tyr Ile
                195                 200                 205

Asn Ala Leu Ser Glu Leu Leu Gln Thr Pro Ser Gly Gly Glu Gln Pro
210                 215                 220

Pro Pro Pro Pro Ala Ser Cys Lys Ser Asp His His His Leu Arg Thr
225                 230                 235                 240

Ala Ala Ser Tyr Glu Gly Gly Ala Gly Asn Ala Thr Ala Ala Gly Ala
                245                 250                 255

Gln Gln Ala Ser Gly Gly Ser Gln Arg Pro Thr Pro Pro Gly Ser Cys
            260                 265                 270

Arg Thr Arg Phe Ser Ala Pro Ala Ser Ala Gly Gly Tyr Ser Val Gln
            275                 280                 285

Leu Asp Ala Leu His Phe Ser Thr Phe Glu Asp Ser Ala Leu Thr Ala
    290                 295                 300

Met Met Ala Gln Lys Asn Leu Ser Pro Ser Leu Pro Gly Ser Ile Leu
305                 310                 315                 320

Gln Pro Val Gln Glu Glu Asn Ala Lys Thr Ala Pro Arg Ser His Arg
                325                 330                 335

Ser Asp Gly Glu Phe Ser Pro His Ser His Tyr Ser Asp Ser Asp Glu
                340                 345                 350

Ala Ser

<210> SEQ ID NO 8
<211> LENGTH: 354
<212> TYPE: PRT
<213> ORGANISM: Artificial Sequence
<220> FEATURE:

<223> OTHER INFORMATION: Synthetic Construct

<400> SEQUENCE: 8

```
Met Ser Arg Leu Leu His Ala Glu Glu Trp Ala Glu Val Lys Glu Leu
1               5                   10                  15

Gly Asp His His Arg Gln Pro Gln Pro His His Leu Pro Gln Pro Pro
                20                  25                  30

Pro Pro Pro Gln Pro Pro Ala Thr Leu Gln Ala Arg Glu His Pro Val
            35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Ala Arg Ala Ala Gln Tyr
65                  70                  75                  80

Leu Leu His Ser Pro Glu Leu Gly Ala Ser Glu Ala Ala Ala Pro Arg
                85                  90                  95

Asp Glu Val Asp Gly Arg Gly Glu Leu Val Arg Arg Ser Ser Gly Gly
                100                 105                 110

Ala Ser Ser Ser Lys Ser Pro Gly Pro Val Lys Val Arg Glu Gln Leu
            115                 120                 125

Cys Lys Leu Lys Gly Gly Val Val Val Asp Glu Leu Gly Cys Ser Arg
130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Arg Met His Gly Leu Asn
                165                 170                 175

His Ala Phe Asp Gln Leu Arg Asn Val Ile Pro Ser Phe Asn Asn Asp
                180                 185                 190

Lys Lys Leu Ser Lys Tyr Glu Thr Leu Gln Met Ala Gln Ile Tyr Ile
            195                 200                 205

Asn Ala Leu Ser Glu Leu Leu Gln Thr Pro Ser Gly Gly Glu Gln Pro
210                 215                 220

Pro Pro Pro Pro Ala Ser Cys Lys Ser Asp His His His Leu Arg Thr
225                 230                 235                 240

Ala Ala Ser Tyr Glu Gly Gly Ala Gly Asn Ala Thr Ala Ala Gly Ala
                245                 250                 255

Gln Gln Ala Ser Gly Gly Ser Gln Arg Pro Thr Pro Pro Gly Ser Cys
            260                 265                 270

Arg Thr Arg Phe Ser Ala Pro Ala Ser Ala Gly Gly Tyr Ser Val Gln
                275                 280                 285

Leu Asp Ala Leu His Phe Ser Thr Phe Glu Asp Ser Ala Leu Thr Ala
    290                 295                 300

Met Met Ala Gln Lys Asn Leu Ser Pro Ser Leu Pro Gly Ser Ile Leu
305                 310                 315                 320

Gln Pro Val Gln Glu Glu Asn Ala Lys Thr Ser Pro Arg Ala His Arg
                325                 330                 335

Ser Asp Gly Glu Phe Ser Pro His Ser His Tyr Ser Asp Ser Asp Glu
                340                 345                 350

Ala Ser
```

<210> SEQ ID NO 9
<211> LENGTH: 354
<212> TYPE: PRT
<213> ORGANISM: Artificial Sequence
<220> FEATURE:
<223> OTHER INFORMATION: Synthetic Construct

<400> SEQUENCE: 9

Met Ser Arg Leu Leu His Ala Glu Glu Trp Ala Glu Val Lys Glu Leu
1               5                   10                  15

Gly Asp His His Arg Gln Pro Gln Pro His His Leu Pro Gln Pro Pro
            20                  25                  30

Pro Pro Pro Gln Pro Pro Ala Thr Leu Gln Ala Arg Glu His Pro Val
        35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Arg Ala Ala Gln Tyr
65                  70                  75                  80

Leu Leu His Ser Pro Glu Leu Gly Ala Ser Glu Ala Ala Pro Arg
                85                  90                  95

Asp Glu Val Asp Gly Arg Gly Glu Leu Val Arg Arg Ser Ser Gly Gly
            100                 105                 110

Ala Ser Ser Ser Lys Ser Pro Gly Pro Val Lys Val Arg Glu Gln Leu
            115                 120                 125

Cys Lys Leu Lys Gly Gly Val Val Asp Glu Leu Gly Cys Ser Arg
130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Met His Gly Leu Asn
                165                 170                 175

His Ala Phe Asp Gln Leu Arg Asn Val Ile Pro Ser Phe Asn Asn Asp
            180                 185                 190

Lys Lys Leu Ser Lys Tyr Glu Thr Leu Gln Met Ala Gln Ile Tyr Ile
            195                 200                 205

Asn Ala Leu Ser Glu Leu Leu Gln Thr Pro Ser Gly Gly Glu Gln Pro
210                 215                 220

Pro Pro Pro Pro Ala Ser Cys Lys Ser Asp His His Leu Arg Thr
225                 230                 235                 240

Ala Ala Ser Tyr Glu Gly Gly Ala Gly Asn Ala Thr Ala Ala Gly Ala
                245                 250                 255

Gln Gln Ala Ser Gly Gly Ser Gln Arg Pro Thr Pro Pro Gly Ser Cys
            260                 265                 270

Arg Thr Arg Phe Ser Ala Pro Ala Ser Ala Gly Gly Tyr Ser Val Gln
            275                 280                 285

Leu Asp Ala Leu His Phe Ser Thr Phe Glu Asp Ser Ala Leu Thr Ala
290                 295                 300

Met Met Ala Gln Lys Asn Leu Ser Pro Ser Leu Pro Gly Ser Ile Leu
305                 310                 315                 320

Gln Pro Val Gln Glu Glu Asn Ser Lys Thr Ala Pro Arg Ala His Arg
                325                 330                 335

Ser Asp Gly Glu Phe Ser Pro His Ser His Tyr Ser Asp Ser Asp Glu
            340                 345                 350

Ala Ser

<210> SEQ ID NO 10
<211> LENGTH: 354
<212> TYPE: PRT
<213> ORGANISM: Artificial Sequence
<220> FEATURE:
<223> OTHER INFORMATION: Synthetic Construct

<400> SEQUENCE: 10

```
Met Ser Arg Leu Leu His Ala Glu Glu Trp Ala Glu Val Lys Glu Leu
1               5                   10                  15

Gly Asp His His Arg Gln Pro Gln Pro His His Leu Pro Gln Pro Pro
            20                  25                  30

Pro Pro Pro Gln Pro Pro Ala Thr Leu Gln Ala Arg Glu His Pro Val
        35                  40                  45

Tyr Pro Pro Glu Leu Ser Leu Leu Asp Ser Thr Asp Pro Arg Ala Trp
    50                  55                  60

Leu Ala Pro Thr Leu Gln Gly Ile Cys Thr Ala Arg Ala Ala Gln Tyr
65                  70                  75                  80

Leu Leu His Ser Pro Glu Leu Gly Ala Ser Glu Ala Ala Pro Arg
                85                  90                  95

Asp Glu Val Asp Gly Arg Gly Glu Leu Val Arg Arg Ser Ser Gly Gly
                100                 105                 110

Ala Ser Ser Ser Lys Ser Pro Gly Pro Val Lys Val Arg Glu Gln Leu
            115                 120                 125

Cys Lys Leu Lys Gly Gly Val Val Asp Glu Leu Gly Cys Ser Arg
    130                 135                 140

Gln Arg Ala Pro Ser Ser Lys Gln Val Asn Gly Val Gln Lys Gln Arg
145                 150                 155                 160

Arg Leu Ala Ala Asn Ala Arg Glu Arg Arg Met His Gly Leu Asn
                165                 170                 175

His Ala Phe Asp Gln Leu Arg Asn Val Ile Pro Ser Phe Asn Asn Asp
                180                 185                 190

Lys Lys Leu Ser Lys Tyr Glu Thr Leu Gln Met Ala Gln Ile Tyr Ile
                195                 200                 205

Asn Ala Leu Ser Glu Leu Leu Gln Thr Pro Ser Gly Gly Glu Gln Pro
            210                 215                 220

Pro Pro Pro Pro Ala Ser Cys Lys Ser Asp His His His Leu Arg Thr
225                 230                 235                 240

Ala Ala Ser Tyr Glu Gly Gly Ala Gly Asn Ala Thr Ala Ala Gly Ala
                245                 250                 255

Gln Gln Ala Ser Gly Gly Ser Gln Arg Pro Thr Pro Pro Gly Ser Cys
            260                 265                 270

Arg Thr Arg Phe Ser Ala Pro Ala Ser Ala Gly Gly Tyr Ser Val Gln
            275                 280                 285

Leu Asp Ala Leu His Phe Ser Thr Phe Glu Asp Ser Ala Leu Thr Ala
            290                 295                 300

Met Met Ala Gln Lys Asn Leu Ser Pro Ser Leu Pro Gly Ser Ile Leu
305                 310                 315                 320

Gln Pro Val Gln Glu Glu Asn Ala Lys Thr Ala Pro Arg Ala His Arg
                325                 330                 335

Ser Asp Gly Glu Phe Ser Pro His Ser His Tyr Ser Asp Ser Asp Glu
                340                 345                 350

Ala Ser
```